(12) United States Patent
Kim et al.

(10) Patent No.: US 12,289,672 B2
(45) Date of Patent: Apr. 29, 2025

(54) WIRELESS COMMUNICATION METHOD USING MULTI-LINK AND WIRELESS COMMUNICATION TERMINAL USING SAME

(71) Applicant: WILUS INSTITUTE OF STANDARDS AND TECHNOLOGY INC., Gyeonggi-do (KR)

(72) Inventors: Sanghyun Kim, Gyeonggi-do (KR); Geonjung Ko, Gyeonggi-do (KR); Juhyung Son, Gyeonggi-do (KR); Jinsam Kwak, Gyeonggi-do (KR)

(73) Assignee: WILUS INSTITUTE OF STANDARDS AND TECHNOLOGY INC., Gyeonggi-do (KR)

( * ) Notice: Subject to any disclaimer, the term of this patent is extended or adjusted under 35 U.S.C. 154(b) by 0 days.

(21) Appl. No.: 18/820,197

(22) Filed: Aug. 29, 2024

(65) Prior Publication Data
US 2024/0422658 A1 Dec. 19, 2024

Related U.S. Application Data

(63) Continuation of application No. PCT/KR2023/012501, filed on Aug. 23, 2023.

(30) Foreign Application Priority Data

Aug. 23, 2022 (KR) .......... 10-2022-0105621
Sep. 5, 2022 (KR) .......... 10-2022-0112436
(Continued)

(51) Int. Cl.
*H04W 48/16* (2009.01)
*H04W 88/10* (2009.01)

(52) U.S. Cl.
CPC ............ *H04W 48/16* (2013.01); *H04W 88/10* (2013.01)

(58) Field of Classification Search
CPC ............................. H04W 48/16; H04W 88/10
(Continued)

(56) References Cited

U.S. PATENT DOCUMENTS

| 11,856,565 B2 | 12/2023 | Cariou et al. |
| 2021/0274500 A1 | 9/2021 | Cariou et al. |

(Continued)

FOREIGN PATENT DOCUMENTS

| WO | 2022/033592 | 2/2022 |
| WO | 2024/043697 | 2/2024 |

OTHER PUBLICATIONS

International Search Report for PCT/KR2023/012501 mailed on Dec. 4, 2023 and its English translation from WIPO (now published as WO 2024/043697).
(Continued)

*Primary Examiner* — Chuck Huynh
(74) *Attorney, Agent, or Firm* — WOMBLE BOND DICKINSON (US) LLP

(57) ABSTRACT

Disclosed are a method and device for channel switching performed by a multilink device (MLD) including a plurality of stations each operating on a plurality of links in a wireless communication system. Specifically, the MLD of the present invention can receive a frame for channel switching from a first access point (AP) of an AP MLD including at least one AP and recognize channel switching of another AP on the basis of the received frame.

16 Claims, 24 Drawing Sheets

(30) Foreign Application Priority Data

Oct. 6, 2022 (KR) .......................... 10-2022-0127572
Nov. 4, 2022 (KR) .......................... 10-2022-0146499

(58) Field of Classification Search
USPC .......................................................... 370/329
See application file for complete search history.

(56) References Cited

U.S. PATENT DOCUMENTS

| | | |
|---|---|---|
| 2022/0116862 A1 | 4/2022 | Cariou |
| 2022/0132419 A1 | 4/2022 | Kwon et al. |
| 2023/0262822 A1 | 8/2023 | Lu et al. |
| 2024/0073773 A1* | 2/2024 | Seok ............... H04W 48/12 |
| 2024/0080736 A1 | 3/2024 | Lu et al. |
| 2024/0098721 A1* | 3/2024 | Cariou ............ H04W 48/08 |

OTHER PUBLICATIONS

Written Opinion of the International Searching Authority for PCT/KR2023/012501 mailed on Dec. 4, 2023 and its English translation by Google Translate (now published as WO 2024/043697).
Laurent Cariou: "MLO: CSA, eCSA and quiet element operation", doc.: IEEE 802.11-18/0073r3, Nov. 2023, pp. 1-3.

* cited by examiner

| Legacy IEs | RNR element (Basic Information) | EHT Capabilities / EHT Operation element (optional) | ML IE (MLD Level Information) |
|---|---|---|---|

(a) Beacon frame contents

| Neighbor AP TBTT Offset | BSSID | Short SSID | BSS parameters | 20 MHz PSD | MLD Parameters |
|---|---|---|---|---|---|

(b) TBTT Information field format

| MLD ID | Link ID | Change Sequence | NSTR Soft AP MLD | Reserved |
|---|---|---|---|---|

(c) MLD Parameters field format

| Neighbor AP TBTT Offset | BSSID | Short SSID | BSS parameters | 20 MHz PSD | MLD Parameters | MLD AP TBTT Offset |
|---|---|---|---|---|---|---|
| 1 | 0 or 6 | 0 or 4 | 0 or 1 | 0 or 1 | 0 or 3 | 0 or 2 |

Octets:

TBTT Information field format

FIG.13

| TBTT Information Length subfield value | TBTT Information field contents |
|---|---|
| ... | ... |
| 14 | The Neighbor AP TBTT Offset subfield, the BSS ID subfield, the Short-SSID subfield, the BSS Parameters subfield and MLD AP TBTT Offset subfield |
| 15 | The Neighbor AP TBTT Offset subfield, the BSSID subfield, the Short-SSID subfield, the BSS Parameters subfield, the 20 MHz PSD subfield and MLD AP TBTT Offset subfield |
| 17 | MLD AP TBTT Offset subfield, the BSSID subfield, the Short-SSID subfield, the BSS Parameters subfield, the 20 MHz PSD subfield and the MLD Parameters subfield |
| 18 | The Neighbor AP TBTT Offset subfield, the BSSID subfield, the Short-SSID subfield, the BSS Parameters subfield, the 20 MHz PSD subfield, the MLD Parameters subfield and MLD AP TBTT Offset subfield |
| ... | ... |

TBTT Information field contents (Table)

FIG.14
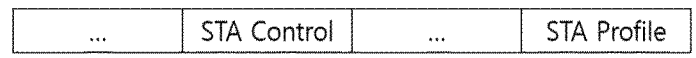
(a) Per-STA Profile subelement format
| Link ID | Complete Profile | MAC Address Present | Beacon Interval Present | DTIM Info Present | Updated Profile |
(b) STA Control field
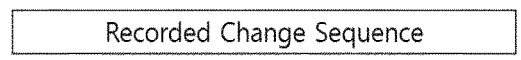
(c) Recorded Change Sequence subfield

| Element ID | Length | Channel Switch Mode | New Channel Number | Channel Switch Count |
|---|---|---|---|---|
| 1 | 1 | 1 | 1 | 1 |

Octets:

Channel Switch Announcement element format

| Element ID | Length | Channel Switch Mode | New Operating Class | New Channel Number | Channel Switch Count |
|---|---|---|---|---|---|
| 1 | 1 | 1 | 1 | 1 | 1 |

Octets:

Extended Channel Switch Announcement element format

| Element ID | Element ID Extension | Length | Switch Time |
|---|---|---|---|
| 1 | 1 | 1 | 3 |

Octets:

Max Channel Switch Time element format

| Element ID | Length | Quiet Count | Quiet Period | Quiet Duration | Quiet Offset |
|---|---|---|---|---|---|
| 1 | 1 | 1 | 1 | 2 | 2 |

Octets:

Quiet element format

| Element ID | Length | AP Quiet Mode | Quiet Count (optional) | Quiet Period (optional) | Quiet Duration (optional) | Quiet Offset (optional) |
|---|---|---|---|---|---|---|
| 1 | 1 | 1 | 0 or 1 | 0 or 1 | 0 or 2 | 0 or 2 |

Octets:

Quiet Channel element format

FIG.17

WIRELESS COMMUNICATION METHOD USING MULTI-LINK AND WIRELESS COMMUNICATION TERMINAL USING SAME

CROSS REFERENCE TO RELATED APPLICATIONS

This application is a continuation of International Patent Application No. PCT/KR2023/012501 filed on Aug. 23, 2023, which claims the priority to Korean Patent Application No. 10-2022-0105621 filed in the Korean Intellectual Property Office on Aug. 23, 2022, Korean Patent Application No. 10-2022-0112436 filed in the Korean Intellectual Property Office on Sep. 5, 2022, Korean Patent Application No. 10-2022-0050377 filed in the Korean Intellectual Property Office on Apr. 22, 2022, Korean Patent Application No. 10-2022-0127572 filed in the Korean Intellectual Property Office on Oct. 6, 2022, and Korean Patent Application No. 10-2022-0146499 filed in the Korean Intellectual Property Office on Nov. 4, 2022, the entire contents of which are incorporated herein by reference.

TECHNICAL FIELD

The disclosure relates to a wireless communication method using a multilink, and a wireless communication terminal using the same.

BACKGROUND ART

In recent years, with supply expansion of mobile apparatuses, a wireless LAN technology that can provide a rapid wireless Internet service to the mobile apparatuses has been significantly spotlighted. The wireless LAN technology allows mobile apparatuses including a smart phone, a smart pad, a laptop computer, a portable multimedia player, an embedded apparatus, and the like to wirelessly access the Internet in home or a company or a specific service providing area based on a wireless communication technology in a short range.

Institute of Electrical and Electronics Engineers (IEEE) 802.11 has commercialized or developed various technological standards since an initial wireless LAN technology is supported using frequencies of 2.4 GHz. First, the IEEE 802.11b supports a communication speed of a maximum of 11 Mbps while using frequencies of a 2.4 GHz band. IEEE 802.11a which is commercialized after the IEEE 802.11b uses frequencies of not the 2.4 GHz band but a 5 GHz band to reduce an influence by interference as compared with the frequencies of the 2.4 GHz band which are significantly congested and improves the communication speed up to a maximum of 54 Mbps by using an OFDM technology. However, the IEEE 802.11a has a disadvantage in that a communication distance is shorter than the IEEE 802.11b. In addition, IEEE 802.11g uses the frequencies of the 2.4 GHz band similarly to the IEEE 802.11b to implement the communication speed of a maximum of 54 Mbps and satisfies backward compatibility to significantly come into the spotlight and further, is superior to the IEEE 802.11a in terms of the communication distance.

Moreover, as a technology standard established to overcome a limitation of the communication speed which is pointed out as a weak point in a wireless LAN, IEEE 802.11n has been provided. The IEEE 802.11n aims at increasing the speed and reliability of a network and extending an operating distance of a wireless network. In more detail, the IEEE 802.11n supports a high throughput (HT) in which a data processing speed is a maximum of 540 Mbps or more and further, is based on a multiple inputs and multiple outputs (MIMO) technology in which multiple antennas are used at both sides of a transmitting unit and a receiving unit in order to minimize a transmission error and optimize a data speed. Further, the standard can use a coding scheme that transmits multiple copies which overlap with each other in order to increase data reliability.

As the supply of the wireless LAN is activated and further, applications using the wireless LAN are diversified, the need for new wireless LAN systems for supporting a higher throughput (very high throughput (VHT)) than the data processing speed supported by the IEEE 802.11n has come into the spotlight. Among them, IEEE 802.11ac supports a wide bandwidth (80 to 160 MHz) in the 5 GHz frequencies. The IEEE 802.11ac standard is defined only in the 5 GHz band, but initial 11ac chipsets will support even operations in the 2.4 GHz band for the backward compatibility with the existing 2.4 GHz band products. Theoretically, according to the standard, wireless LAN speeds of multiple stations are enabled up to a minimum of 1 Gbps and a maximum single link speed is enabled up to a minimum of 500 Mbps. This is achieved by extending concepts of a wireless interface accepted by 802.11n, such as a wider wireless frequency bandwidth (a maximum of 160 MHz), more MIMO spatial streams (a maximum of 8), multi-user MIMO, and high-density modulation (a maximum of 256 QAM). Further, as a scheme that transmits data by using a 60 GHz band instead of the existing 2.4 GHz/5 GHz, IEEE 802.11ad has been provided. The IEEE 802.11ad is a transmission standard that provides a speed of a maximum of 7 Gbps by using a beamforming technology and is suitable for high bit rate moving picture streaming such as massive data or non-compression HD video. However, since it is difficult for the 60 GHz frequency band to pass through an obstacle, it is disadvantageous in that the 60 GHz frequency band can be used only among devices in a short-distance space.

As a wireless LAN standard after 802.11ac and 802.11ad, the IEEE 802.11ax (high efficiency WLAN, HEW) standard for providing a high-efficiency and high-performance wireless LAN communication technology in a high-density environment, in which APs and terminals are concentrated, is in the development completion stage. In an 802.11ax-based wireless LAN environment, communication with high frequency efficiency should be provided indoors/outdoors in the presence of high-density stations and access points (APs), and various technologies have been developed to implement the same.

In order to support new multimedia applications, such as high-definition video and real-time games, the development of a new wireless LAN standard has begun to increase a maximum transmission rate. In IEEE 802.11be (extremely high throughput, EHT), which is a 7th generation wireless LAN standard, development of standards is underway aiming at supporting a transmission rate of up to 30 Gbps via a wider bandwidth, an increased spatial stream, multi-AP cooperation, and the like in a 2.4/5/6 GHz band

DISCLOSURE OF INVENTION

Technical Problem

An embodiment of the present invention is to provide a wireless communication method using a multilink, and a wireless communication terminal using the same.

In addition, an embodiment of the present invention is to provide a station that uses a multi-link and a channel switching method of an AP.

The technical problems to be solved in the present invention are not limited to the above-mentioned technical problems, and other unmentioned technical problems can be clearly understood by those skilled in the art to which the present invention belongs from the description below.

Solution to Problem

A multi-link device (MLD) including multiple stations respectively operating in multiple links of the present invention may include a processor, and the processor is configured to receive a frame for channel switching and/or class switching from a first access point (AP) of an AP MLD including at least one AP, wherein the frame includes at least one of a channel switch announcement element for announcing channel switching and/or class switching of a second AP included in the AP MLD and/or a max channel switch time element related to a time of the channel switching of the second AP, wherein a switch time field included in the max channel switch time element indicates a first time or a second time based on a type of the AP MLD and/or a state of the channel switching, wherein the first time is a maximum time until a first beacon frame on a new channel after a last beacon frame is transmitted from the second AP before the start of the channel switching, and wherein the second time is a time until a predetermined operation of the second AP is performed on the new channel after transmission of the frame, and the processor is configured to recognize the channel switching of the second AP based on the frame.

In addition, in the present invention, when the last beacon frame related to the channel switching is transmitted, the channel switch time field may indicate the second time, and the predetermined operation may be transmission of a first beacon frame on the new channel.

In addition, in the present invention, the channel switch time field may indicate the first time when the channel switching is not started yet.

In addition, in the present invention, the channel switch announcement element may include a new channel number field and a channel switch count field, the channel number field may indicate a location of the new channel, and the channel switch count field may indicate a number of target beacon transmission times (TBTTs) left until channel switching to the new channel.

In addition, in the present invention, the channel switch time field may indicate the second time when the type of the AP MLD is a nonsimultaneous transmit and receive (NSTR) mobile AP MLD that does not support simultaneous transmission/reception.

In addition, in the present invention, the predetermined operation may be resumption of a basic service set (BSS) operation of the second AP on the new channel.

In addition, in the present invention, when the type of the AP MLD is an NSTR mobile AP MLD, the first AP may operate in a primary link and the second AP may operate in a nonprimary link.

In addition, in the present invention, when the type of the AP MLD is an NSTR mobile AP MLD, the state of the channel switching may be determined based on whether the channel switch announcement element or the max channel switch time element is included in the frame.

In addition, in the present invention, when the max channel switch time element is included in the frame and the channel switch announcement element is not included, the state of the channel switching may be determined as an ongoing state.

In addition, in the present invention, when the max channel switch time element is not included in the frame, the state of the channel switching may be determined as a state in which the second AP resumes the BSS operation.

In addition, the present invention provides a method including an operation of receiving a frame for channel switching and/or class switching from a first access point (AP) of an AP MLD including at least one AP, wherein the frame includes at least one of a channel switch announcement element for announcing channel switching and/or class switching of a second AP included in the AP MLD and/or a max channel switch time element related to a time of the channel switching of the second AP, wherein a switch time field included in the max channel switch time element indicates a first time or a second time based on a type of the AP MLD and/or a state of the channel switching, wherein the first time is a maximum time until a first beacon frame on a new channel after a last beacon frame is transmitted from the second AP before the start of the channel switching, and wherein the second time is a time until a predetermined operation of the second AP is performed on the new channel after transmission of the frame, and the method includes an operation of recognizing the channel switching of the second AP based on the frame.

Advantageous Effects of Invention

An embodiment of the present invention provides a wireless communication method efficiently using multiple links and a wireless communication terminal using same.

In addition, a channel changing method according to an embodiment of the present invention specifies the structure of a frame transmitted or received for channel switching, and can effectively perform channel switching.

In addition, depending on whether an AP MLD supports STR or NSTR, the method differently configures the configuration of a frame and information indicated by fields, and can effectively perform channel switching based on whether an AP MLD supports STR.

In addition, the method can efficiently perform channel switching, and can efficiently perform link management.

The effects obtainable in the present invention are not limited to the above-mentioned effects, and other effects that are not mentioned may be clearly understood by those skilled in the art to which the present invention belongs, from descriptions below.

BRIEF DESCRIPTION OF DRAWINGS

FIG. 11 illustrates an example of beacon frame contents transmitted by an AP of an AP MLD, and a target beacon transmission time (TBTT) information field format included in a reduced neighbor report (RNR) element according to an embodiment of the present invention.

FIG. 12 illustrates another example of a TBTT information field format according to an embodiment of the present invention.

FIG. 13 illustrates an example of a TBTT information length subfield indicating a TBTT information field including an MLD AP TBTT offset subfield according to an embodiment of the present invention.

FIG. 14 illustrates an example of a per-STA profile subelement format according to an embodiment of the present invention.

FIG. 17 illustrates an example of formats of elements according to an embodiment of the present invention.

BEST MODE FOR CARRYING OUT THE INVENTION

Terms used in the specification adopt general terms which are currently widely used by considering functions in the present invention, but the terms may be changed depending on an intention of those skilled in the art, customs, and emergence of new technology. Further, in a specific case, there is a term arbitrarily selected by an applicant and in this case, a meaning thereof will be described in a corresponding description part of the invention. Accordingly, it should be revealed that a term used in the specification should be analyzed based on not just a name of the term but a substantial meaning of the term and contents throughout the specification.

Throughout this specification and the claims that follow, when it is described that an element is "coupled" to another element, the element may be "directly coupled" to the other element or "electrically coupled" to the other element through a third element. Further, unless explicitly described to the contrary, the word "comprise" and variations such as "comprises" or "comprising", will be understood to imply the inclusion of stated elements but not the exclusion of any other elements. Moreover, limitations such as "or more" or "or less" based on a specific threshold may be appropriately substituted with "more than" or "less than", respectively.

Hereinafter, in the present invention, a field and a subfield may be interchangeably used.

Figure 1:
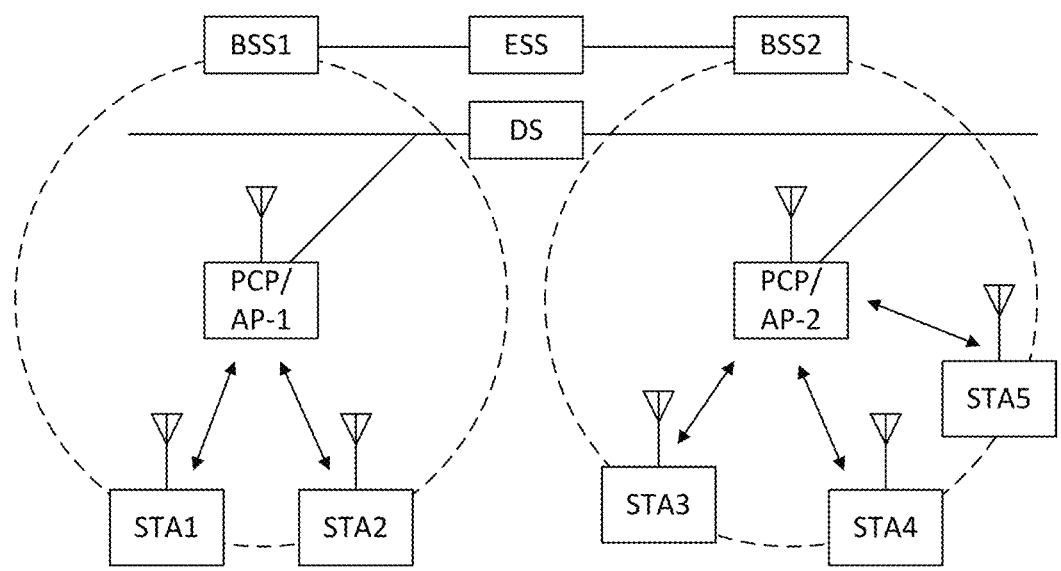
FIG. 1 illustrates a wireless LAN system according to an embodiment of the present invention.

FIG. 1 illustrates a wireless LAN system according to an embodiment of the present invention.

FIG. 1 is a diagram illustrating a wireless LAN system according to an embodiment of the present invention. The wireless LAN system includes one or more basic service sets (BSS) and the BSS represents a set of apparatuses which are successfully synchronized with each other to communicate with each other. In general, the BSS may be classified into an infrastructure BSS and an independent BSS (IBSS) and FIG. 1 illustrates the infrastructure BSS between them.

As illustrated in FIG. 1, the infrastructure BSS (BSS1 and BSS2) includes one or more stations STA1, STA2, STA3, STA4, and STA5, access points AP-1 and AP-2 which are stations providing a distribution service, and a distribution system (DS) connecting the multiple access points AP-1 and AP-2.

The station (STA) is a predetermined device including medium access control (MAC) following a regulation of an IEEE 802.11 standard and a physical layer interface for a wireless medium, and includes both a non-access point (non-AP) station and an access point (AP) in a broad sense. Further, in the present specification, a term 'terminal' may be used to refer to a non-AP STA, or an AP, or to both terms. A station for wireless communication includes a processor and a communication unit and according to the embodiment, may further include a user interface unit and a display unit. The processor may generate a frame to be transmitted through a wireless network or process a frame received through the wireless network and besides, perform various processing for controlling the station. In addition, the communication unit is functionally connected with the processor and transmits and receives frames through the wireless network for the station. According to the present invention, a terminal may be used as a term which includes user equipment (UE).

The access point (AP) is an entity that provides access to the distribution system (DS) via wireless medium for the station associated therewith. In the infrastructure BSS, communication among non-AP stations is, in principle, performed via the AP, but when a direct link is configured, direct communication is enabled even among the non-AP stations. Meanwhile, in the present invention, the AP is used as a concept including a personal BSS coordination point (PCP) and may include concepts including a centralized controller, a base station (BS), a node-B, a base transceiver system (BTS), and a site controller in a broad sense. In the present invention, an AP may also be referred to as a base wireless communication terminal. The base wireless communication terminal may be used as a term which includes an AP, a base station, an eNB (i.e. eNodeB) and a transmission point (TP) in a broad sense. In addition, the base wireless communication terminal may include various types of wireless communication terminals that allocate medium resources and perform scheduling in communication with a plurality of wireless communication terminals.

A plurality of infrastructure BSSs may be connected with each other through the distribution system (DS). In this case, a plurality of BSSs connected through the distribution system is referred to as an extended service set (ESS).

Figure 2:
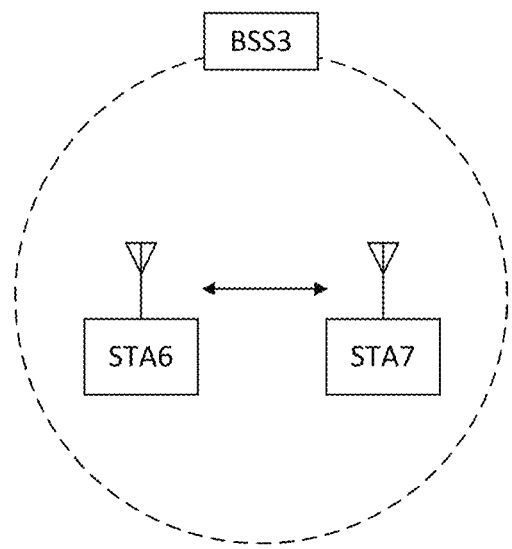
FIG. 2 illustrates a wireless LAN system according to another embodiment of the present invention.

FIG. 2 illustrates an independent BSS which is a wireless LAN system according to another embodiment of the present invention. In the embodiment of FIG. 2, duplicative description of parts, which are the same as or correspond to the embodiment of FIG. 1, will be omitted.

Since a BSS3 illustrated in FIG. 2 is the independent BSS and does not include the AP, all stations STA6 and STA7 are not connected with the AP. The independent BSS is not permitted to access the distribution system and forms a self-contained network. In the independent BSS, the respective stations STA6 and STA7 may be directly connected with each other.

Figure 3:
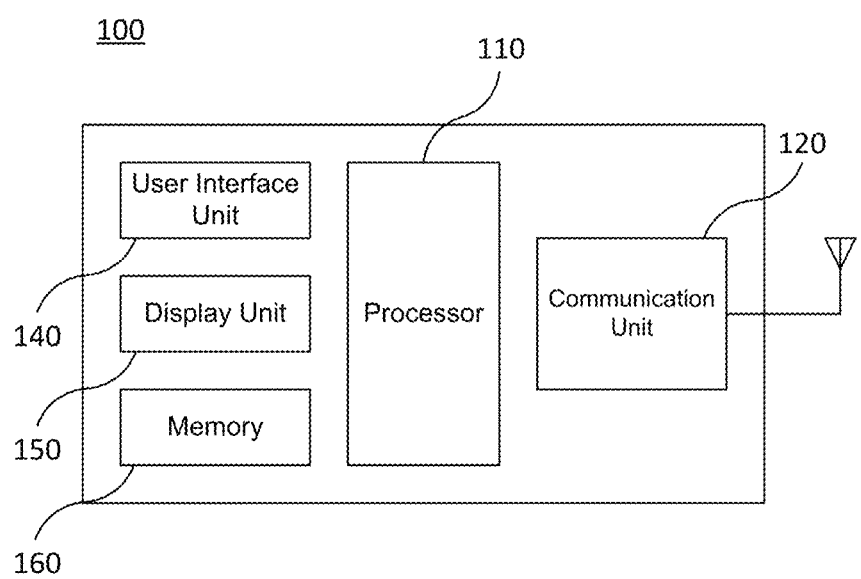
FIG. 3 illustrates a configuration of a station according to an embodiment of the present invention.

FIG. 3 is a block diagram illustrating a configuration of a station 100 according to an embodiment of the present invention. As illustrated in FIG. 3, the station 100 according to the embodiment of the present invention may include a processor 110, a communication unit 120, a user interface unit 140, a display unit 150, and a memory 160.

First, the communication unit 120 transmits and receives a wireless signal such as a wireless LAN packet, or the like and may be embedded in the station 100 or provided as an exterior. According to the embodiment, the communication unit 120 may include at least one communication module using different frequency bands. For example, the communication unit 120 may include communication modules having different frequency bands such as 2.4 GHz, 5 GHz, 6 GHz and 60 GHz. According to an embodiment, the station 100 may include a communication module using a frequency band of 7.125 GHz or more and a communication module using a frequency band of 7.125 GHz or less. The respective communication modules may perform wireless communication with the AP or an external station according to a wireless LAN standard of a frequency band supported by the corresponding communication module. The communication unit 120 may operate only one communication module at a time or simultaneously operate multiple communication modules together according to the performance and requirements of the station 100. When the station 100 includes a plurality of communication modules, each communication module may be implemented by independent elements or a plurality of modules may be integrated into one chip. In an embodiment of the present invention, the communication unit 120 may represent a radio frequency (RF) communication module for processing an RF signal.

Next, the user interface unit 140 includes various types of input/output means provided in the station 100. That is, the user interface unit 140 may receive a user input by using various input means and the processor 110 may control the station 100 based on the received user input. Further, the user interface unit 140 may perform output based on a command of the processor 110 by using various output means.

Next, the display unit 150 outputs an image on a display screen. The display unit 150 may output various display objects such as contents executed by the processor 110 or a user interface based on a control command of the processor 110, and the like. Further, the memory 160 stores a control program used in the station 100 and various resulting data. The control program may include an access program required for the station 100 to access the AP or the external station.

The processor 110 of the present invention may execute various commands or programs and process data in the station 100. Further, the processor 110 may control the respective units of the station 100 and control data transmission/reception among the units. According to the embodiment of the present invention, the processor 110 may execute the program for accessing the AP stored in the memory 160 and receive a communication configuration message transmitted by the AP. Further, the processor 110 may read information on a priority condition of the station 100 included in the communication configuration message and request the access to the AP based on the information on the priority condition of the station 100. The processor 110 of the present invention may represent a main control unit of the station 100 and according to the embodiment, the processor 110 may represent a control unit for individually controlling some component of the station 100, for example, the communication unit 120, and the like. That is, the processor 110 may be a modem or a modulator/demodulator for modulating and demodulating wireless signals transmitted to and received from the communication unit 120. The processor 110 controls various operations of wireless signal transmission/reception of the station 100 according to the embodiment of the present invention. A detailed embodiment thereof will be described below.

The station 100 illustrated in FIG. 3 is a block diagram according to an embodiment of the present invention, where separate blocks are illustrated as logically distinguished elements of the device. Accordingly, the elements of the device may be mounted in a single chip or multiple chips depending on design of the device. For example, the processor 110 and the communication unit 120 may be implemented while being integrated into a single chip or implemented as a separate chip. Further, in the embodiment of the present invention, some components of the station 100, for example, the user interface unit 140 and the display unit 150 may be optionally provided in the station 100.

Figure 4:
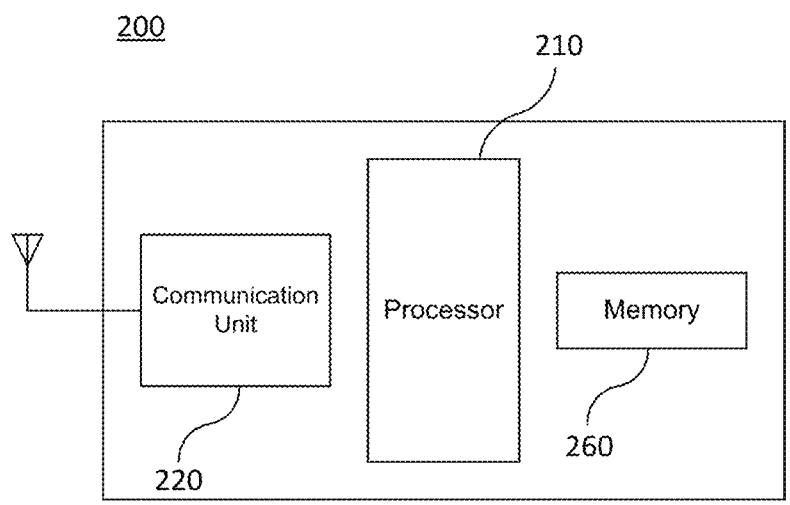
FIG. 4 illustrates a configuration of an access point according to an embodiment of the present invention.

FIG. 4 is a block diagram illustrating a configuration of an AP 200 according to an embodiment of the present invention. As illustrated in FIG. 4, the AP 200 according to the embodiment of the present invention may include a processor 210, a communication unit 220, and a memory 260. In FIG. 4, among the components of the AP 200, duplicative description of parts which are the same as or correspond to the components of the station 100 of FIG. 2 will be omitted.

Referring to FIG. 4, the AP 200 according to the present invention includes the communication unit 220 for operating the BSS in at least one frequency band. As described in the embodiment of FIG. 3, the communication unit 220 of the AP 200 may also include a plurality of communication modules using different frequency bands. That is, the AP 200 according to the embodiment of the present invention may include two or more communication modules among different frequency bands, for example, 2.4 GHz, 5 GHz, 6 GHz and 60 GHz together. Preferably, the AP 200 may include a communication module using a frequency band of 7.125 GHz or more and a communication module using a frequency band of 7.125 GHz or less. The respective communication modules may perform wireless communication with the station according to a wireless LAN standard of a frequency band supported by the corresponding communication module. The communication unit 220 may operate only one communication module at a time or simultaneously operate multiple communication modules together according to the performance and requirements of the AP 200. In an embodiment of the present invention, the communication unit 220 may represent a radio frequency (RF) communication module for processing an RF signal.

Next, the memory 260 stores a control program used in the AP 200 and various resulting data. The control program may include an access program for managing the access of the station. Further, the processor 210 may control the respective units of the AP 200 and control data transmission/reception among the units. According to the embodiment of the present invention, the processor 210 may execute the program for accessing the station stored in the memory 260 and transmit communication configuration messages for one or more stations. In this case, the communication configuration messages may include information about access priority conditions of the respective stations. Further, the processor 210 performs an access configuration according to an access request of the station. According to an embodiment, the processor 210 may be a modem or a modulator/demodulator for modulating and demodulating wireless signals transmitted to and received from the communication unit 220. The processor 210 controls various operations such as wireless signal transmission/reception of the AP 200 according to the embodiment of the present invention. A detailed embodiment thereof will be described below.

Figure 5:
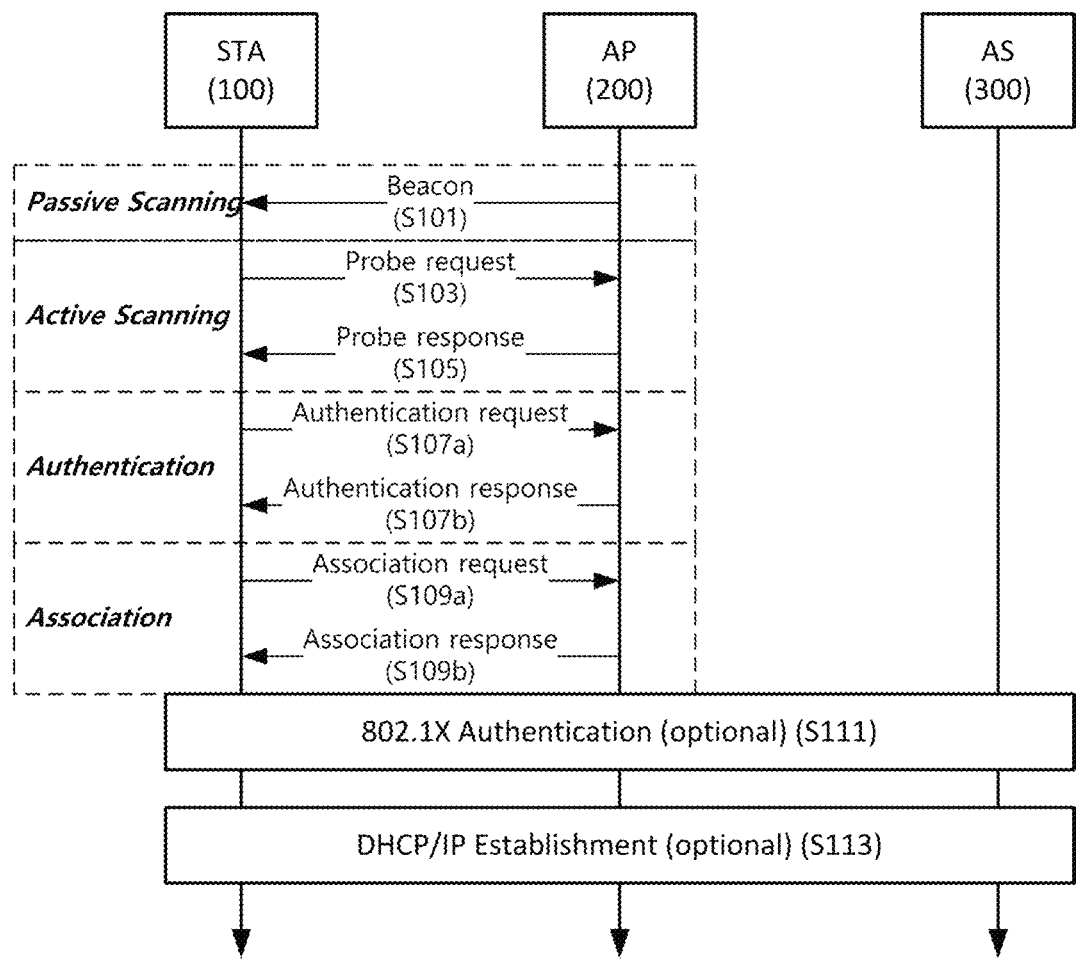
FIG. 5 schematically illustrates a process in which a STA and an AP set a link.

FIG. 5 is a diagram schematically illustrating a process in which a STA sets a link with an AP.

Referring to FIG. 5, the link between the STA 100 and the AP 200 is set through three steps of scanning, authentication, and association in a broad way. First, the scanning step is a step in which the STA 100 obtains access information of BSS operated by the AP 200. A method for performing the scanning includes a passive scanning method in which the AP 200 obtains information by using a beacon message (S101) which is periodically transmitted and an active scanning method in which the STA 100 transmits a probe request to the AP (S103) and obtains access information by receiving a probe response from the AP (S105).

The STA 100 that successfully receives wireless access information in the scanning step performs the authentication step by transmitting an authentication request (S107a) and receiving an authentication response from the AP 200 (S107b). After the authentication step is performed, the STA 100 performs the association step by transmitting an association request (S109a) and receiving an association response from the AP 200 (S109b). In this specification, an association basically means a wireless association, but the present invention is not limited thereto, and the association may include both the wireless association and a wired association in a broad sense.

Meanwhile, an 802.1X based authentication step (S111) and an IP address obtaining step (S113) through DHCP may be additionally performed. In FIG. 5, the authentication server 300 is a server that processes 802.1X based authentication with the STA 100 and may be present in physical association with the AP 200 or present as a separate server.

Figure 6:
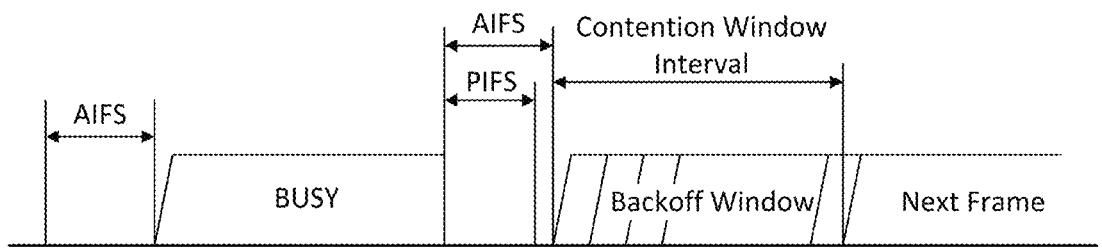
FIG. 6 illustrates a carrier sense multiple access (CSMA)/collision avoidance (CA) method used in wireless LAN communication.

FIG. 6 is a diagram illustrating a carrier sense multiple access (CSMA)/collision avoidance (CA) method used in wireless LAN communication.

A terminal that performs a wireless LAN communication checks whether a channel is busy by performing carrier sensing before transmitting data. When a wireless signal having a predetermined strength or more is sensed, it is determined that the corresponding channel is busy and the terminal delays the access to the corresponding channel. Such a process is referred to as clear channel assessment (CCA) and a level to decide whether the corresponding signal is sensed is referred to as a CCA threshold. When a wireless signal having the CCA threshold or more, which is received by the terminal, indicates the corresponding terminal as a receiver, the terminal processes the received wireless signal. Meanwhile, when a wireless signal is not sensed in the corresponding channel or a wireless signal having a strength smaller than the CCA threshold is sensed, it is determined that the channel is idle.

When it is determined that the channel is idle, each terminal having data to be transmitted performs a backoff procedure after an inter frame space (IFS) time depending on a situation of each terminal, for instance, an arbitration IFS (AIFS), a PCF IFS (PIFS), or the like elapses. According to the embodiment, the AIFS may be used as a component which substitutes for the existing DCF IFS (DIFS). Each terminal stands by while decreasing slot time(s) as long as a random number determined by the corresponding terminal during an interval of an idle state of the channel and a terminal that completely exhausts the slot time(s) attempts to access the corresponding channel. As such, an interval in which each terminal performs the backoff procedure is referred to as a contention window interval. In this case, the random number may be referred to as a backoff counter. That is, an initial value of the backoff counter is configured by an integer corresponding to a random number acquired by the terminal. When the terminal detects that the channel is idle during a slot time, the terminal may reduce the backoff counter by 1. In addition, when the backoff counter reaches 0, the terminal may be allowed to perform channel access in the corresponding channel. Accordingly, when the channel is idle for a slot time of the backoff counter or an AIFS time, transmission of the terminal may be allowed.

When a specific terminal successfully accesses the channel, the corresponding terminal may transmit data through the channel. However, when the terminal which attempts the access collides with another terminal, the terminals which collide with each other are assigned with new random numbers, respectively to perform the backoff procedure again. According to an embodiment, a random number newly assigned to each terminal may be decided within a range (2*CW) which is twice larger than a range (a contention window, CW) of a random number which the corresponding terminal is previously assigned. Meanwhile, each terminal attempts the access by performing the backoff procedure again in a next contention window interval and in this case, each terminal performs the backoff procedure from slot time(s) which remained in the previous contention window interval. By such a method, the respective terminals that perform the wireless LAN communication may avoid a mutual collision for a specific channel.

<Examples of Various PPDU Formats>

Figure 7:
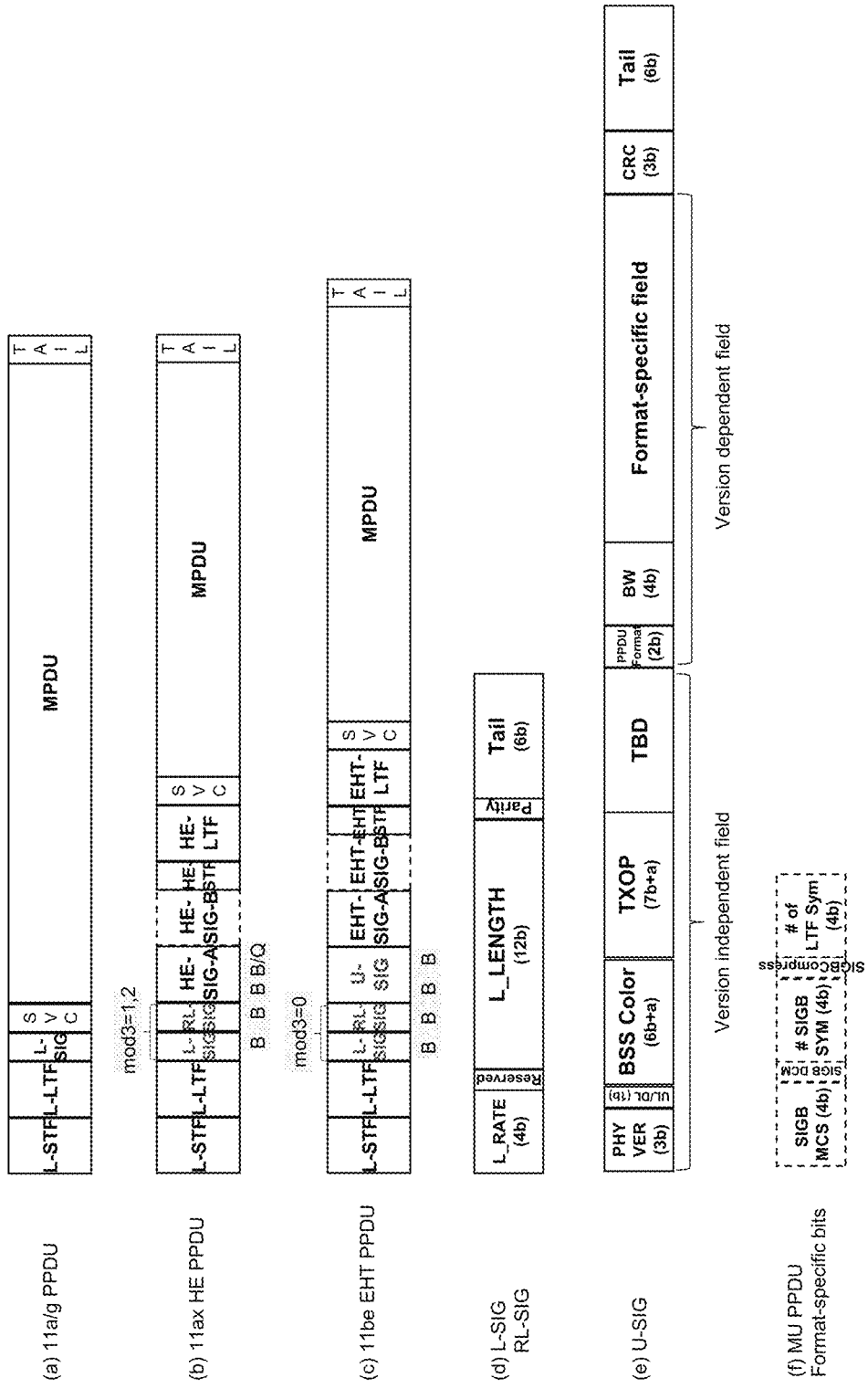
FIG. 7 illustrates an example of a format of a PLCP Protocol data unit (PPDU) for each of various standard generations.

FIG. 7 illustrates an example of a format of a PLCP Protocol data unit (PPDU) for each of various standard generations. More specifically, FIG. 7(a) illustrates an embodiment of a legacy PPDU format based on 802.11a/g, FIG. 7(b) illustrates an embodiment of an HE PPDU format based on 802.11ax, and FIG. 7(c) illustrates an embodiment of a non-legacy PPDU (i.e., EHT PPDU) format based on 802.11be. FIG. 7(d) illustrates detailed field configurations of RL-SIG and L-SIG commonly used in the PPDU formats.

Referring to FIG. 7(a), a preamble of the legacy PPDU includes a legacy short training field (L-STF), a legacy long training field (L-LTF), and a legacy signal field (L-SIG). In an embodiment of the present invention, the L-STF, the L-LTF, and the L-SIG may be referred to as a legacy preamble.

Referring to FIG. 7(b), a preamble of the HE PPDU additionally includes, in the legacy preamble, a repeated legacy short training field (RL-SIG), a high efficiency signal A field (HE-SIG-A), a high efficiency signal B field (HE-SIG-B), a high efficiency short training field (HE-STF), and a high efficiency long training field (HE-LTF). In an embodiment of the present invention, the RL-SIG, HE-SIG-A, the HE-SIG-B, the HE-STF and the HE-LTF may be referred to as an HE preamble. A specific configuration of the HE preamble may be modified according to an HE PPDU format. For example, HE-SIG-B may be used only in an HE MU PPDU format.

Referring to FIG. 7(c), a preamble of the EHT PPDU additionally includes, in the legacy preamble, a repeated legacy short training field (RL-SIG), a universal signal field (U-SIG), and an extremely high throughput signal A field (EHT-SIG-A), an extremely high throughput signal B field (EHT-SIG-B), an extremely high throughput short training field (EHT-STF), and an extremely high throughput long training field (EHT-LTF). In an embodiment of the present invention, the RL-SIG, EHT-SIG-A, the EHT-SIG-B, the EHT-STF and the EHT-LTF may be referred to as an EHT preamble. A specific configuration of a non-legacy preamble may be modified according to an EHT PPDU format. For example, EHT-SIG-A and EHT-SIG-B may be used only in a part of the EHT PPDU format.

64-FFT OFDM is applied in an L-SIG field included in the preamble of the PPDU, and the L-SIG field includes a total of 64 subcarriers. Among 64 subcarriers, 48 subcarriers excluding a guard subcarrier, a DC subcarrier, and a pilot subcarrier are used for transmission of L-SIG data. BPSK and a modulation and coding scheme (MCS) of rate=1/2 are applied in L-SIG, and therefore the L-SIG may include a total of 24 bits of information. FIG. 7(d) illustrates a 24-bit information configuration of L-SIG.

Referring to FIG. 7(d), the L-SIG includes an L_RATE field and an L_LENGTH field. The L_RATE field includes 4 bits and indicates an MCS used for data transmission. Specifically, the L_RATE field indicates one value among transmission rates of 6/9/12/18/24/36/48/54 Mbps obtained by combining a modulation scheme of BPSK/QPSK/16-QAM/64-QAM, etc. and an inefficiency of ½, ⅔, ¾, etc. A total length of a corresponding PPDU may be indicated by combining information of the L_RATE field and information of the L_LENGTH field. In a non-legacy PPDU format, the L_RATE field is configured to a minimum rate of 6 Mbps.

A unit of the L_LENGTH field is a byte and a total of 12 bits are allocated to signal up to 4095, and a length of the PPDU may be indicated in combination with the L_RATE field. A legacy terminal and a non-legacy terminal may interpret the L_LENGTH field in different ways.

Firstly, a method of interpreting the length of the PPDU by the legacy terminal and the non-legacy terminal by using the L_LENGTH field is described below. When a value of the L_RATE field is configured to indicate 6 Mbps, 3 bytes during 4 us which is one symbol duration of 64 FFT (i.e., 24 bits) may be transmitted. Therefore, the 64 FFT standard symbol number after an L-SIG is acquired by adding 3 bytes corresponding to a SVC field and a Tail field to the L_LENGTH field value and then dividing the same by 3 bytes which is a transmission amount of one symbol. When multiplying the acquired symbol number by 4 us which is one symbol duration and then adding 20 us which is consumed to transmit the L-STF, the L-LTF, and the L-SIG, the length of a corresponding PPDU, i.e., a receipt time (RX-TIME) is acquired, which is expressed by Equation 1 below.

$$RXTIME(us) = \left(\left\lceil \frac{L\_LENGTH + 3}{3} \right\rceil\right) \times 4 + 20 \quad \text{[Equation 1]}$$

In this case, $\lceil x \rceil$ denotes the smallest natural number greater than or equal to x. Since the maximum value of the L_LENGTH field is 4095, the length of the PPDU can be set up to 5.464 ms. The non-legacy terminal transmitting the PPDU should set the L_LENGTH field as shown in Equation 2 below.

$$L\_LENGTH(byte) = \left(\left\lceil \frac{TXTIME - 20}{4} \right\rceil\right) \times 3 - 3 \quad \text{[Equation 2]}$$

Herein, TXTIME is the total transmission time constituting the corresponding PPDU, and is expressed by Equation 3 below. In this case, TX represents the transmission time of X.

$$\begin{aligned}TXTIME(us) = \quad & \text{[Equation 3]} \\ T_{L-STF} + T_{L-LTF} + T_{L-SIG} + T_{RL-SIG} + T_{U-SIG} + (T_{EHT-SIG-A}) + \\ (T_{EHT-SIG-B}) + T_{EHT-STF} + N_{EHT-LTF} \cdot T_{EHT-LTF} + T_{DATA}\end{aligned}$$

Referring to the above equations, the length of the PPDU is calculated based on a rounded up value of L_LENGTH/3. Therefore, for a random value of k, three different values of L_LENGTH={3k+1, 3k+2, 3 (k+1)} indicate the same PPDU length.

Referring to FIG. 7(e), a universal SIG (U-SIG) field continues to exist in an EHT PPDU and a WLAN PPDU of a subsequent generation, and serves to classify a generation of a PPDU, which includes 11be. U-SIG is a 64 FFT-based OFDM 2 symbol and may transfer a total of 52 bits of information. In 52 bits, 43 bits excluding 9 bits for CRC/Tail are largely divided into a version independent (VI) field and a version dependent (VD) field.

A VI bit enables a current bit configuration to be maintained even later on, so that even if a PPDU of a subsequent generation is defined, current 11be terminals may obtain information on the PPDU via the VI fields of the PPDU. To this end, the VI field includes PHY version, UL/DL, BSS color, TXOP, and reserved fields. The PHY version field is 3 bits, and serves to sequentially classify 11be and subsequent generation wireless LAN standards into versions. 11be has a value of 000b. The UL/DL field identifies whether the PPDU is an uplink/downlink PPDU. BSS color indicates an identifier for each BSS defined in 11ax, and has a value of 6 bits or more. TXOP indicates transmit opportunity duration transmitted in a MAC header, wherein, by adding the TXOP to a PHY header, the PPDU may infer a length of the TXOP included therein without having to decode an MPDU, and the TXOP has a value of 7 bits or more.

The VD field is signaling information useful only for an 11be version of the PPDU, and may include a field commonly used in any PPDU format, such as PPDU format and BW, and a field defined differently for each PPDU format. The PPDU format is a classifier that classifies EHT single user (SU), EHT multiple user (MU), EHT trigger-based (TB), EHT extended range (ER) PPDU, etc. The BW field signals five basic PPDU BW options (BW, which is expressible in the form of an exponential power of 20*2, may be referred to as basic BW) of 20, 40, 80, 160 (80+80), and 320 (160+160) MHz and various remaining PPDU BWs configured via preamble puncturing. After being signaled at 320 MHz, signaling may be performed in a form in which some 80 MHz is punctured. A punctured and modified channel type may be signaled directly in the BW field, or may be signaled using the BW field with a field (e.g., a field within the EHT-SIG field) appearing after the BW field. If the BW field is configured to 3 bits, a total of 8 BW signaling may be performed, and therefore only up to 3 signaling may be performed in a puncturing mode. If the BW field is configured to 4 bits, a total of 16 BW signaling may be performed, and therefore up to 11 signaling may be performed in the puncturing mode.

A field located after the BW field varies depending on the type and format of the PPDU, an MU PPDU and an SU PPDU may be signaled in the same PPDU format, a field for classification between the MU PPDU and the SU PPDU may be located before an EHT-SIG field, and additional signaling may be performed for the same. Both the SU PPDU and the MU PPDU include the EHT-SIG field, but some fields that are not required in the SU PPDU may be compressed. Information on the field to which the compression has been applied may be omitted or may have a size smaller than a size of an original field included in the MU PPDU. For example, in a case of the SU PPDU, a common field of the EHT-SIG may be omitted or replaced, or the SU PPDU may have a different configuration in which a user specific field is replaced, reduced to one, or the like.

Alternatively, the SU PPDU may further include a compression field indicating whether compression is performed, and a part of field (e.g., RA fields, etc.) may be omitted according to a value of the compressed field.

If a part of the EHT-SIG field of the SU PPDU is compressed, information to be included in the compressed field may be signaled also in an uncompressed field (e.g., the common field, etc.). The MU PPDU corresponds to a PPDU format for concurrent reception by multiple users, and therefore the EHT-SIG field is required to be transmitted subsequently to the U-SIG field, and the amount of signaled information may vary. That is, a plurality of MU PPDUs are transmitted to a plurality of STAs, so that the respective STAs should recognize locations of RUs, at which the MU PPDUs are transmitted, the STAs to which the RUs have been allocated respectively, and whether the transmitted MU PPDUs have been transmitted to the STAs themselves. Therefore, an AP should transmit information described above, by including the same in the EHT-SIG field. To this end, information for efficient transmission of the EHT-SIG field is signaled in the U-SIG field, and this may correspond to an MCS that is a modulation method and/or the number of symbols in the EHT-SIG field. The EHT-SIG field may include information on a size and location of an RU allocated to each user.

In the case of the SU PPDU, a plurality of RUs may be allocated to an STA, and the plurality of RUs may be continuous or discontinuous. If the RUs allocated to the STA are discontinuous, the STA should recognize a punctured RU in the middle in order to efficiently receive the SU PPDU. Accordingly, the AP may transmit the SU PPDU including information (e.g., a puncturing pattern of the RUs, etc.) of punctured RUs among the RUs allocated to the STA. That is, in the case of the SU PPDU, a puncturing mode field, which includes information indicating, in a bitmap format, etc., a puncturing pattern and whether the puncturing mode is applied, may be included in the EHT-SIG field, and the puncturing mode field may signal a discontinuous channel type appearing within a bandwidth.

The signaled discontinuous channel type is limited, and indicates discontinuous channel information and BW of the SU PPDU in combination with a value of the BW field. For example, the SU PPDU is a PPDU transmitted only to a single terminal, so that the STA may recognize a bandwidth allocated to itself via the BW field included in the PPDU, and the SU PPDU may recognize a punctured resource in the allocated bandwidth via the puncturing mode field of the EHT-SIG field or the U-SIG field included in the PPDU. In this case, the terminal may receive the PPDU in resource units remaining after excluding a specific channel of the punctured resource unit. The plurality of RUs allocated to the STA may be configured by different frequency bands or tones.

Only a limited discontinuous channel type is signaled in order to reduce signaling overhead of the SU PPDU. Puncturing may be performed for each 20 MHz sub-channel, so that if puncturing is performed for BW having a large number of 20 MHz sub-channels, such as 80, 160, and 320 MHz, a discontinuous channel (if puncturing of only edge 20 MHz is considered to be discontinuous) type should be signaled in the case of 320 MHz by expressing whether each of 15 20 MHz sub-channels remaining after excluding a primary channel is used. As such, allocating 15 bits to signal a discontinuous channel type of single user transmission may act as excessively large signaling overhead in consideration of a low transmission rate of a signaling part.

The present disclosure suggests a signaling technique of a discontinuous channel type of the SU PPDU and illustrates the discontinuous channel type determined according to the suggested technique. In addition, the present disclosure suggests a signaling technique of a puncturing type of each of a primary 160 MHz and a secondary 160 MHz in 320 MHz BW configuration of the SU PPDU.

In addition, an embodiment of the present disclosure suggests a technique which differs in the configuration of the PPDU indicating the preamble puncturing BW values according to the PPDU format signaled in the PPDU format field. If the length of the BW field is 4 bits, in case of the EHT SU PPDU or the TB PPDU, the EHT-SIG-A of 1 symbol may be additionally signaled after the U-SIG, or the EHT-SIG-A may be never signaled, so that by considering this, it is necessary to completely signal a maximum of 11 puncturing modes through only the BW field of the U-SIG. However, in case of the EHT MU PPDU, since the EHT-SIG-B is additionally signaled after the U-SIG, the maximum of 11 puncturing modes may be signaled by a method different from the SU PPDU. In case of the EHT ER PPDU, the BW field is configured as 1 bit to signal information on whether the PPDU uses 20 MHz or 10 MHz band.

FIG. 7(f) illustrates a configuration of a format-specific field of a VD field when the EHT MU PPDU is indicated in the PPDU format field of U-SIG. In the case of the MU PPDU, SIG-B, which is a signaling field for concurrent reception by multiple users, is essentially required, and SIG-B may be transmitted without separate SIG-A after U-SIG. To this end, information for decoding of SIG-B should be signaled in U-SIG. These fields include SIG-B MCS, SIG-B DCM, Number of SIG-B Symbols, SIG-B Compression, and Number of EHT-LTF Symbols.

Figure 8:
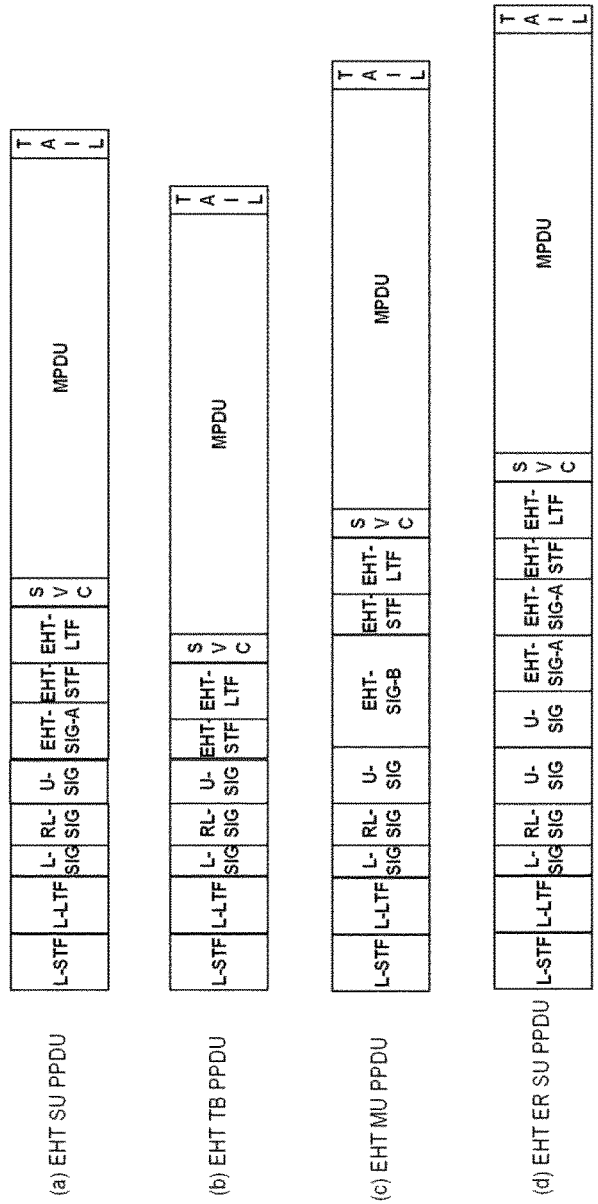
FIG. 8 illustrates an example of various extremely high throughput (EHT) physical protocol data unit (PPDU) formats and a method for indicating the same according to an embodiment of the present invention.

FIG. 8 illustrates an example of various extremely high throughput (EHT) physical protocol data unit (PPDU) formats and a method for indicating the same according to an embodiment of the present invention.

Referring to FIG. 8, a PPDU may include a preamble and a data part, and an EHT PPDU format, that is a PPDU type, may be classified according to a U-SIG field included in the preamble. Specifically, based on a PPDU format field included in the U-SIG field, whether the format of the PPDU is an EHT PPDU may be indicated.

FIG. 8(a) shows an example of an EHT SU PPDU format for a single STA. An EHT SU PPDU is a PPDU used for single user (SU) transmission between an AP and a single STA, and an EHT-SIG-A field for additional signaling may be located after the U-SIG field.

FIG. 8(b) shows an example of an EHT trigger-based PPDU format which corresponds to an EHT PPDU transmitted based on a trigger frame. An EHT Trigger-based PPDU is an EHT PPDU transmitted based on a trigger frame and is an uplink PPDU used for a response to the trigger frame. Unlike in the EHT SU PPDU, an EHT-SIG-A field is not located after a U-SIG field in the EHT PPDU.

FIG. 8(c) shows an example of an EHT MU PPDU format which corresponds to an EHT PPDU for multiple users. An EHT MU PPDU is a PPDU used to transmit the PPDU to one or more STAs. In the EHT MU PPDU format, an HE-SIG-B field may be located after a U-SIG field.

FIG. 8(d) shows an example of an EHT ER SU PPDU format used for single user transmission with an STA in an extended range. An EHT ER SU PPDU may be used for single user transmission with an STA of a wider range compared to the EHT SU PPDU described in FIG. 8(a), and a U-SIG field may be repeatedly located on a time axis.

The EHT MU PPDU described in FIG. 8(c) may be used by an AP to perform downlink transmission to a plurality of STAs. Here, the EHT MU PPDU may include scheduling information so that the plurality of STAs may concurrently receive the PPDU transmitted from the AP. The EHT MU PPDU may transfer, to the STAs, AID information of a transmitter and/or a receiver of the PPDU transmitted via a user specific field of EHT-SIG-B. Accordingly, the plurality of terminals having received the EHT MU PPDU may perform a spatial reuse operation based on the AID information of the user specific field included in a preamble of the received PPDU.

Specifically, a resource unit allocation (RA) field of the HE-SIG-B field included in the HE MU PPDU may include information on a configuration of a resource unit (e.g., a division form of the resource unit) in a specific bandwidth (e.g., 20 MHz, etc.) of a frequency axis. That is, the RA field may indicate configurations of resource units segmented in a bandwidth for transmission of the HE MU PPDU, in order for the STA to receive the PPDU. Information on the STA allocated (or designated) to each segmented resource unit may be included in the user specific field of EHT-SIG-B so as to be transmitted to the STA. That is, the user specific field may include one or more user fields corresponding to the respective segmented resource units.

For example, a user field corresponding to at least one resource unit used for data transmission among the plurality of segmented resource units may include an AID of a receiver or a transmitter, and a user field corresponding to the remaining resource unit(s) which is not used for data transmission may include a preconfigured null STA ID.

For convenience of description, a frame or a MAC frame may be interchangeably used with an MPDU in the disclosure.

When one wireless communication device communicates by using multiple links, the communication efficiency of the wireless communication device may be increased. In this case, the link, as a physical path, may be configured as one wireless medium that can be used to deliver a MAC service data unit (MSDU). For example, in a case where a frequency band of one of the links is in use by another wireless communication device, the wireless communication device may continue to perform communication through another link. As such, the wireless communication device may usefully use multiple channels. In addition, when the wireless communication device simultaneously performs communication using multiple links, the overall throughput may be increased. However, in the existing wireless LAN, it has been stipulated that one wireless communication device uses one link. Therefore, a wireless LAN operation method for using multiple links is required. A wireless communication method of a wireless communication device using multiple links will be described through FIGS. 9 to 26. First, a specific form of a wireless communication device using multiple links will be described through FIG. 9.

Figure 9:
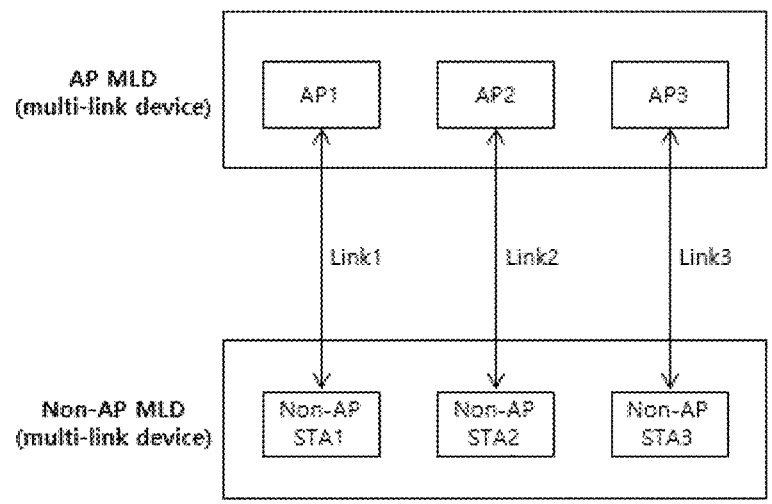
FIG. 9 illustrates a multi-link device according to an embodiment of the present invention.

FIG. 9 illustrates a multi-link device according to an embodiment of the present invention.

A multi-link device (MLD) may be defined for a wireless communication method using the multiple links described above. The multi-link device may represent a device having one or more affiliated stations. According to a specific embodiment, the multi-link device may represent a device having two or more affiliated stations. In addition, the multi-link device may exchange multi-link elements. The multi-link element includes information on one or more stations or one or more links. The multi-link element may include a multi-link setup element, which will be described below. In this case, the multi-link device may be a logical entity. Specifically, the multi-link device may have multiple affiliated stations. The multi-link device may be referred to as a multi-link logical entity (MLLE) or a multi-link entity (MLE). The multi-link device may have one medium access control (MAC) service access point (SAP) up to logical link control (LLC). In addition, the MLD may also have one MAC data service.

The multiple stations included in the multi-link device may operate in multiple links. In addition, the multiple stations included in the multi-link device may operate on multiple channels. Specifically, the multiple stations included in the multi-link device may operate in multiple different links or on multiple different channels. For example, the multiple stations included in the multi-link device may operate on multiple different channels of 2.4 GHz, 5 GHz, and 6 GHz.

The operation of the multi-link device may be referred to as a multi-link operation, an MLD operation, or a multi-band operation. In addition, when a station affiliated with the multi-link device is an AP, the multi-link device may be referred to as the AP MLD. In addition, when a station affiliated with the multi-link device is a non-AP station, the multi-link device may be referred to as a non-AP MLD.

FIG. 9 illustrates an operation in which a non-AP MLD and an AP-MLD communicate with each other. Specifically, the non-AP MLD and the AP-MLD perform communication by using three links, respectively. The AP MLD includes a first AP (AP 1), a second AP (AP 2), and a third AP (AP 3).

The non-AP MLD includes a first non-AP STA (non-AP STA 1), a second non-AP STA (non-AP STA 2), and a third non-AP STA (non-AP STA 3). The first AP (AP 1) and the first non-AP STA (non-AP STA 1) communicate through a first link (Link 1). In addition, the second AP (AP 2) and the second non-AP STA (non-AP STA 2) communicate through a second link (Link 2). In addition, the third AP (AP 3) and the third non-AP STA (non-AP STA 3) communicate through a third link (Link 3).

The multi-link operation may include a multi-link setup operation. The multi-link setup may correspond to an association operation of the single link operation described above and may need to be performed first for frame exchange in the multiple links. The multi-link device may obtain information necessary for the multi-link setup from a multi-link setup element. Specifically, the multi-link setup element may include capability information associated with the multiple links. In this case, the capability information may include information indicating whether any one of multiple of devices included in the multi-link device performs transmission and simultaneously, another device may perform reception. In addition, the capability information may include information on the links available for each station included in the MLD. In addition, the capability information may include information on the channels available for each station included in the MLD.

The multi-link setup may be set up through agreement between peer stations. Specifically, the multi-link setup may be performed through communication between stations without communication with the AP. In addition, the multi-link setup may be set up through any one link. For example, even if the first link to the third link are set up through the multi-link, the multi-link setup may be performed through the first link.

In addition, a mapping between a traffic identifier (TID) and a link may be set up. Specifically, frames corresponding to a TID of a particular value may only be exchanged through a pre-specified link. The mapping between the TID and the link may be performed as a directional-based setup. For example, when multiple links are set up between a first multi-link device and a second multi-link device, the first multi-link device may be set up to transmit a frame of the first TID to the multiple first links, and the second multi-link device may be set up to transmit a frame of the second TID to the first link. In addition, there may be a default setup for the mapping between the TID and the link. Specifically, when there is no additional setup in the multi-link setup, the multi-link device may exchange frames corresponding to the TID at each link according to the default setup. In this case, the default setup may be that all the TIDs are exchanged in any one link.

A TID will be described in detail. The TID is an ID for classifying traffic and data in order to support quality of service (QOS). In addition, the TID may be used or allocated in a higher layer than a MAC layer. In addition, the TID may indicate a traffic category (TC) or a traffic stream (TS). In addition, the TID may be classified as 16 types. For example, the TID may be designated as one of the values in the range from 0 to 15. A TID value to be used may be differently designated according to an access policy and a channel access or medium access method. For example, in a case that enhanced distributed channel access (EDCA) or hybrid coordination function contention-based channel access (HCAF) is used, the TID may be allocated with a value in the range of 0 to 7. In a case where the EDCA is used, the TID may indicate a user priority (UP). In this case, the UP may be designated according to a TC or a TS. The UP may be allocated in a higher layer than MAC. In addition, in a case where HCF controlled channel access (HCCA) or SPCA is used, the TID may be allocated with a value in the range of 8 to 15. In a case where the HCCA or SPCA is used, the TID may indicate a TSID. In addition, in a case where the HEMM or the SEMM is used, the TID may be allocated with a value in the range of 8 to 15. In a case where the HEMM or SEMM is used, the TID may indicate a TSID.

A UP and an AC may be mapped. The AC may be a label for providing a QoS in EDCA. The AC may be a label for indicating an EDCA parameter set. An EDCA parameter or an EDCA parameter set may be a parameter used for EDCA channel contention. A QoS station may guarantee a QoS using the AC. In addition, the AC may include AC_BK, AC_BE, AC_VI, and AC_VO. The AC_BK, AC_BE, AC_VI, and AC_VO may indicate a background, a best effort, a video, and a voice, respectively. In addition, each of the AC_BK, AC_BE, AC_VI, and AC_VO may be classified into subordinate ACs. For example, the AC_VI may be subdivided into AC_VI primary and AC_VI alternate. In addition, the AC_VO may be subdivided into AC_VO primary and AC_VO alternate. In addition, a UP or a TID may be mapped to an AC. For example, a UP or TID having a value of 1, 2, 0, 3, 4, 5, 6, and 7 may be mapped to AC_BK, AC_BK, AC_BE, AC_BE, AC_VI, AC_VI, AC_VO, and AC_VO, respectively. In addition, a UP or TID having a value of 1, 2, 0, 3, 4, 5, 6, and 7 may be mapped to AC_BK, AC_BK, AC_BE, AC_BE, AC_VI alternate, AC_VI primary, AC_VO primary, and AC_VO alternate, respectively. In addition, a UP or TID having a value of 1, 2, 0, 3, 4, 5, 6, and 7 may sequentially have higher priorities. That is, 1 denotes a low priority and 7 denotes a high priority. Therefore, AC_BK, AC_BE, AC_VI, and AC_VO may sequentially have higher priorities. In addition, AC_BK, AC_BE, AC_VI, and AC_VO may correspond to an AC index (ACI) 0, 1, 2, and 3, respectively. Due to such characteristics of a TID, a mapping between a TID and a link may indicate a mapping between an AC and a link. In addition, a mapping between a link and an AC may indicate a mapping between a TID and a link.

As described above, a TID may be mapped to each of multiple links. The mapping may be designating a link in which traffic corresponding to a predetermined TID or AC can be exchanged. In addition, a TID or AC that is transmittable for each transmission direction in a link may be designated. As described above, there may be a default setup for a mapping between a TID and a link. Specifically, in a case where there is no additional setup for a multi-link setup, a multi-link device may exchange a frame corresponding to a TID in each link according to the default setup. In this case, the default setup may be exchanging all TIDs in any one link. Any TID or AC at any time point may be always mapped to at least any one link. A management frame and a control frame may be transmitted in all links.

In a case where a link is mapped to a TID or an AC, only a data frame corresponding to the TID or AC mapped to the corresponding link may be transmitted in the corresponding link. Therefore, in a case where a link is mapped to a TID or an AC, a frame that does not correspond to the TID or AC mapped to the corresponding link may not be transmitted in the corresponding link. In a case where a link is mapped to a TID or an AC, an ACK may also be transmitted on the basis of the link to which the TID or the AC is mapped. For example, a block ACK agreement may be determined on the basis of a mapping between a TID and a link. According to another embodiment, a mapping between a TID and a link may be determined on the basis of a block ACK agreement. Particularly, a block ACK agreement may be set up for a TID mapped to a particular link.

A QOS may be guaranteed via the above-described mapping between a TID and a link. Specifically, an AC or TID having a high priority may be mapped to a link in which a relatively small number of stations operate or a link having a good channel condition. In addition, via the above-described mapping between a TID and a link, a station may maintain a power-saving state for a longer time interval.

Figure 10:
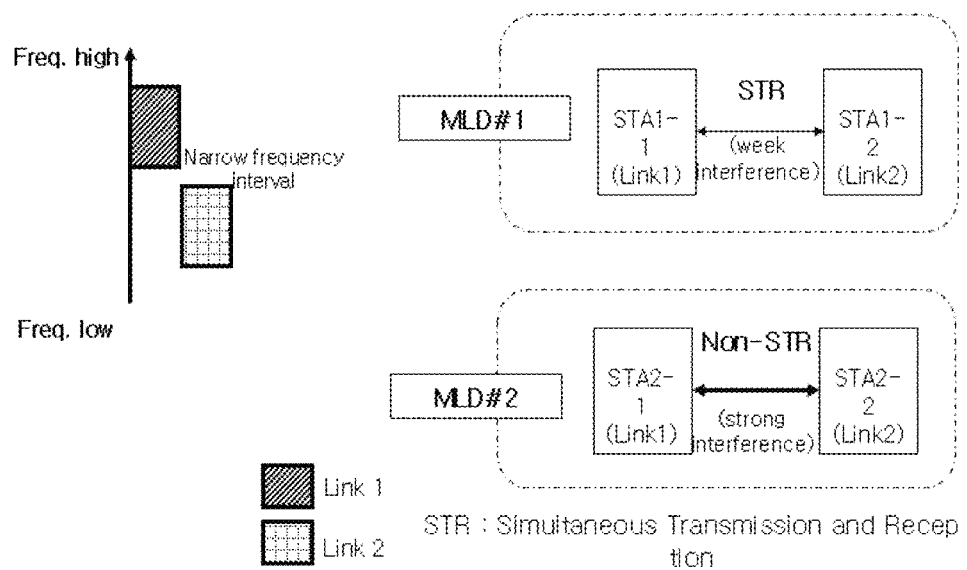
FIG. 10 illustrates a case in which transmissions in different links are simultaneously performed in a multi-link operation according to an embodiment of the present invention.

FIG. 10 illustrates a case in which transmissions in different links are simultaneously performed in a multi-link operation according to an embodiment of the present invention.

According to implementation of a multi-link device, a simultaneous operation may not be supported in multiple links. For example, it may not be supported that the multi-link device simultaneously performs transmission in multiple links, performs reception in multiple links, or performs transmission in any one link and simultaneously performs reception in another link. This is because reception or transmission performed in any one link may affect reception or transmission performed in another link. Specifically, transmission in one link may act as interference in another link. Interference from one link of a single multi-link device applied to another link may be referred to as an internal leakage. The smaller the frequency interval between links, the higher the internal leakage. In a case where the internal leakage is not too high while transmission is performed in any one link, transmission may be performed in another link. In a case where the internal leakage is too high while transmission is performed in any one link, transmission cannot be performed in another link. As such, when the multi-link device simultaneously operates in multiple links, it may be referred to as simultaneous transmit and receive or simultaneous transmission and reception (STR). For example, when the multi-link device simultaneously performs transmission in multiple links, the multi-link device performs transmission in any one link and simultaneously performs reception in another link, or simultaneously performs reception in multiple links, it may be referred to as STR.

Conversely, when STR is not supported due to interference existing among a plurality of stations (STA) included in an MLD, the STAs may be expressed as being in a non-STR relationship or an NSTR relationship (a relationship in which STR is not supported).

In this instance, whether two STAs (STA1 or STA2) of the MLD support STR may be changed based on a separation distance in a link pair in which STAs are operated (Link1 in which STA1 is operated and Link2 in which STA2 is operated).

Therefore, in the case in which the MLD operates STAs in a predetermined link pair, if STR is supported between the two STAs operated in the predetermined link pair, the predetermined link pair may be considered as an STR link pair for the MLD. Conversely, in the case in which the MLD operates STAs in another link pair, if STR is not supported between the two STAs operated in the other link pair, the other link pair may be considered as an NSTR link pair for the MLD.

As described above, whether STR is supported between STAs of the MLD may be determined based on whether a link pair where the STAs operate is an STR link pair or an NSTR link pair. In this instance, as described above, the characteristics (shielding performance or the like) of each MLD may be different, and thus a predetermined link pair may be considered as an STR link pair, which supports STR, for a predetermined MLD and may be considered as an NSTR link pair, which does not support STR, for another MLD.

In embodiments of the present invention described below, for case of description, STAs operated in an STR link pair of an MLD are referred to as STAs of an STR MLD, and STAs operated in an NSTR link pair of an MLD are referred to as STAs of an NSTR (and non-STR) MLD. That is, in the following embodiments, the term 'STA of non-STR MLD' may be understood as indicating one of the two STAs operated in an NSTR link pair of an MLD, and the term 'STA of STR MLD' may be understood as indicating one of the two STAs operated in an STR link pair of an MLD.

In addition, in relation to support of STR, the NSTR MLD may include an MLD of which the STA loses a reception capability, and an MLD having a hardware component that does not support simultaneous transmission/reception.

In other words, the hardware of a multi-link device (MLD) may be configured so that, while a predetermined STA of the MLD performs transmission or reception, the hardware resource that another STA of the MLD is capable of utilizing is limited. For example, in the case in which a predetermined MLD has a hardware configuration that supports only processing of a single PPDU, the predetermined MLD may be incapable of supporting Tx and Rx of a remaining STA in the MLD while a predetermined STA of the predetermined MLD performs Rx. In the same manner, while the predetermined STA of the predetermined MLD performs Tx, the predetermined MLD may be incapable of supporting Tx and Rx for the other STA in the MLD.

As described above, a device that is a multi-link device and capable of operating STAs in two or more links, but is capable of supporting transmission/reception with respect to a single STA at a predetermined point in time may be referred to as a multi-link single radio MLD (MLSR MLD). Alternatively, an MLD may be a type of operation mode and an operation mode that supports transmission/reception with respect to a single STA may be referred to as an enhanced multi-link single radio (EMLSR) mode. In this instance, an MLD that operates in an EMLSR mode may be a multi-radio MLD or an enhanced single-radio MLD. The enhanced single-radio MLD may be a device that supports data transmission/reception with respect to a single link for each time but has a separate hardware configuration (e.g., low-cost PHY front end or the like), thereby supporting CCA for two or more links and low-speed data rate (e.g., encoded to be 6 MHz or 24 MHz or less) PPDU transmission/reception.

In addition, as a modification of the EMLSR mode, enhanced multi-link multi-radio (EMLMR) may be defined in which an MLD supports transmission/reception for each STA but utilizes part of an RF chain used by a predetermined STA for transmission/reception for the other STA. When all the RF chain used by the predetermined STA is utilized for the transmission/reception of the other STA, the EMLMR may have the same transmission/reception limitation feature as the EMLSR. That is, an MLD that operates in an EMLMR mode may perform an operation that supports only transmission/reception for a single link (STA) at a predetermined point in time, irrespective of whether STR is supported in links, and this may be understood as an operation similar to an MLD that operates in the EMLSR mode.

That is, links of an MLD that operates in an EMLSR/EMLMR mode may be considered as an NSTR link pair.

In this instance, the above-described transmission/reception may include transmission/transmission and reception/reception, and is irrelevant to whether STR/NSTR is supported between two links.

For ease of description, hereinafter, an EMLSR/EMLMR MLD is a term indicating an MLD that only supports transmission/reception for a single STA at a predetermined point in time due to restriction of hardware, and an MLD that is a type of operation mode and supports only high-speed data frame transmission/reception for a single STA at a predetermined point in time although it is capable of supporting transmission/reception (processing capability irrelevant to STR) with respect to two or more STAs.

Operations of an STR MLD in consideration of performance limitation of an NSTR MLD, which have been provided via the above-described embodiments of the present invention, may be utilized as they are, as operations of an STR MLD for an MLSR MLD. For example, when an STA of an STR MLD performs transmission to an STA of a multi-link single radio MLD and determines that the transmission fails due to the limited performance of the multi-link single radio MLD STA or is expected to fail, the STA may cancel the transmission that is being performed or is to be performed. In this instance, a procedure of identifying whether the transmission fails due to the limited performance of the EMLSR/EMLMR MLD may be similar to identifying whether transmission to an STA of an NSTR MLD fails due to the limited performance of the NSTR MLD STA.

As described above, the multi-link device may not support STR, or may restrictively support STR. Specifically, the multi-link device may support STR only under a predetermined condition. For example, in a case where the multi-link device operates using a single radio, the multi-link device may not be able to perform STR. In addition, in a case where the multi-link device operates using a single antenna, the multi-link device may not be able to perform STR. In addition, in a case where the magnitude of an internal leakage is detected as being greater than or equal to a predetermined magnitude, the multi-link device may not be able to perform STR.

A station may exchange information relating to STR capability of the station with another station. Specifically, the station may exchange, with another station, information relating to whether the capability that the station simultaneously performs transmission in multiple links or simultaneously performs reception in multiple links is restrictive. Specifically, the information relating to the capability of performing transmission or reception in multiple links is restrictive may indicate whether simultaneous transmission can be performed in multiple links, simultaneous reception can be performed in multiple links, or simultaneous transmission and reception can be performed in multiple links. In addition, the information relating to whether the capability of performing transmission or reception in multiple links is restrictive may be information indicated for each stage. Specifically, the information relating to whether the capability of performing transmission or reception in multiple links is restrictive may be information indicating a stage representing the magnitude of an internal leakage. In a specific embodiment, the information indicating the stage representing the magnitude of an internal leakage may be information indicating a stage representing the magnitude of interference caused due to the internal leakage. In another specific embodiment, the information may be information indicating a stage representing a frequency interval between links that may affect an internal leakage. In addition, the information indicating the stage representing the magnitude of an internal leakage may be information indicating the relationship between an internal leakage and a frequency interval between links for each stage.

In FIG. 10, a first station (STA 1) and a second station (STA 2) may be affiliated with a single non-AP multi-link device. In addition, a first AP (AP 1) and a second AP (AP 2) may be affiliated with the single non-AP multi-link device. A first link (Link 1) may be set up between the first AP (AP 1) and the first station (STA 1), and a second link (Link 2) may be set up between the second AP (AP 2) and the second station (STA 2). In FIG. 10, the non-AP multi-link device may restrictively perform STR. In a case where the second station (STA 2) performs transmission in the second link (Link 2), reception performed by the first station (STA 1) in the first link (Link 1) may be disturbed by transmission performed in the second link (Link 2). For example, in the following case, the reception performed by the first station (STA 1) in the first link (Link 1) may be disturbed by transmission performed in the second link (Link 2). The second station (STA 2) may transmit first data (Data 1) in the second link (Link 2), and the first AP (AP 1) transmits, to the first station (STA 1), a response (ACK for Data 1) to the first data (Data 1). The second station (STA 2) transmits second data (Data 2) in the second link (Link 2). In this case, a transmission time of the second data (Data 2) and a transmission time of the response (ACK for Data 1) to the first data (Data 1) may overlap. In this case, due to the transmission to the second station (STA 2) in the second link (Link 2), interference in the first link (Link 1) may occur. Therefore, the first station (STA 1) may fail to receive the response (ACK for Data 1) to the first data (Data 1).

An operation in which a multi-link device performs channel access is described. A multi-link operation for which there is no detailed description may follow the channel access procedure described through FIG. 6.

A multi-link device may independently perform channel access in multiple links. In this case, the channel access may be backoff-based channel access. When the multi-link device independently performs channel access in multiple links and a backoff counter in the multiple links reaches 0, the multi-link device may start simultaneous transmission in the multiple links. According to another detailed embodiment, when the backoff counter of any one link of the multi-link device reaches 0 and a pre-designated condition is satisfied, the multi-link device may perform channel access not only in a link in which the backoff counter has reached 0 but also in another link in which the backoff counter has not reached 0. Specifically, when the backoff counter of any one link of the multi-link device reaches 0, the multi-link device may perform energy detection in another link in which the backoff counter has not reached 0. In this case, energy greater than or equal to a predetermined magnitude is not detected, the multi-link device may perform channel access not only in a link in which the backoff counter has reached 0 but also in a link in which the energy detection has been performed. Through the above, the multi-link device may start simultaneous transmission in multiple links. The magnitude of a threshold value used for energy detection may be less than the magnitude of a threshold value used for determining whether to decrease a backoff counter. In addition, when determining whether to decrease a backoff counter, the multi-link device may detect any type of signal, as well as, a wireless LAN signal. In addition, in the above-described energy detection, the multi-link device may detect any type of signal, as well as, a wireless LAN signal. An internal leakage may not be detected via a wireless LAN signal. In such a case, the multi-link device may sense a signal detected due to an internal leakage via energy detection. In addition, as described above, the magnitude of a threshold value used for energy detection may be less than the magnitude of a threshold value used for determining whether to decrease a backoff counter. Therefore, although transmission is being performed in one link, the multi-link device may reduce a backoff counter in another link.

According to the degree of interference between links used by a multi-link device, the multi-link device may determine whether a station operating in each link may independently operate. In this case, the degree of interference between links may be the size of interference detected by, when one station performs transmission in one link, another station of the multi-link device. When transmission by the first station of the multi-link device in the first link gives interference having a pre-designated size or greater to the second station of the multi-link device operating in the second link, the operation of the second station may be restricted. Specifically, reception or channel access of the second station may be restricted. This is because, when interference occurs, the second station may fail in decoding of the received signal due to the interference. Furthermore, this is because, when interference occurs, the second station may determine that the channel is being used when the second station performs channel access using the backoff.

In addition, when transmission by the first station of the multi-link device in the first link gives interference having a size smaller than a pre-designated size to the second station of the multi-link device operating in the second link, the first station and the second station may independently operate. Specifically, when transmission by the first station of the multi-link device in the first link gives interference having a size smaller than a pre-designated size to the second station of the multi-link device operating in the second link, the first station and the second station may independently perform channel access. Furthermore, when transmission by the first station of the multi-link device gives interference having a size smaller than a pre-designated size to the second station of the multi-link device operating in the second link, the first station and the second station may independently perform transmission or reception. This is because, when interference having the size smaller than the pre-designated size occurs, the second station may succeed in decoding the received signal even when the interference exists. Furthermore, this is because, when interference having the size smaller than the pre-designated size occurs, the second station may determine that the channel is idle when the second station performs channel access using the backoff.

The degree of interference occurring between stations of the multi-link device may vary depending on a hardware characteristic of the multi-link device as well as the interval between frequency bands of the links in which the stations operate. For example, the degree of internal interference occurring in the multi-link device including an expensive radio frequency (RF) device may be less than that of internal interference occurring in the multi-link device including an inexpensive RF device. Accordingly, the degree of interference occurring between the stations of the multi-link device may be determined based on a characteristic of the multi-link device.

FIG. 10 illustrates that a size of occurring interference varies depending on an interval between frequency bands of links and a characteristic of a multi-link device. In the embodiment of FIG. 10, a first multi-link device (MLD #1) includes a first station (STA 1-1) operating in a first link (Link 1) and a second station (STA 1-2) operating in a second link (Link 2). A second multi-link device (MLD #2) includes a first station (STA 2-1) operating in a first link (Link 1) and a second station (STA 2-2) operating in a second link (Link 2). A frequency interval between the first link (Link 1) and the second link (Link 2) in which the first multi-link device (MLD #1) operates is the same as a frequency interval between the first link (Link 1) and the second link (Link 2) in which the second multi-link device (MLD #2) operates. However, the size of occurring interference may be different due to a difference between a characteristic of the first multi-link device (MLD #1) and a characteristic of the second multi-link device (MLD #2). Specifically, the size of interference occurring in the first multi-link device (MLD #1) may be greater than the size of interference generated in the second multi-link device (MLD #2). As described above, the size of occurring interference may vary depending on the characteristic of the multi-link device, and it may be required to exchange information on whether STR is supported when it is considered that whether STR is supported is different according to each multi-link device.

The multi-link device may signal information on whether STR is supported by the station included in the multi-link device. Specifically, an AP multi-link device and a non-AP multi-link device may exchange information on whether STR is supported by the AP included in the AP multi-link device and whether STR is supported by the STA included in the non-AP multi-link device. In such embodiments, an element indicating whether STR is supported may be used. The element indicating whether STR is supported may be referred to as an STR support element. The STR support element may indicate whether STR is supported by the station of the multi-link device transmitting the STR support element through 1 bit. Specifically, the STR support element may indicate whether STR is supported by each station included in the multi-link device transmitting the STR support element by 1 bit. In this case, a value of the bit may be 1 when the station supports STR, and the value of the bit may be 0 when the station does not support STR. When the multi-link device having transmitted the STR support element includes a first station (STA 1), a second station (STA 2), and a third station (STA 3), the first station (STA 1) and the third station (STA 3) support STR, and the second station (STA 2) does not support STR, the STR support element may include a field having 1011b. It is assumed that stations operating in different frequency bands support STR, and the STR support element may omit signaling indicating whether STR is supported between the stations operating in different frequency bands. For example, the first station (STA, 1) operates in a first link of 2.4 GHz, and the second station (STA 2) and the third station (STA 3) operate in a second link and a third link of 5 GHz, respectively. In this case, the STR support element may indicate that STR is supported between the second station (STA 2) and the third station (STA 3) by using 1 bit. Furthermore, the STR support element may include only 1 bit when the number of stations signaled by the STR support element is 2.

In a detailed embodiment, the relation between the link located in 2.4 GHz and the link located in 5 GHz or 6 GHz among the links of the multi-link device may be always determined to be STR. Accordingly, signaling for STR of the link located in 2.4 GHz and the link located in 5 GHz or 6 GHz may be omitted.

In the above-described embodiments, the operation described as an operation of a station of a multi-link device may be substituted with an operation of a multi-link device. In addition, in the above-described embodiments, the operation of an AP may be substituted with an operation of a non-AP station, and the operation of a non-AP station may be substituted with an operation of an AP. Accordingly, an operation of an AP of a non-STR multi-link device may be substituted with an operation of a non-AP station of a non-STR multi-link device, and an operation of a non-AP station of an STR multi-link device may be substituted with an operation of an AP of an STR multi-link device. In addition, an operation of a non-AP station of a non-STR multi-link device may be substituted with an operation of an AP of a non-STR multi-link device, and an operation of an AP of an STR multi-link device may be substituted with an operation of a non-AP station of an STR multi-link device.

Each AP included in an AP MLD may transmit a beacon frame in its own link. An AP included in the AP MLD may transmit a beacon frame for the same purpose and function as that of an AP in conventional Wi-Fi, and may additionally include, in a beacon frame, information indicating that the MLD is an MLD that includes an AP, common information at the level of an MLD (MLD level information, common information), and basic information of another AP included in the same MLD. In this instance, the basic information of the other AP may be included in a TBTT information field of an RNR element and may be transmitted via the beacon frame.

A beacon frame transmitted by the AP MLD may include only common information at the level of an MLD for preventing beacon bloating which may occur when information associated with a plurality of APs included in the same MLD is included in a single beacon frame and the magnitude of the beacon frame is excessively increased.

However, in the case of an NSTR soft AP MLD, a beacon frame may be transmitted via some of its APs operated. For example, in the case in which an NSTR soft AP MLD operates APs in two different links and the two links are in an NSTR relationship, the NSTR Soft AP MLD may transmit a beacon frame in only one of the two links. In this instance, a link in which the NSTR soft AP MLD transmits a beacon frame may be assigned with the concept of a primary link of an NSTR link pair of the NSTR soft AP MLD. Conversely, the other link remaining after excluding the primary link of the NSTR link pair of the NSTR soft AP MLD may be operated as the concept of a sub-link (non-primary link) which means a link in which a beacon frame is not transmitted. The reason why the NSTR soft AP MLD operates one link of the NSTR link pair as a primary link and operates the at least one remaining link as a sub-link is to prevent a drawback that may occur when two different APs are independently operated in the NSTR link pair. The drawback that an AP MLD that operates the NSTR link pair may experience will be described in detail with reference to operation limitation embodiments applied to the NSTR soft AP MLD and an STA MLD associated with the NSTR soft AP MLD. That is, in the case of a link pair to which NSTR is applied, a beacon frame is transmitted in only a primary link, and a beacon frame may not be transmitted in a sub-link.

As described above, the NSTR soft AP MLD is restricted to transmitting a beacon frame in only a primary link, and thus the NSTR soft AP MLD may be allowed to include a larger amount of information (associated with an AP of another link (non-primary)) in a beacon frame transmitted in the primary link, when compared to a general AP MLD. This is a beacon frame configuration method that is designed for a non-AP MLD, which operates an STA in a sub-link, to operate the STA of the sub-link based on information associated with a beacon frame received in the primary link.

For example, a primary link AP of the NSTR soft AP MLD may include, in a multi-link element of a beacon frame, a per-STA profile that corresponds to an AP (of the same NSTR soft AP MLD) of a sub-link. In this instance, the primary link AP of the NSTR soft AP MLD may not have a separate restriction condition in association with inclusion of a per-STA profile that corresponds to the AP of the sub-link. The restriction condition is a condition for including a per-STA profile in a beacon frame by a general AP MLD (such as an AP corresponding to a per-STA profile performs (extended) channel switching, channel quieting, or the like).

FIG. 11 illustrates an example of beacon frame contents transmitted by an AP of an AP MLD, and a target beacon transmission time (TBTT) information field format included in a reduced neighbor report (RNR) element according to an embodiment of the present invention.

Referring to FIG. 11(a), a beacon frame may include, in legacy IEs, the same parameters and elements as those included in the beacon frame disclosed in 802.11ax of the conventional Wi-Fi. For example, the legacy IEs of the beacon frame may include elements such as a timestamp field, a beacon interval field indicating a beacon transmission interval, a TIM, a DSSS parameter set, an IBSS parameter set, a country, a channel switch announcement, an extended channel switch announcement, a wide bandwidth channel switch, transmission power envelop, supported operating classes, IBSS DFS, ERP information, HR capabilities, an HT operation, VHT capabilities, a VHT operation, SIG beacon compatibility, a short beacon interval, SIG capabilities, an SIG operation, HE capabilities, HE 6 GHz band capabilities, a HE operation, a BSS color change announcement, and spatial reuse parameter set.

In this case, the configuration method and the meaning of the elements and fields included in the legacy IEs field are identical to those of the elements and the fields having the same name, included in the beacon frame disclosed in up to 802.11ax of the conventional Wi-Fi.

In addition, the beacon frame may include a reduced neighbor report (RNR) element for indicating information of a neighbor AP. The RNR element may be used to notify a station of the information of the neighbor AP, and the station may receive the beacon frame and recognize the neighbor AP through the RNR element included in the beacon frame.

Specifically, the RNR element may include an element ID field, a length field, and a neighbor AP information field. Each neighbor AP information field may include a TBTT information header field (2 octet), an operation class field (1 octet), a channel number field (1 octet), and a TBTT information set (variable length) field. In this case, the RNR element transmitted by an AP included an AP MLD may include a TBTT information field format as illustrated in FIG. 11(b) to indicate basic information of another AP included in the same MLD. Unlike the TBTT information field of the RNR element transmitted by the AP in 802.11ax of the conventional Wi-Fi, an RNR element transmitted by an AP included an EHT AP MLD may include an MLD parameters field.

The MLD parameters field may include an MLD ID subfield, a link ID subfield, and a change sequence subfield as illustrated in FIG. 11(c). In this case, when an AP MLD indicates another AP information of the same MLD through a specific neighbor AP information field of the RNR element, an MLD ID subfield included in the specific neighbor AP information field may be configured as 0. That is, to notify to the station that the neighbor AP information field indicates an AP included in the same AP MLD, the AP may configure the MLD ID subfield as a specific value, and the station having received the neighbor AP information field may recognize through a value of the MLD ID subfield that the AP corresponding to the neighbor AP information field and the AP having transmitted the neighbor AP information field are included in the same MLD.

The link ID subfield may correspond to a subfield in which an index determined by an AP MLD is indicated to indicate a link managed by another AP to be indicated through neighbor AP information. The change sequence subfield may be a subfield used to indicate information relating to an update (for example, a critical update) related to a link of another AP. For example, when a value of the change sequence subfield is changed, the station having received the same may recognize that a parameter related to a link of the corresponding AP has been updated, and may request an updated parameter from the AP to update the corresponding parameter. In this case, when the AP MLD is an NSTR AP MLD corresponding to an MLD not supporting simultaneous transmission or reception (for example, when the AP MLD is an NSTR mobile AP MLD or an NSTR soft AP MLD, that is, when a mobile or the like operates as a soft AP MLD for tethering, etc.), an STA included in an STA MLD may perform a procedure of updating the parameter only through a primary link. That is, to update a parameter of another link (for example, a non-primary link) of another neighbor AP, other than the primary link of the AP MLD, a frame for parameter updating may be transmitted or received only through the primary link.

Hereinafter in the present invention, the NSTR AP MLD may be referred to as an NSTR soft AP MLD or an NSTR mobile AP MLD.

In addition, when the AP is an NSRT AP MLD not supporting simultaneous transmission or reception (for example, when the AP is an NSTR mobile AP MLD or an NSTR soft AP MLD, that is, when a mobile terminal, or the like operates as a soft AP MLD for tethering, etc.), the NSRT AP MLD may include, in a beacon frame, information indicating that the NSTR AP MLD itself is an NSTR AP MLD, and transmit the same. For example, the NSTR AP MLD may configure a value of a specific subfield included in the beacon frame as a specific value (for example, "0" or "1"), and a non-AP STA MLD having received the beacon frame may recognize that the AP MLD having transmitted the beacon frame is the NSTR AP MLD. Accordingly, in a case of not indicating the NSTR AP MLD (for example, in a case of an STR AP MLD, another AP MLD, etc.), the specific subfield for indicating the NSRT AP MLD may be configured as a value (for example, "1" or "0") other than the specific value.

The specific subfield for indicating the NSTR AP MLD may be indicated together with a subfield (for example, MLD level capability) related to capability of the beacon frame, or may be included in a neighbor AP information field related to an AP of a non-primary link of an NSTR AP MLD, and transmitted. For example, the specific subfield for indicating the NSTR AP MLD may be encoded together with a frequency separation for STR/AP MLD type indication corresponding to a capability-related subfield, and indicated. That is, the specific subfield may be encoded together with the frequency separation for STA/AP MLD type indication indicating the distance for supporting STR, and indicated through the beacon frame. In this case, when the corresponding indicator indicates the type of the AP MLD, it may be indicated that the AP MLD having transmitted the beacon frame is the NSTR AP MLD or is not the NSTR AP MLD according to a configured value (for example, when the configured value is "0", it may indicate that the AP MLD is not the NSTR AP MLD, and when the configured value is "1", it may indicate that the AP MLD is the NSTR AP MLD).

AS such, a method in which the subfield indicating the NSTR AP MLD is utilized may be used as a method for explicitly indicating whether the AP MLD is the NSTR AP MLD.

In another example, the NSTR AP MLD may indicate that the NSTR AP MLD itself is the NSTR AP MLD in an implicit method, without directly indicating, through the specific subfield, that the NSTR AP MLD itself is the NSRT AP MLD. Specifically, the NSTR AP MLD may indicate that there are two links supportable by the NSTR AP MLD itself, and simultaneously, may implicitly indicate that the NSTR AP MLD itself is the NSTR AP MLD by indicating that the NSTR AP MLD itself has an NSTR link pair. In this case, to indicate that there are two links supportable by the NSTR AP MLD itself, the NSTR AP MLD may configure a maximum number of simultaneous links subfield included in the beacon frame as 1 (or a pre-promised value indicating two). In this case, to indicate that the NSTR AP MLD itself has the NSTR link pair, the NSTR AP MLD may configure an NSTR link pair present subfield included in the beacon frame as 1 or 0.

The AP MLD may notify, to the non-AP STA MLD through the explicit method or the implicit method, that the AP MLD itself is the NSTR AP MLD, by transmitting the beacon frame as in the above-described method. The non-AP STA MLD may implicitly or explicitly recognize, through the received beacon frame, whether the AP MLD having transmitted the beacon frame is the NSTR AP MLD. If the AP MLD having transmitted the beacon frame is the NSTR AP MLD (that is, when the beacon frame indicates, in the explicit or implicit method, that the AP MLD is the NSTR AP MLD), the non-AP STA MLD may perform a procedure for association or setup with the NSTR AP MLD only through a link in which the beacon frame is received. That is, the non-AP STA MLD may perform transmission or reception of a frame for association or setup with the NSTR AP MLD only through a link (for example, a primary link) in which the beacon frame is received. For example, the transmission or reception of the frame for the association or setup with an AP connected through a link other than the primary link, included in the NSTR AP MLD, may be performed only through the primary link. In this case, an (ML) (re) association request frame transmitted by the non-AP STA MLD may be transmitted through a non-primary link other than the primary link.

In this case, the NSTR AP MLD may not indicate information relating to an AP of the non-primary link in the RNR element of the beacon frame (transmitted in the primary link), so as to prevent the non-AP STA MLDs from attempting the setup procedure in the non-primary link. That is, the beacon frame transmitted by the AP of the NSTR AP MLD may not include/indicate a neighbor AP information field for the AP (of the same MLD) of another link. In this case, after receiving the beacon frame, the non-AP STA MLDs fail to identify information on the AP of the non-primary link, and thus may not attempt step for the NSTR AP MLD in the non-primary link. In this case, the non-AP STA MLD having received the beacon frame not including the neighbor AP information field for the AP of the non-primary link from the NSTR AP MLD may implicitly recognize, as described above, that a counterpart AP is the NSTR AP MLD on the basis that there are two simultaneous support links of the AP having transmitted the beacon frame and no information on another AP of the same MLD is indicated.

When receiving an (ML) (re) association request frame from an STA (MLD), a general AP MLD needs to transmit an (ML) association response frame through a link in which the (ML) association request frame is received. However, the NSTR AP MLD may be allowed to perform, through a primary link, responding to the (ML) association request frame received through a non-primary link (i.e., to respond with the (ML) association response frame in the primary link).

As described above, this may be an operation allowed because an operation in which the NSTR AP MLD performs transmission through the non-primary link is somewhat restricted compared to a general AP. To described in more detail, in a case of the NSTR AP MLD, when a response to the (ML) association response frame is transmitted through the non-primary link, there is an operation restriction that the transmission needs to start together in the primary link. As being considered in other embodiments of the present invention, this may be an operation restriction considered to prevent the AP of the primary link from being in a BLIND state.

Therefore, when receiving the (ML) (re) association request frame through the non-primary link, the NSTR AP MLD may respond with the (ML) (re) association response frame through the primary link, or may respond with the (ML) (re) association response frame through both the primary link and the non-primary link. That is, an STA MLD having transmitted the (ML) (re) association request frame through the non-primary link of the NSTR AP MLD may recognize that the response to the request frame having requested by the STA MLD itself is to be received through the primary link, and may wait for the reception of the (ML) (re) association response frame in the primary link.

That is, the RNR element transmitted by the AP through the beacon frame may include a specific TBTT information field including the MLD parameters field. In this case, when an MLD ID of the MLD parameters field is configured as "0", the STA MLD may recognize that the AP corresponding to the neighbor AP information field including the corresponding MLD parameters field is included in the AP MLD in which the AP having transmitted the beacon frame is included. That is, the STA MLD may recognize that the corresponding neighbor AP information field indicates information on another AP included in the same AP MLD as the AP having transmitted the beacon frame. In this case, a method for interpreting/obtaining the same by the STA MLD may be identical/similar to an operation performed by the conventional STAs after receiving the RNR element.

However, in the case of the NSTR soft AP, the beacon frame is not transmitted in the non-primary link, and thus it may be impossible to indicate information related to the beacon frame of another AP (the AP of the non-primary link) through the RNR element. To describe in more detail, the NSTR soft AP MLD does not transmit the beacon frame through the AP of the non-primary link, and thus the NSTR soft AP MLD cannot indicate information on the beacon frame when indicating AP basic information of the non-primary link in the RNR element. For example, in the non-primary link in which the beacon frame is not transmitted, there is no information corresponding to the TBTT information count, TBTT information length, and neighbor AP TBTT offset subfields. Therefore, when transmitting the RNR element through the AP of the primary link, the NSTR soft AP MLD may need to set, to a pre-configured value, the TBTT-related field of the neighbor AP information field corresponding to the AP of the non-primary link.

The neighbor AP TBTT offset subfield of the TBTT information field (see FIG. 11(b)) is a subfield indicating information related to a next TBTT of another AP to be indicated. That is, the neighbor AP TBTT offset subfield included in the neighbor AP information field may include information on the next TBTT of the AP corresponding to the neighbor AP information field. For example, when AP 1 for transmitting a beacon frame indicates information on AP 2 through an RNR element (through a neighbor AP information field), a neighbor AP TBTT offset subfield corresponding to AP 2 indicates that the next TBTT of AP 2 has a difference in time units (TUs) (1024 us) compared to the immediately preceding TBTT of AP 1. In this case, a value indicated by the neighbor AP TBTT offset subfield is a value obtained by rounding down a TBTT offset to a neighboring integer. That is, when the AP indicates a value of 10 in the neighbor AP TBTT offset subfield of another AP, the next TBTT of another AP may have a time interval of 10 TUs or more to 11 TUs or less with reference to the previous TBTT of the AP.

However, when the primary link AP of the NSTR soft AP MLD sets a value for the neighbor AP TBTT offset subfield (1-octet) corresponding to the AP of the non-primary link, the value of the subfield may need to be set to a pre-configured value (for example 254 or 255). This may be because a target beacon transmission time (TBTT) corresponding to a time scheduled for transmission of the next beacon frame cannot be determined due to no transmission of the beacon frame in the non-primary link in a case of the NSTR soft AP. That is, the beacon frame transmitted by the NSTR soft AP MLD in the primary link may need to set, to 254 and/or 255, the neighbor AP TBTT offset subfield corresponding to the AP of the non-primary link through the RNR element. In this case, the neighbor AP TBTT offset subfield corresponding to the non-primary link may exist in the TBTT information field including the MLD parameters field having the MLD ID subfield set to 0.

Accordingly, when the non-AP STA MLD identifies, from the specific neighbor AP information field of the RNR element included in the beacon frame, the TBTT information field having the MLD ID subfield set to 0 and the TBTT offset subfield indicated as 254 and/or 255 after receiving the beacon frame of the NSTR soft AP MLD, the non-STA MLD may recognize that the specific neighbor AP information field indicates information on the AP (NSTR soft AP MLD) operated in the non-primary link of the NSTR soft AP MLD. As such, the non-AP STA MLD having received the beacon frame of the NSTR soft AP MLD should not transmit a probe request frame or an ML probe request frame to the NSTR soft AP MLD through the non-primary link when identifying the information on AP MLD operated in the non-primary link of the corresponding NSTR AP MLD.

In addition, when the non-AP STA MLD has recognized that the received beacon frame is the beacon frame transmitted by the MLD and the neighbor AP TBTT offset subfield corresponding to another AP in the same MLD as the AP (reporting AP) having transmitted the beacon frame is indicated as 254 and/or 255, the non-AP STA MLD should not transmit the probe request frame and the ML probe request frame to another AP.

In addition, when the non-AP STA MLD has recognized that the received beacon frame is the beacon frame transmitted by the MLD and the neighbor AP TBTT offset subfield corresponding to another AP of the same MLD as the AP (reporting AP) having transmitted the beacon frame is indicated as 254 and/or 255, the non-AP STA MLD should not transmit the probe request frame and the ML probe request frame to another AP.

<MLD AP TBTT Offset Indication>

In the above-described embodiments of the present invention, it is mentioned that a beacon frame transmitted by an NSTR soft AP MLD may indicate a neighbor AP TBTT offset subfield corresponding to an AP of a non-primary link as a pre-configured value (254 and/or 255). However, the neighbor AP TBTT offset subfield may be indicated as 254 or 255 not even in a case of corresponding to the AP of the non-primary link of the NSTR soft AP MLD. For example, when a TBTT offset of another AP identified by an AP transmitting the beacon frame is equal to or greater than 254 TUs (254 TUs or greater than 254 TUs), the AP may indicate the neighbor AP TBTT offset subfield corresponding to another AP as 254 in the beacon frame. In addition, when the AP transmitting the beacon frame cannot accurately identify the TBTT offset of another AP, the AP may indicate the neighbor AP TBTT offset subfield corresponding to another AP as 255.

However, since the AP of the MLD may always recognize TBTT offsets of other APs within the MLD, the neighbor AP TBTT offset subfield corresponding to another AP (of the same MLD) should not be indicated (configured) as 255 when being indicated (configured) through an RNR element.

Specifically, the neighbor AP information field included in the RNR element of the beacon frame may include a neighbor AP TBTT offset subfield indicating an offset between times in which the beacon frame is transmitted. In this case, the neighbor AP TBTT offset subfield indicates an offset value between a time point at which the beacon frame is transmitted and a time point at which a next beacon frame is transmitted by an AP corresponding to a neighbor AP TBTT offset subfield among multiple APs included in the AP MLD (NSTR or STR AP MLD). In this case, the neighbor AP TBTT offset subfield cannot be configured as a specific value according to a specific condition.

For example, when being included in the same AP MLD as the AP having transmitted the beacon frame, the neighbor AP TBTT offset subfield cannot be configured as a specific value (for example, "255"). In this case, the size of the neighbor AP TBTT offset subfield may be 8 bits, and in this case, the neighbor AP TBTT offset subfield cannot be configured as the largest value which can be indicated by the neighbor AP TBTT offset subfield (in a case of 8 bits, the subfield corresponds to each of values from 0 to 255, and thus a maximum value of the offset which can be indicated by 8 bits may be 255). However, when not being included in the same AP MLD as the AP having transmitted the beacon frame (for example, when the AP is a legacy AP), the neighbor AP TBTT offset subfield may be configured as a specific value (for example, "255").

In a similar embodiment, a value configured for the neighbor AP TBTT offset subfield may be differently interpreted according to a specific condition.

For example, when the neighbor AP TBTT offset subfield is configured with a specific value (for example, when the subfield is configured with "254"), the configured value may be differently interpreted as "254" or "254" or greater according to a specific condition.

Specifically, when an AP corresponding to a neighbor AP information field including the neighbor AP TBTT offset subfield is included in the same AP MLD as or a different MLD from the AP having transmitted the beacon frame and the neighbor AP TBTT offset subfield is configured with a specific value (for example, "254"), the station may interpret the value indicated by the neighbor AP TBTT offset as 254 TUs. However, when the AP is not included in the same AP MLD as or a different MLD from the AP having transmitted the beacon frame (for example, the AP is a legacy AP or is an AP not included in the MLD, etc.) and the neighbor AP TBTT offset subfield is configured with a specific value (for example, "254"), the station may interpret the value indicated by the neighbor AP TBTT offset subfield as 254 TUs or 254 TUs or greater.

In general, the reason why the conventional AP includes basic information of neighbor APs together with TBTT offset information and transmit the same through the beacon frame is to assist STAs having received the beacon frame in promptly acquiring basic information of other APs and more efficiently receiving the beacon frame of another AP by using the identified TBTT offset information.

However, the neighbor AP TBTT offset subfield included in the conventional beacon frame includes 1 octet, and is designed in the form in which only a TBTT offset corresponding to a maximum of 254 TUs can be indicated. In consideration of the maximum TBTT offset ((2^16) or (2^16)−1 TUs in consideration of a configurable beacon interval) that another AP can have, this may be a design of a neighbor AP TBTT offset subfield in the form in which the indicatable information and the overhead of the beacon frame are compromised through exclusion of support for information in a case having a TBTT offset of 254 TUs or more.

However, when the AP MLD indicates information on another AP in the MLD through the beacon frame, an additional MLD AP TBTT offset subfield may be included and transmitted to more accurately notify of the TBTT offset of another AP. When the AP MLD transmits the beacon frame, the MLD AP TBTT offset subfield may be included in the TBTT information field corresponding to another AP in the same MLD. In this case, when both the neighbor AP TBTT offset subfield and the MLD AP TBTT offset subfield are indicated in a specific TBTT information field, the neighbor AP TBTT offset may be indicated by a pre-configured value (254 or 255). The MLD AP TBTT offset subfield corresponds to a 2-octet sized subfield, and may be utilized to indicate a TBTT offset value when the TBTT offset between an AP (reporting AP) having transmitted the beacon frame and another AP (reported AP) of the same MLD exceeds 254 TUs. More specifically, when the AP MLD transmits the beacon frame, a TBTT offset of another AP in the same MLD exceeds 254 TUs, and an accurate TBTT offset thus cannot be indicated through the existing neighbor AP TBTT offset subfield, the MLD AP TBTT offset subfield may be limitedly included in the TBTT information field.

When the STA MLD has identified the TBTT information field including the MLD AP TBTT offset subfield from the RNR element included in the beacon frame received from a specific AP, the STA MLD may identify the TBTT offset of the AP corresponding to the TBTT information field on the basis of a value indicated by the MLD AP TBTT offset subfield. In this case, to identify whether TBTT information fields included in the beacon frame are included in the MLD AP TBTT offset subfield, the STA may identify the same on the basis of a value of the TBTT information length subfield (in a TBTT information header (sub) field of each neighbor AP information field) corresponding to each TBTT information field. That is, when the STA recognizes that the MLD AP TBTT offset subfield is included in the TBTT information field, on the basis of a value of a TBTT information length subfield, the STA may identify the TBTT offset of the AP corresponding to the TBTT information field on the basis of a value indicated by the MLD AP TBTT offset subfield. In this case, when 0 or a pre-configure value (or a value equal to or less than 254) is indicated through the MLD AP TBTT offset subfield of a specific TBTT information field, the STA MLD may identify the TBTT offset of the AP corresponding to the specific TBTT information field on the basis of a value of the neighbor AP TBTT offset subfield.

FIG. 12 illustrates another example of a TBTT information field format according to an embodiment of the present invention.

Referring to FIG. 12, a TBTT information field may include an MLD AP TBTT offset subfield. The MLD AP TBTT offset subfield may be only included in a beacon frame transmitted by an AP of an AP MLD. In addition, the MLD AP TBTT offset subfield may be included only in a TBTT information field corresponding to another AP of the same MLD as the AP which transmits the beacon frame.

For example, in a beacon frame transmitted by a specific AP of the AP MLD, to indicate that a TBTT offset of another AP of the same MLD is 300 TUs, the TBTT information field corresponding to another AP may be utilized as a format including the MLD AP TBTT offset subfield. In this case, a neighbor AP TBTT offset subfield of the TBTT information field corresponding to another AP may be indicated by 254 or 255, and the MLD AP TBTT offset subfield may be indicated by a value corresponding to 300 TUs (for example, 300, 299, or (300-254)). In this case, the above-described MLD AP TBTT offset subfield is a subfield name provided as an example, and a subfield having the same use may be defined as another name.

FIG. 13 illustrates an example of a TBTT information length subfield indicating a TBTT information field including an MLD AP TBTT offset subfield according to an embodiment of the present invention.

Referring to FIG. 13, according to a TBTT information length subfield, the types of contents included in a TBTT information field may be indicated. The TBTT information length subfield may be a subfield included in a TBTT information header field existing in neighbor AP information fields included in an RNR element. That is, multiple neighbor AP information fields may be included in the RNR element transmitted through a beacon frame, and the TBTT information field included in each neighbor AP information field has a structure including different amounts and types of contents. In this case, since the TBTT information field included in each neighbor AP information field may include different amounts and types of contents, information relating to the content (and format) indicated through each TBTT information field is indicated through the TBTT information header field.

That is, an STA may perform parsing of each neighbor AP information field in the RNR element of the beacon frame received through the AP, on the basis of information indicated by the TBTT information header field. In this case, each parsed neighbor AP information field may indicate information on a neighbor AP or another AP of the same MLD. In this case, when a value of the TBTT information length subfield included in the TBTT information header field means configuration of a content including an MLD AP TBTT offset subfield as illustrated in FIG. 13, the STA may identify a TBTT offset of the AP corresponding to the corresponding TBTT information field, on the basis of the value indicated by the MLD AP TBTT offset subfield.

As another method, a restriction that the AP MLD needs to manage a TBTT offset between APs operated by the AP MLD itself so that the TBTT offset is to be 254 TUs or less and does not exceed 255 TUs.

In this case, the AP MLD may need to manage a TBTT time point difference between APs belonging to the MLD so that the difference does not exceed 254 TUs or 255 TUs, by adjusting a TBTT time point (setup) operated by each AP and/or a beacon interval of APs operated by the AP MLD itself in each link. In this case, the beacon interval and TBTT time point adjustment, etc. is an example for a method for changing a TBTT interval between the respective APs in the MLD, and another implementation of adjusting a TBTT offset so that the TBTT offset does not exceed a specific time value (254 TUs or 255 TUs) may be applied. In addition, a method for managing the TBTT time point difference between the respective APs operated by the AP MLDs itself not to exceed the specific interval (254 TUs or 255 TUs) may not be separately defined.

As such, when the AP MLD adjusts the TBTT time point difference between the respective APs operated by the AP MLD itself to 254 TUs or less or below 255 TUs, as the neighbor AP TBTT offset subfield value transmitted for another AP of the same MLD in the RNR element transmitted by a specific AP through a beacon, only a value of 253 or a value of 254 or less may be indicated. To described in more detail, when a specific AP MLD manages a TBTT time point difference of APs operated by the AP MLD itself so that the difference is 254 TUs or less or is below 255 TUs, subfields corresponding to other APs belonging to the same AP MLD (the specific AP MLD) among the neighbor AP TBTT offset subfields transmitted by a specific AP belonging to the specific AP MLD may indicate (have) only a value of 254 TUs or less.

As described above, when the AP MLD maintains the TBTT time point difference of the respective APs operated by the AP MLD itself so that the difference is to be 254 TUs or less or is to be below 255 TUs, a non-AP STA may need to interpret the neighbor AP TBTT offset subfield of the beacon frame received from the AP of the AP MLD in a method different from the above-described interpretation method. In this case, the above-described interpretation method may mean an interpretation method when the neighbor AP TBTT offset subfield value is indicated as 254 TUs. That is, the above-described interpretation method may be interpretation that a time interval between a previous TBTT of a reporting AP and a next TBTT (a TBTT transmitted after the previous TBTT) of a reported AP is 254 TUs or more when the neighbor AP TBTT offset subfield value is indicated as 254 TUs. In this case, another interpretation method above may be interpretation that a time interval between a previous TBTT of a reporting AP and a next TBTT (a TBTT transmitted after the previous TBTT) of a reported AP is 254 TUs or more and less than 255 TUs when the neighbor AP TBTT offset subfield value is indicated as 254 TUs. Alternatively, another interpretation method above may be interpretation that a time interval between a previous TBTT of a reporting AP and a next TBTT (a TBTT transmitted after the previous TBTT) of a reported AP is 254 TUs when the neighbor AP TBTT offset subfield value is indicated as 254 TUs.

This may be an interpretation method reflecting operation characteristics of the AP MLD and the existing neighbor AP TBTT offset subfield has a meaning of "254 TUs or more" since the TBTT time difference between the respective APs operated by the AP MLD is adjusted to 254 TUs or less or less than 255 TUs by the AP MLD.

That is, when the non-AP STA receives the neighbor AP TBTT offset subfield for another AP of the same AP MLD through the beacon received from the specific AP of the AP MLD and the subfield value is 254, it may be interpreted that the TBTT offset of another AP is 254 TUs (or 254 TUs or more and less than 255 TUs).

Although a non-AP STA receives a beacon from an AP of an AP MLD, it may be interpreted that a TBTT offset greater than or equal to 254 TUs is indicated when a neighboring AP TBPP offset subfield which is not for APs of the same AP MLD among neighboring AP TBTT offset subfields included in the beacon is indicated as 254, that is, when a neighboring AP TBTT offset subfield for an AP that is not the MLD and a legacy AP is indicated as 254.

In this instance, a method for the non-AP MLD to identify whether a predetermined neighbor AP TBTT offset subfield is for another AP of the same AP MLD may be based on information associated with an MLD parameters subfield included in the same TBTT information field as the predetermined neighbor AP TBTT offset subfield. More particularly, in the case in which the value of an MLD ID subfield of an MLD parameters subfield included in the same TBTT information field as the predetermined neighbor AP TBTT offset subfield is 0, the non-AP STA may interpret the predetermined neighbor AP TBTT offset subfield as corresponding to an AP of the same MLD as the AP that has transmitted the beacon frame.

That is, in the case in which a neighbor AP TBTT offset subfield of a TBTT information field having an MLD ID subfield value of 0 is indicated as 254, the non-AP STA may interpret the neighbor AP TBTT offset subfield as indicating a TBTT offset greater than or equal 254 TUs and less than 255 TUs. In this instance, to interpret the neighbor AP TBTT offset subfield, the non-AP may additionally take into consideration whether an ML element is included in a beacon frame (whether an AP that has transmitted a beacon is an MLD).

That is, in the case in which a neighbor AP TBTT offset subfield of a TBTT information field having an MLD ID subfield value (e.g., a value in the range of 1 to 255) different from 0 is indicated as 254, the non-AP STA may interpret the neighbor AP TBTT offset subfield as indicating a TBTT offset greater than or equal 254 TUs.

<Non-Primary Link Setup and Management>

As described above, an NSTR AP MLD cannot transmit a beacon frame, a probe response frame, and a multi-link (ML) probe response frame through a non-primary link. Accordingly, an STA MLD to be connected to the NSTR AP MLD needs to transmit a (ML) probe request frame through only a link in which the NSTR AP MLD has transmitted a beacon frame.

An ML probe request frame transmitted by an STA of an EHT non-AP STA MLD may include not only information included in a probe request frame transmitted by the conventional HE STA, but also EHT capability information and a multi-link element. In this case, the multi-link element included in the ML probe request frame may take a role of requesting, from an AP MLD, additional information for an AP of another link by an MLD transmitting the ML probe request frame.

For example, when the non-AP STA MLD transmits the ML probe request frame, the non-AP STA MLD may request, from an AP MLD, to additionally respond with complete information or partial information for the AP of another link through the multi-link element of the ML probe request frame. That is, the non-AP STA MLD may request, from the AP MLD, to transmit all or a part of a parameter related to the link of another AP included in the same AP MLD to the AP receiving the ML probe request frame.

For example, when all or a part of the parameter related to the AP connected through a non-primary link is updated, a station included in the non-AP STA MLD may request transmission of all or a part of the updated parameter related to another AP of the non-primary link to the AP connected through a primary link.

In this case, when the complete information is requested/transmitted as a response, it means that information having the same level as an AP (reporting AP) responding with the ML probe response frame is requested from/transmitted as a response to an AP (reported AP) of another link. In this case, when the partial information is requested/transmitted as a response, it means that the information of the AP of another link is transmitted as a response only to the information requested by the STA.

When additional information relating to the AP of another link is requested in the ML probe request frame received through a specific link, the AP MLD transmitting the beacon frame may respond with, through the ML probe response frame, not only information on the AP of the specific link but also the requested additional information relating to the AP of another link.

In this case, when the STA MLD has requested complete information on the AP of another link while transmitting the ML probe request frame in a specific link, the AP MLD may need to provide, through an ML probe response frame transmitted as a response in the specific link, information on the AP of another link at the same level as that of the information on the AP of the specific link. In other words, the STA MLD having received the complete information of the AP of another link through a specific link may acquire, with respect to the AP of another link, information at the same level as that when an ML probe response is directly received from the AP of another link.

In this case, when the STA MLD has requested partial information on the AP of another link while transmitting the ML probe request frame in a specific link, the AP MLD may provide, through an ML probe response frame transmitted as a response in the specific link, only requested information (information of a requested element) among the information of the AP of another link. In other words, the STA MLD having received the partial information of the AP of another link through a specific link may additionally acquire only information requested with respect the AP of another link by the STA MLD itself. In this case, the STA MLD requesting the partial information of the AP of another link may transmit the ML probe request frame by including information (which may be indicated by a requested element IDs field) indicating information to be additionally acquired, together with a link ID corresponding to another link. Accordingly, when the ML probe request frame received through a specific link includes information (request element IDs field) indicating information on another link, the AP MLD may additionally indicate, through the ML probe response frame, information indicated with respect to another link.

In this case, when transmitting an ML probe request frame through a specific link, the STA MLD may configure, as 0 or 1, a complete profile subfield (of a per-STA control field included in a multi-link element) corresponding to another link to indicate whether complete information or partial information for another link is requested.

In this case, additional information (complete and partial) of another AP may be transmitted through a per-STA profile included in a multi-link element of an ML probe response frame. The per-STA profile is a field included in the multi-link element with 0 or more than 0, and may include information of another STA (a non-AP STA of an AP) existing in the same MLD as an STA (a non-AP STA of an AP) transmitting a frame including the multi-link element. In this case, the per-STA profile may include a complete profile subfield, and complete information (information having the same level as the STA (the AP and the non-AP) transmitting the frame including the multi-link element) of another STA (the AP and the non-AP STA) corresponding to the per-STA profile having the complete profile subfield indicated as 1 may be acquired through the corresponding per-STA profile. However, parameters/elements meaning the same information as the STA (the AP and the non-AP) having transmitted the corresponding per-STA profile may be omitted by an inheritance rule. The inheritance rule may mean succession and utilization of values of the already indicated same parameter and element (indicated for another STA (the AP and the non-AP)) in a case where the same parameter and element are not indicated to prevent repeated indication of the corresponding parameter and element. That is, when a value of parameter 1 is indicated for STA 1 and a value of parameter 1 is not indicated for STA 2, it may be interpreted, through the inheritance rule, that the value of parameter 1 for STA 2 is indicated to be identical to the value of parameter 1 for STA 1.

In this case, a per-STA profile subelement included in a multi-link element transmitted by an NSTR AP MLD may not include a beacon interval subfield for indicating an interval at which a beacon is transmitted. That is, when indicating the per-STA profile subelement corresponding to an AP of a non-primary link in the multi-link element, the NSTR AP MLD may need to configure a beacon interval present subfield as 0. This may be because a period of a beacon frame does not separately exist since an AP operated in the non-primary link of the NSTR AP MLD transmits no beacon frame. That is, the per-STA profile subfield (of the probe response and association response frame) corresponding to the non-primary link AP of the NSTR AP MLD may have a beacon interval present subfield indicated as 0 even though a complete profile subfield (of the per-STA control field) is indicated as 1. That is, beacon interval information of the AP of the non-primary link does not exist even when the complete information is indicated.

Similarly, DTIM information (DTIM count and DTIM period information) of the AP of the non-primary link may not exist even when the complete information is indicated. That is, the per-STA profile corresponding to the non-primary link AP of the NSTR AP MLD may have a DTIM info present subfield indicated 0 even though the complete profile subfield (of the per-STA control field) is indicated as 1.

That is, a beacon is not transmitted through a non-primary link, and thus even when the non-AP STA MLD requests all information (or all updated information) of another AP of the non-primary link through the AP of the primary link (that is, when the complete information is configured as "1"), the beacon interval and DTIM information of the AP of the non-primary link may not exist in the ML probe response frame. That is, the beacon interval and DTIM information may not be included in the per-STA profile subelement of the AP of the non-primary link included in the ML probe response frame.

In this case, even though all information (or all updated information) of another AP of the non-primary link is requested, the AP MLD may not include, in the ML probe response frame, the beacon interval and DTIM information of the AP of the non-primary link. Accordingly, in this case, the AP MLD may transmit the beacon interval present subfield and DTIM info present subfield by configuring a value (for example, "0") indicating that the respective fields are not included.

In a case of the NSTR AP MLD, the beacon frame is not transmitted in the non-primary link, and thus when information on the AP of the non-primary link is indicated, the DTIM information and the beacon interval information may not be indicated. That is, the NSTR AP MLD may need to always indicate, as 0, the DTIM info present subfield of the per-STA profile (more precisely, an STA control field) corresponding to the AP of the non-primary link. That is, the NSTR AP MLD may need to always indicate, as 0, the beacon interval present subfield in the per-STA profile corresponding to the AP of the non-primary link. Accordingly, even when the NSTR AP MLD receives an ML probe request frame for requesting complete information, or receives a (ML) (re) association request frame from the non-AP STA MLD, the NSTR AP MLD may need to always indicate, as 0, the beacon interval present subfield and the DTIM info present subfield of the per-STA profile corresponding to the AP of the non-primary link.

Alternatively, no beacon frame is transmitted in the non-primary link, and thus the NSTR AP MLD may need to configure beacon interval, DTIM count, and DTIM interval subfields as a pre-promised value in the per-STA profile corresponding to the AP of the non-primary link. This may be an operation considered to maintain the same per-STA profile configuration as a general AP MLD (for example, STA AP MLD) when the NSTR AP MLD transmits (responds with) complete information of the AP of the non-primary link. That is, the STA MLD may request complete information of a specific link by using an ML probe request frame, etc. from the AP MLD, and then expect that complete information is to be received as a response to the AP of the specific link in a responding response frame. In this case, when complete information transmitted by the NSTR AP MLD as a response and complete information transmitted as a response have different per-STA profile configures from each other, implementation complexity of a process of acquiring information through the per-STA profile by the STA MLD may be increased. Accordingly, even though the AP of the non-primary link transmits no beacon frame, the NSTR AP MLD may use, when responding with complete information of the non-primary link, a per-STA profile having the same configuration as a per-STA profile used when a general AP MLD responds with complete information. In this case, the per-STA profile corresponding to the non-primary link AP of the NSTR AP MLD may have a beacon interval subfield, a DTIM count subfield, and a DTIM interval subfield, each of which is configured with a pre-configured value. For example, when transmitting complete information of the AP of the non-primary link, the NSTR AP MLD may configure all of the respective bits of the beacon interval subfield of the non-primary link as 0 or 1, or according to a pre-promised scheme. For example, when transmitting complete information of the AP of the non-primary link, the NSTR AP MLD may configure all of the respective bits of the DTIM count subfield of the non-primary link as 0 or 1, or according to a pre-promised scheme. For example, when transmitting complete information of the AP of the non-primary link, the NSTR AP MLD may configure all of the respective bits of the DTIM interval subfield of the non-primary link as 0 or 1, or according to a pre-promised scheme.

Alternatively, no beacon frame is transmitted in the non-primary link, and thus the NSTR AP MLD may configure beacon interval, DTIM count, and DTIM interval subfields with a value related to a beacon frame of the primary link in the per-STA profile corresponding to the AP of the non-primary link. This may be an operation considered to maintain the same per-STA profile configuration as described above. In this case, the per-STA profile corresponding to the non-primary link AP of the NSTR AP MLD may have a beacon interval subfield, a DTIM count subfield, and a DTIM interval subfield, each of which is configured with a value related to a beacon frame transmitted in the primary link. For example, when transmitting complete information of the AP of the non-primary link, the NSTR AP MLD may configure the beacon interval subfield of the non-primary link as a value indicating (meaning) a beacon interval of the primary link. For example, when transmitting complete information of the AP of the non-primary link, the NSTR AP MLD may configure the DTIM count subfield of the non-primary link as a DTIM count value of the primary link. For example, when transmitting complete information of the AP of the non-primary link, the NSTR AP MLD may configure the DTIM interval subfield of the non-primary link as a value indicating (meaning) a DTIM interval of the primary link.

Alternatively, no beacon frame is transmitted in the non-primary link, and thus the NSTR AP MLD may configure beacon interval, DTIM count, and DTIM interval subfields in the per-STA profile corresponding to the AP of the non-primary link with a value having a special purpose. To describe in more detail, the beacon interval subfield of the non-primary link may be configured with a value (a virtual beacon internal) having a special purpose by the AP MLD, for example, a value of calculation. The beacon interval of the conventional Wi-Fi literally means a value related to a time interval in which a beacon frame is transmitted, but is utilized as time units for various BSS operations. For example, a unit such as JointFailureTimeout and QueryFailureTimeout primitive is defined as a beacon interval, and a listen interval field, a PRAW start offset subfield, an AID request interval field, an AID switch count field, an AID response interval field, a minimum transmission interval subfield, a channel quality measurement duration, a color switch countdown subfield (of a BSS color change announcement element), etc. indicate an interval/duration by utilizing a beacon interval (or TBTT) as a basic unit. As such, the beacon interval has a meaning of a value related to an interval in which a beacon frame is actually transmitted, but is a value utilized as a unit of various primitives and fields, and thus even though a beacon frame is not actually transmitted in the non-primary link, a beacon interval for the non-primary link may need to be defined (indicated or configured) for the use of being utilized as units of the above-described primitives/subfields.

That is, even though no beacon frame is transmitted in the non-primary link, the NSTR AP MLD may indicate the beacon interval subfield of the per-STA profile corresponding to the AP of the non-primary link as a beacon interval value for utilizing a time unit of the non-primary link. In this case, the non-AP MLDs may recognize (identify or calculate) a duration and an interval of the above-described primitives and fields (for utilizing the beacon interval as a time unit) on the basis of a value indicated by the beacon interval subfield of the per-STA profile corresponding to the AP of the non-primary link. In this case, the DTIM interval subfield and the DTIM count subfield of the per-STA profile corresponding to the AP of the non-primary link may be also configured according to the operating purpose of the BSS of the AP MLD, and the non-AP MLD operated by the STA in the non-primary link may need to operate on the basis of the configured value when operating the STA of the non-primary link.

The above-described method for configuring a subfield (a beacon interval, a DTIM count, a DTIM interval, etc.) related to the beacon of the non-primary link of the NSTR AP MLD may be also applied the same to not only the per-STA profile transmitted in the primary link but also other frames and subfields (transmitted in the primary link or the non-primary link) including information related to the beacon of the non-primary link.

In addition, the non-AP STA MLD to be associated with the NSTR AP MLD may need to utilize a unit of a listen interval field transmitted when requesting setup of for the primary link and the non-primary link, as a beacon interval of the primary link of the NSTR AP MLD. That is, the non-AP STA MLD transmitting the listen interval field to the NSTR AP MLD may need to calculate and configure the unit of the listen interval field as the beacon interval of the AP operating in the primary link of the NSTR AP MLD. In this case, the listen interval field may be a field indicating information related to a period (time) in which at least one STA switches to a wake state so that the non-AP STA MLD for performing multi-link (re) association receives the beacon frame. In this case, the listen interval field may indicate a value derived when a ListenInterval parameter is indicated in the MLME primitive.

In this case, when transmitting a listen interval field to an AP MLD (for example, an STR AP MLD) other than the NSTR AP NLD, the non-AP STA MLD may need to configure a unit of the listen interval field by using the largest value among beacon intervals of the links (of the AP) for which the non-AP STA MLD itself is to perform setup. For example, when the non-AP STA MLD is to perform multi-link setup of Link 1 or Link 2 with the AP MLD, the non-AP STA MLD may use, as a unit of a listen interval field included in the ML association request frame, a large value a beacon interval of Link 1 (of the AP) and a beacon interval of Link 2. That is, when the beacon interval of Link 1 is 100 ms and the beacon interval of Link 2 is 50 ms, the listen interval subfield unit transmitted by the non-AP STA MLD may be 100 ms.

In general, when the AP and the STA have completed the setup, the STA may receive a beacon frame transmitted by the AP and identify and track (update) a change in the operation parameter and element of the AP. In addition, the beacon frame also performs a role of providing information for adjusting time syncs of STAs within the BSS by including a timestamp field.

However, in a case of the NSTR AP MLD, as described above, no beacon frame is transmitted in the non-primary link, and thus the STA MLD having performed the setup with the NSTR AP MLD may need to perform a separate operation to perform parameter/element tracking (updating) and time sync maintenance for the non-primary link.

According to an embodiment of the present invention, a non-AP STA MLD having associated with an NSTR AP MLD may receive a beacon frame in a primary link, and then may identify a change sequence (in an MLD parameter field of an RNR element) of a non-primary link and transmit an ML probe request. In this case, the ML probe request frame transmitted by the non-AP STA MLD may be transmitted for the purpose of requesting changed parameter and element information of the non-primary link. In this case, the ML probe request frame may correspond to requesting complete information of the non-primary link while configuring a complete profile of a per-STA profile corresponding to the non-primary link (and the AP of the non-primary link) as 1 and transmitting the same. Alternatively, the ML probe request frame transmitted for the purpose of updating a parameter/element of the non-primary link by the STA MLD may correspond to a request for updated information rather than complete/partial information for the non-primary link.

In other words, even when multiple links are established between the non-AP STA MLD and the AP MLD, a frame for performing an association, re-association, or a parameter updating procedure may be performed only through the primary link. For example, when an STA has recognized that a parameter for the AP of the non-primary is updated, through a specific field (for example, a change sequence or a BSS parameter change count subfield (BSS parameter change count subfield, etc.)) indicating whether a parameter for another AP included in neighbor AP information included in the beacon frame is updated, the non-AP STA MLD may request transmission of the updated parameter through the primary link rather than the non-primary link of another AP. That is, the non-AP MLD cannot transmit a frame (for example, a probe request frame, etc.) for requesting an updated parameter through the non-primary link.

For example, after performing setup with the NSTR AP MLD, the non-AP STA MLD for requesting information for updating the parameter/element of the non-primary link may request an updated parameter/element for the AP of the non-primary link by configuring an updated profile subfield of the per-STA profile corresponding to the non-primary link as 1 in an ML probe request frame transmitted through the primary link. The NSTR AP MLD may respond with an ML probe response frame including changed information (parameter and element) of the non-primary link when the updated profile subfield is indicated as 1 in the per-STA profile (corresponding to the non-primary link) of the received ML probe request frame.

In this case, the per-STA profile field of the ML probe request frame transmitted by the non-AP STA MLD may include an updated profile subfield and a recorded change sequence subfield. The recorded change sequence subfield may indicate an up-to-date change sequence value maintained for the non-primary link by the non-AP STA MLD, and the AP MLD may identify/determine the type of updated information on the basis of a value indicated through the recorded change sequence subfield.

For example, the NSTR AP MLD may have changed parameter 1 by increasing a change sequence number of the non-primary link from 100 to 101, and have changed parameter 2 by increasing the change sequence number again from 101 to 102. In this case, the STA MLD may request updated information of the non-primary link while transmitting the ML probe request frame. In this case, when the non-AP STA MLD indicates the recorded change sequence subfield as 100, the NSTR AP MLD may respond with an ML probe response frame including both parameter 1 and parameter 2, and when the non-AP STA MLD indicates the recorded change sequence subfield as 101, the NSTR AP MLD may respond with an ML probe response frame including parameter 2 only.

In this case, the non-AP STA MLD may indicate the complete profile subfield as 0 without utilizing a separate updated profile subfield to request the updated profile. That is, a method for requesting an updated profile by a non-AP STA MLD may be configuring a complete profile subfield as 0, and in this case, a separate updated profile subfield may not be included in a per-STA profile.

FIG. 14 illustrates an example of a per-STA profile subelement format according to an embodiment of the present invention.

Referring to FIG. 14(*a*), a per-STA profile subelement may include an STA control field. The STA control field (see FIG. 14(*b*)) indicates information for indicating the type of a field included in an STA profile (see FIG. 14(*a*)) of the corresponding per-STA profile subelement. In this case, when a complete profile subfield of an STA control field of a specific per-STA profile subelement transmitted by an AP MLD other than an NSTR AP MLD is indicated as 1, all of a MAC address present subfield, a beacon interval present subfield, and a DTIM information present subfield may need to be indicated as 1. However, as described above, the NSTR AP MLD does not transmit a beacon frame in a non-primary link, and thus information related to the beacon frame of the non-primary link may not be indicated in the per-STA profile subelement corresponding to the non-primary link. That is, even though a complete profile subfield of a specific per-STA profile subelement (corresponding to an AP of the non-primary link) transmitted by the NSTR AP MLD is indicated as 1, a beacon interval present subfield and a DTIM information present subfield may be indicated as 0.

In addition, as described in an embodiment above, a non-AP STA MLD for transmitting an ML probe request frame to an NSTR AP MLD may indicate an updated profile subfield of an STA control field (included in a per-STA profile subelement corresponding to an AP of a non-primary link) as 1 to request changed information (updated information) of the non-primary link AP from the AP of the primary link. In this case, the non-AP STA MLD may indicate, using a recorded change sequence subfield (see FIG. 14(*c*)), a recorded change sequence value corresponding to information related to a time point at which the non-AP STA MLD itself updates the information of the non-primary link AP. In this case, the recorded change sequence subfield may be a subfield included in an STA profile. The NSTR AP MLD may receive the ML probe request frame of the non-AP STA MLD, received through the primary link, and then compare a value of the recorded change sequence subfield included in the ML probe request frame with a change sequence value of a current non-primary link AP, thereby determining non-primary link AP information to be sent as a response to the non-AP STA MLD.

Figure 15:
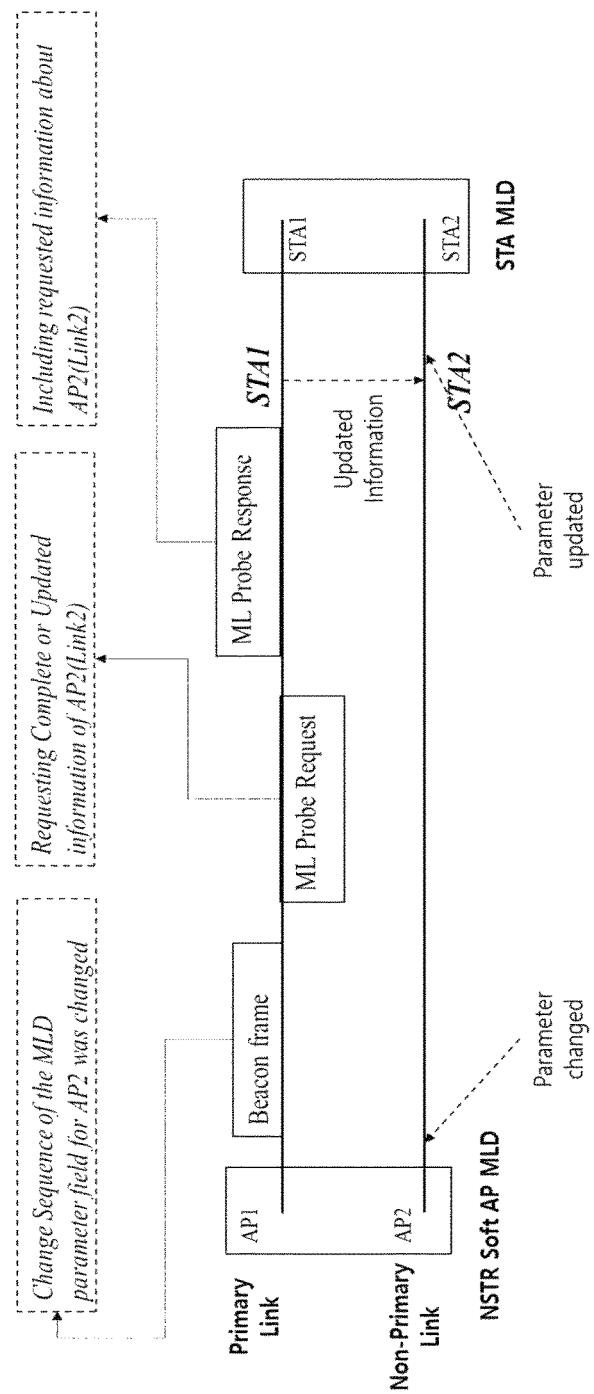
FIG. 15 illustrates an example of a process of updating information of a non-primary link by a non-AP MLD having performed setup with a non-simultaneous transmission and reception (NSTR) soft AP MLD according to an embodiment of the present invention.

FIG. 15 illustrates an example of a process of updating information of a non-primary link by a non-AP MLD having performed setup with a non-simultaneous transmission and reception (NSTR) soft AP MLD according to an embodiment of the present invention.

Referring to FIG. 15, an NSTR AP MLD may change a parameter of AP 2 operating in Link 2 corresponding to a non-primary link, and then indicate that the change of the parameter of AP 2 through a beacon frame transmitted by AP 1 operating in Link 1 corresponding to a primary link. In this case, the information on the change of the parameter of AP 2 may be indicated through an increase, by 1 compared to a value indicated by an immediately preceding beacon frame, in a change sequence subfield value corresponding to AP 2 in an RNR element included in a beacon frame transmitted by AP 1.

After receiving, through STA 1, the beacon frame transmitted by AP 1, the non-AP STA MLD may recognize the fact that the parameter of AP 2 has been updated. To acquire changed parameter information of AP 2, the non-AP STA MLD may transmit an ML probe request frame through STA 1.

The ML probe request frame transmitted through STA 1 by the non-AP STA MLD may include, in an ML element, a per-STA profile subelement corresponding to AP 2, and the per-STA profile subelement may include an indicator for indicating whether a complete profile is requested or an updated profile is requested.

After receiving the ML probe request frame from STA 1 through the primary link, the NSTR AP MLD may respond to STA 1 by including the requested AP 2 information (complete or updated information) in an ML probe response frame.

The non-AP STA MLD having received the AP 2 information requested by the non-AP STA MLD itself from the NSTR AP MLD through the ML probe response frame may update the parameter for AP 2 to complete parameter updating for the non-primary link in which the beacon frame is not transmitted.

<Broadcast ML Probe Response>

According to an embodiment of the present invention, an NSTR AP MLD may transmit a broadcast ML probe response frame through a primary link when information related to an AP operated in a non-primary link is changed. After receiving the broadcast ML probe response frame transmitted by the NSTR AP MLD through the primary link, the non-AP STA MLD may need to update information on the non-primary link (of an AP). In this case, the broadcast ML probe response frame may be an ML probe request frame transmitted by the NSTR AP MLD without a separate request, rather than transmitted as a response to an ML probe request frame transmitted by a specific STA.

The broadcast ML probe response frame takes a role of assisting non-AP STA MLDs in updating changed parameters and elements of the non-primary link, including the per-STA profile subelement corresponding to the AP of the non-primary link. In this case, (recorded) change sequences of the non-primary link maintained by the respective non-AP STAs may be different from each other, and thus the broadcast ML probe response frame may include complete information for the AP of the non-primary link. In this case, the broadcast ML probe response frame may be transmitted together with a DTIM beacon frame.

Accordingly, when a change sequence number corresponding to the AP of the non-primary link is different from the (recorded) change sequence maintained by the non-AP STA MLDs themselves, the non-AP STA MLDs may need to receive the next DTIM frame through the beacon frame and the broadcast ML probe response frame.

In this case, a procedure of updating the parameter of the non-primary link using the above-described broadcast ML probe response frame may need to be performed using a broadcast ML association response frame. In this case, a detailed description of a method for setting up a per-STA profile subelement of the broadcast ML association response frame and a procedure of updating a reception STA MLD is omitted since the description is identical to that of the above-described embodiment of the broadcast ML probe response frame.

Figure 16:
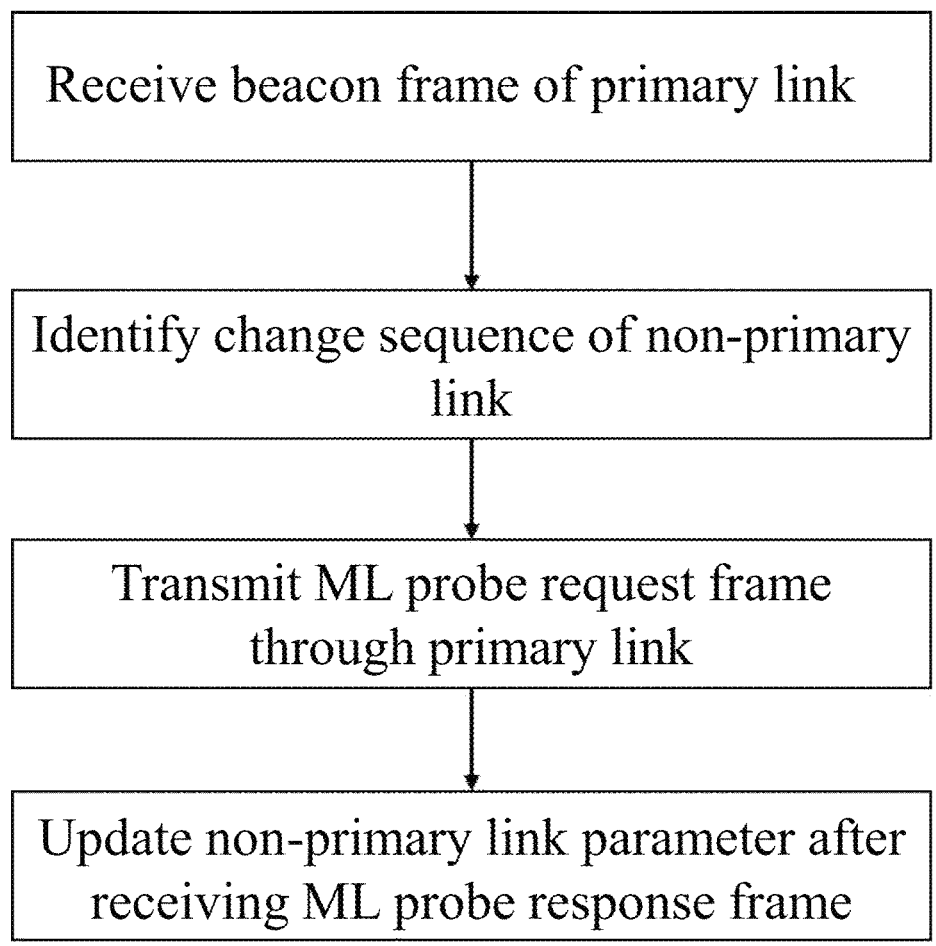
FIG. 16 is a flow chart illustrating an example of a procedure of updating a parameter of a non-primary link by a non-AP STA MLD associated with an NSTR AP MLD according to an embodiment of the present invention.

FIG. 16 is a flow chart illustrating an example of a procedure of updating a parameter of a non-primary link by a non-AP STA MLD associated with an NSTR AP MLD according to an embodiment of the present invention.

A non-AP STA MLD receives a beacon frame identifies a change sequence (in an MLD parameter field of an RNR element) of a non-primary link after receiving a beacon frame in a primary link. If the identified change sequence value of the non-primary link is different from a (recorded) change sequence value maintained by the non-AP STA MLD itself, the non-AP STA MLD may transmit an ML probe request frame through the primary link. In this case, the ML probe request frame may include a subfield indicating whether complete information or updated information for the non-primary link AP is requested. In addition, the ML probe request frame requesting updated information may be configured to also include a subfield indicating a (recorded) change sequence value maintained by the non-AP STA MLD itself. Thereafter, the non-AP STA MLD having received an ML probe response frame from the AP MLD performs parameter updating on the basis of information on the non-primary link AP, included in the ML probe response frame received as a response.

<Time Sync Management of Non-Primary Link>

As described above, a beacon frame transmitted by an AP takes a role of transferring information on various types of parameters and elements, and assisting STAs in the BSS in adjusting time syncs. A TimeStamp field included in the beacon frame may indicate a timing synchronization function (TSF) timer value at a time point at which a data symbol including a first bit of the TimeStamp field is shown on a transmission antenna connector, and an STA having received the TimeStamp field may synchronize its own TSF timer with the AP on the basis of the received TimeStamp field value.

As such, the AP and the STA may operate while maintaining the time sync on the basis of the TimeStamp value included in the beacon frame, and may perform a timing-based operation. However, the NSTR AP MLD cannot transmit the beacon frame through a non-primary link, and accordingly, an STA associated with a non-primary link AP of the NSTR AP MLD among STAs of the non-AP STA MLD needs to use a method other than the beacon frame in order to maintain the time sync with the AP.

To maintain the time sync with the non-primary link AP of the NSTR AP MLD, the associated non-AP STA may need to you TimeStmap of a TIM frame transmitted by the AP. The TIM frame includes a TimeStamp field having the same function as the beacon frame, and thus an STA having received the TIM frame from the non-primary link of the NSTR AP MLD may need to manage a TFS timer by using the TimeStamp field included in the TIM frame. However, in a case of the NSTR AP MLD, initiating transmission in the non-primary link without occupying the primary link may be restricted, and thus when the beacon frame is transmitted in the primary link, the TIM frame may need to be simultaneously transmitted in the non-primary link. That is, the non-AP STA MLD associated with the NSTR AP MLD may need to prepare to receive the TIM frame in the non-primary link in accordance with a TBTT of the primary link.

In another embodiment of the present invention, when the AP MLD corresponds to an NSTR AP MLD not supporting simultaneous transmission or reception, the same TSF time may be used in the respective links for multiple APs included in the NSTR AP MLD, and the TSF timer used in this case may be a TSF timer of the primary link. That is, when the AP MLD is the NSTR AP MLD, links (non-primary links) for the APs affiliated with the NSTR AP MLD may use the TSF timer of the primary link.

That is, the non-AP STA MLD associated with the NSTR soft AP MLD may need to use the TSF timer of the primary link in common with the non-primary link. In other words, the non-AP STA MLD associated with the NSTR AP MLD may use the TSF timer managed using the primary link, without having a separate TSF time for the non-primary liked (based on the NSTR soft AP MLD). That is, in an aspect of the present invention, the NSTR AP MLD and the non-AP STA MLD associated with the NSTR AP MLD may use an MLD level (MLD unit, MLD common) timer. In this case, for a stable operation of the NSTR AP MLD and the non-AP STA MLD associated with the NSTR AP MLD, it may be required to maintain that time synchronization between the respective APs of the NSTR AP MLD and/or the respective STAs of the non-AP STA MLD associated with the NSTR AP has an error equal to or less than a pre-promised value. For example, it may be required for the NSTR AP MLD to maintain that a TimeStamp difference (or a difference between timers) maintained between the AP of the primary link and the AP of the non-primary link is equal to or less than a pre-promised/configured value. For example, it may be required for the NSTR soft AP MLD to maintain that a TimeStamp difference maintained between the AP of the primary link and the AP of the non-primary link is equal to or less than a pre-promised/configured value.

In other words, the TSF timer of the primary link may be maintained (or applied or used) the same in links for all of the APs affiliated with or included in the NSTR AP MLD. In addition, a difference between TSF timers or timestamps or two APs among APs affiliated with or included in the NSTR AP MLD may be restricted to be within a specific value (for example, 30 us).

That is, TSF timers of all of the APs affiliated with or included in the NSTR AP MLD may be identical, and a clock drift or a difference between TSF timers or timestamps between two APs (for example, the AP of the primary link and the AP of the non-primary link) affiliated with or included in the AP MLD or the NSTR AP MLD may be restricted to be within a specific value (for example, ±30 us), and in this case, the AP MLD or the NSTR AP MLD may amend the TSF timer or the timestamp so that the clock drift or the difference between the TSF timers is within the specific value.

In addition, when receiving the TIM frame through the non-primary link, the non-AP STA MLD associated with the NSTR AP MLD may need to receive a next beacon frame transmitted in the primary link. More specifically, when the non-AP STA MLD has received the TIM frame through the STA of the non-primary link and a value indicated by a check beacon field in a TIM frame action field is different from a check beacon value maintained by the non-AP STA MLD itself, the non-AP STA MLD may need to receive a next beacon frame transmitted in the primary link. In this case, the next beacon frame may mean a beacon frame transmitted to correspond to a TBTT of the primary link existing after a time point of receiving a TIM frame in the non-primary link. In this case, when the next beacon frame is received, it may mean that updating a parameter of the non-primary link through a per-STA profile (corresponding to the AP of the non-primary link) included in the beacon frame is accompanied (included). In this case, a parameter to be updated may be restricted to a parameter related to critical update.

<Channel Switching and Channel Quieting Procedures of Non-Primary Link>

As described above, the NSTR AP MLD transmits no beacon frame in the non-primary link, and accordingly, a BSS operation performed on the basis of a transmission timing of the beacon frame may be performed in a difference manner from that of a BSS operation of a general AP MLD.

In the conventional Wi-Fi, a BSS operation channel frequency (operation frequency band) may be changed according to a procedure pre-promised between the AP and the STA. In this case, the conventional extended channel switching (ECS) operation may be utilized, and a channel switching mechanism newly defined in 11be may also be utilized. When the AP determines to change the BSS operation channel, the AP may transmit a beacon frame, a probe response fame, an extended channel switch announcement frame, etc., and notify of the same so that associated STAs can switch to a new channel or operating class while maintaining the association. In this case, the AP transmits the extended channel switch announcement element through the beacon frame, and a channel switch count field of the corresponding element indicates information on the number of times that the beacon frame will be transmitted before the channel switching (operation channel switching) is performed. If the AP includes, in the beacon frame, a MAX channel switch time element together with the extended channel switch announcement element, the AP may need to transmit the first beacon frame within a switch time field (of the max channel switch time element) in a new channel. That is, the beacon frame transmitted in the new channel needs to be transmitted while having a time interval from the last beacon frame transmitted in the current channel, the time interval shorter than a time interval indicated through the switch time field.

With reference to the above-described channel switching operation of the conventional Wi-Fi BSS, the AP of the BSS may indicate, to the STA through the beacon frame transmitted in the current channel, information on a new channel, information on a time point at which channel switching is performed, and information related to a time point at which the beacon frame first transmitted in the new channel. The STA of the BSS may move to a new channel within a determined time interval (a time interval indicated by the AP) on the basis of the channel switching-related information included in the beacon frame transmitted by the AP, and may thus complete the channel switching while maintaining the association with the AP. As such, the channel switching procedure of the conventional Wi-Fi BSS may be performed in a scheme in which information (a channel switch mode, a new operating class, a new channel number, a channel switch count, etc.) required for channel switching is provided through the beacon frame transmitted by the AP, and accordingly, the non-primary link BSS of the NSTR AP MLD transmitting no beacon frame cannot perform channel switching using the conventional channel switching procedure.

In addition, when the conventional Wi-Fi configures a quiet interval, information on a time interval to which a quite interval is applied is indicated through elements (a quiet element, a quiet channel element, etc.) included in the beacon frame transmitted by the AP of the BSS, and similar to the channel switching procedure, the non-primary link of the NSTR AP MLD transmitting no beacon frame cannot use the conventional quieting procedure for configuring the quiet interval.

According to an embodiment of the present invention, the NSTR AP MLD may indicate, through the beacon frame transmitted in the primary link, information required to switch an operating channel of the non-primary link (information required to perform channel switching) and/or information required to configure a quiet interval. That is, the non-AP STA MLDs associated with the NSTR AP MLD may operate on the basis of the information acquired through the beacon frame of the primary link to perform channel switching of the non-primary link. That is, the non-AP STA MLDs associated with the NSTR AP MLD may acquire information related to the quiet interval of the non-primary link through the beacon frame of the primary link.

That is, in the case of an STR AP MLD, APs included in the same AP MLD may periodically transmit beacon frames. In this instance, when transmitting a beacon frame, each AP may include basic information associated with another AP in the beacon frame for transmission. The basic information associated with the other AP may include information related to channel switching of the other AP (e.g., a channel switch announcement element, an extended channel switch announcement element, a max channel switch time element (max channel switch element)) and/or information for configuring a quiet interval.

In this instance, the channel switch announcement element and the extended channel switch announcement element may include a new channel number field indicating a channel number to which a channel is to be switched and a channel switch count field.

The channel switch count field indicates the number of TBTTs until an STA that transmits the channel switch count field performs channel switching to a new channel. In the case in which the value of the channel switch count field is configured to '1', channel switching occurs at a subsequent TBTT. In the case in which the value of the channel switch count field is configured to '0', the channel switching may occur any time after the transmission of the channel switch count field.

The channel switch announcement element and the extended channel switch announcement element may be included in a channel switch announcement frame, a beacon frame, and a probe response frame for transmission.

A station (STA) may further include a new operating class field indicating an operating class, to which a class is to be changed, in the extended channel switch announce element for transmission.

The max channel switch time element may indicate an interval in which a beacon is capable of being transmitted on a changed channel from the point in time at which channel switching starts. For example, in the case in which channel switching is successfully performed, an STA (e.g., an AP STA) that performs channel switching may transmit a beacon on a newly changed channel from the point in time at which the channel switching starts to the point indicated by the max channel switch time element.

In this instance, the max channel switch time element may include a switch time field indicating an interval for transmitting a beacon on a new channel.

Channel switching information for channel switching of another AP included in the same AP MLD may be transmitted by each AP on assumption that APs included in the same AP MLD periodically transmit beacons. However, APs that support NSTR among the APs included in the same AP MLD may transmit beacon frames only via a primary link. That is, only predetermined APs among a plurality of APs included in the same AP MLD may perform beacon transmission via the primary link, and the remaining APs may not perform beacon transmission. Therefore, in this instance, although APs of a non-primary link do not transmit beacon frames, an AP of the primary link may include channel switching information of the APs of the non-primary link in a beacon frame and transmit the same.

More specifically, the NSTR AP MLD may need to include a per-STA profile associated with an AP of the non-primary link in a beacon frame (and an (ML) probe response frame) of the primary link when performing channel switching of the non-primary link or configuring a quiet interval.

FIG. 17 illustrates an example of the formats of elements according to an embodiment of the present invention. FIG. 17 illustrates an example of the format of each element that has been described above.

Referring to FIG. 17, a per-STA profile associated with (corresponding to) an AP of a non-primary link may has a configuration including at least one among a channel switch announcement element, an extended channel switch announcement element, a max channel switch time element, a quiet element, and a quiet channel element.

Timing fields of the elements may be configured based on a target beacon transmission time and a beacon interval of a primary link.

Specifically, in the case in which APs included in a general AP MLD include channel switching information of other APs in frames and perform transmission, elements for channel switching of the other APs (e.g., a channel switch announcement element, an extended channel switch announcement element, a max channel switch time element, a quiet element, a quiet channel element, and the like) may be configured and transmitted based on an AP that performs channel switching, as opposed to an AP that transmits channel switching information.

However, in the case of an AP MLD that supports NSTR (NSTR AP MLD), only an AP of a primary link transmits a beacon frame, and an AP of a non-primary link does not transmit a beacon frame. Therefore, channel switching information of the AP of the non-primary link and/or quite interval-related information may be configured based on the AP of the primary link, as opposed to the AP of the non-primary link.

Specifically, an AP included in an AP MLD may transmit a per-STA profile which includes channel switching information and/or quiet interval-related information associated with APs of a non-primary link by using a predetermined frame (e.g., a beacon frame) via a primary link. In this instance, the channel switching information and/or quiet interval-related information associated with the APs of the non-primary link may be configured based on the AP of the primary link.

For example, timing fields (e.g., time-related fields including duration-related fields (a switch time, a quiet duration field, and the like), time point-related fields (a channel switch count, a quiet count field, and the like), and the like) included in a channel switch announcement element, an extended channel switch announcement element, a quiet element, and/or a quiet channel element may need to be applied with reference to the latest TBTT and BI indicated in a corresponding element of an AP that operates in a primary link.

A primary link AP of an NSTR AP MLD may need to configure timing fields of the channel switch announcement element, the extended channel switch announcement element, the max channel switch time element, the quiet element, and the quiet channel element included in the per-STA profile (included in a beacon frame and a (ML) probe response frame) for the AP of the non-primary link with reference to the beacon interval and the TBTT of the primary link AP itself. In this case, the timing fields are utilized to collectively indicate time-related fields including duration-related fields (switch time field, quiet duration field, etc.) and time point-related fields (channel switch count field, quiet count field, etc.).

Accordingly, non-AP MLDs combined with the NSTR AP MLD may receive a beacon frame from the AP of the NSTR AP MLD operated in the primary link, and then acquire information related to a quiet interval and/or channel switching of the non-primary link from a per-STA profile included in the beacon frame, and may need to interpret the information related to the quiet interval and/or the information related to channel switching of the non-primary link with reference to the TBTT and the beacon interval (BI) of the primary link. In this case, the per-STA profile means a per-STA profile corresponding to the AP of the non-primary link.

The NSTR AP MLD may need to transmit a TIM frame (of the non-primary link) in a new channel within a time indicated through a switch time field (of a max channel switch time element) after completing channel switching (after completing announcement and channel switching) of the non-primary link through the beacon frame of the primary link. That is, the non-primary link AP of the NSTR AP MLD may need to transmit a TIM frame in a new channel after performing channel switching. In this case, the non-primary link AP may need to transmit the TIM frame in the new channel within the time indicated through the switch time field after the beacon frame having indicated the channel switch count subfield as 1 (or 0) is transmitted in the primary link. In this case, the channel switch count field and the switch time field may be included in the per-STA profile (corresponding to the non-primary AP) included in the beacon frame transmitted in the primary link. In this case, the TIM frame may be substituted by another frame transmitted in the new channel of the primary link or the non-primary link. For example, the NSTR AP MLD may transmit a beacon frame indicating information related to completion of channel switching in the primary link after completing channel switching of the non-primary link. In this case, the beacon frame may be an additional beacon frame transmitted regardless of the TBTT. In this case, the beacon frame may be a beacon frame having a configuration including complete information for the non-primary link. For example, the beacon frame having a configuration including the complete information for the non-primary link may be a beacon frame having a complete information subfield of the per-STA profile corresponding to the AP of the non-primary link as 1. In this case, the beacon frame of the primary link transmitted after termination of channel switching of the non-primary link and the beacon frame transmitted before the channel switching starts may need to be transmitted within a pre-promised time. In this case, the pre-promised time may be a time indicated through a switch time field (of the max channel switch time element). Alternatively, the beacon frame may be a beacon frame including indication related to channel switching of the non-primary link. For example, the beacon frame of the primary link, transmitted after completion of the channel switching in the non-primary link may include a channel switch complete subfield. In this case, the channel switch complete subfield may be a subfield included in the ML element. A specific switch complete subfield may be a subfield indicated by 1 when channel switching of the AP corresponding to the per-STA profile including the specific subfield is completed. That is, the AP may need to configure the channel switch complete subfield of the per-STA profile (of the beacon frame) corresponding to the AP of the non-primary link as 1 after completing the channel switching in the non-primary link. In this case, the beacon frame related to the channel switching may be also transmitted (utilized) for the same purpose in a case where the AP MLD is not the NSTR AP MLD, that is, by a general AP MLD.

Only when a non-AP MLD associated with an NSTR AP MLD performs channel switching of a non-primary link via a primary link, and receives an agreed frame (e.g., a TIM frame or another frame of the non-primary link and/or a beacon frame indicating information related to completion of channel switching of the primary link) from an AP MLD, the non-AP MLD may perform operation, considering that the channel switching of the non-primary link is completed. That is, information associated with channel switching (e.g., channel switching information or the like) of an AP of a non-primary link included in the AP MLD that supports NSTR may be transmitted via an AP of the primary link. In this instance, although channel switching is completed, the AP of the non-primary link does not belong to the primary link, the AP of the non-primary link may be incapable of transmitting a beacon frame on a changed channel. Therefore, in this instance, in the case in which channel switching is completed, the AP of the non-primary link may transmit a TIM frame indicating completion of channel switching so as to indicate that channel switching has been completed to an STA of the non-AP MLD. Alternatively, the AP of the primary link transmits a beacon frame indicating completion of channel switching of the AP of the non-primary link so as to indicate the completion of channel switching to the STA of the non-AP MLD.

If it is considered that channel switching is not completed, the non-AP STA MLD considers that channel switching of the non-primary link is cancelled and may need to perform operation (returning to a previous channel) on a previous channel (a channel before channel switching is performed).

As another example, an NSTR soft AP MLD may configure a predetermined subfield of a beacon frame transmitted in the primary link to a predetermined value, while the non-primary link AP (a BSS of the AP) performs channel switching. More particularly, a beacon frame that the NSTR soft AP MLD transmits via the primary link may include a subfield which maintains a value of 1 or 0 when the AP of the non-primary link performs channel switching, and maintains a value of 0 or 1 during a time interval in which the AP of the non-primary link does not perform channel switching. That is, the NSTR soft AP MLD may need to configure the subfield based on whether the AP of the non-primary link is performing channel switching. In this instance, the subfield may be a subfield included in an RNR element or per-STA profile corresponding to the AP of the non-primary link.

In the case in which the NSTR soft AP MLD determines the value of the subfield based on whether the AP of the non-primary link is performing channel switching, as described above, the non-AP MLD associated with the NSTR soft AP MLD may determine whether channel switching of the non-primary link AP (BSS) is ongoing based on the value of the subfield indicated by a beacon frame received in the primary link. That is, the non-AP MLD may identify that the subfield corresponding to the AP of the non-primary link is indicated as a predetermined value (e.g., 1) in the beacon frame received via the primary link, and may recognize that the AP of the non-primary link is performing channel switching. In the case in which the subfield corresponding to the AP of the non-primary link is identified as being different from a predetermined value in the beacon frame received via the primary link, the non-AP MLD may recognize that the AP of the non-primary link has completed channel switching planned. In this instance, the meaning of the completion may include both completion or cancellation of a channel switching operation indicated by an (extended) channel switching announcement element corresponding to the AP of the non-primary link, which is received last. In the case in which the subfield corresponding to the AP of the non-primary link is a value (a value different from a value indicated when channel switching is ongoing)

different from a predetermined value, the non-AP MLD may consider that the AP of the non-primary link is operating in an operating channel/class indicated via a beacon frame (or probe response frame) received last. In the case in which the non-AP MLD needs to transmit an UL PPDU via the non-primary link, the non-AP MLD may need to perform UL PPDU transmission based on whether the AP of the non-primary link is operating in a recognized channel (class). For example, only when the subfield corresponding to the AP of the non-primary link is indicated as a value different from a predetermined value, the non-AP MLD may transmit a UL PPDU. Conversely, in the case in which the subfield corresponding to the AP of the non-primary link is indicates as a predetermined value, the non-AP MLD may consider that the AP of the non-primary link is performing channel switching and may not transmit a UL PPDU.

As another example, until the AP (the BSS of the AP) of the non-primary link completes channel switching, the NSTR soft AP MLD may maintain a critical update flag of a beacon frame (or a probe response frame) as 1. The NSTR soft AP MLD may include an (extended) channel switching announcement element corresponding to the AP of the non-primary link in a beacon frame, so as to assist the non-AP MLDs in recognizing planned channel switching of the non-primary link. In this instance, in the case of including the (extended) channel switching announcement element in the beacon frame (transmitted via the primary link) and transmitting the same, the NSTR soft AP MLD needs to configure the critical update flag subfield of the beacon frame to 1. NSTR Soft AP MLD may maintain the value of the critical update flag subfield as 1 until channel switching of the non-primary link is completed, and thus may enable the non-AP MLDs to recognize that channel switching of the non-primary link is ongoing. In this instance, the NSTR soft AP MLD may need to include the (extended) channel switch announcement element (corresponding to the AP of the non-primary link) in the beacon frame until the AP of the non-primary link completes channel switching. In this instance, when the AP of the non-primary link is performing channel switching, the NSTR soft AP MLD may need to indicate, as 0, the channel switch count subfield of the channel switch announcement element corresponding to the AP of the non-primary link. In this instance, when the AP of the non-primary link is performing channel switching, the NSTR soft AP MLD may need to indicate the SwitchTime subfield of a channel switch timing element corresponding to the AP of the non-primary link by using a time value until an expected point in time of channel switching completion. In this instance, the NSTR soft AP MLD may configure the SwitchTime subfield to a predetermined value (e.g., 65535), and may not specify the point in time of the channel switching completion of the non-primary link AP.

In the case in which the NSTR soft AP MLD maintains the value of a critical update flag subfield as 1 when the AP of the non-primary link is performing channel switching, as described above, the non-AP MLDs may not perform UL PPDU transmission in the non-primary link when the value of a critical update subfield is 1. More particularly, when the critical update flag subfield of a beacon (probe response) frame received from the NSTR soft AP MLD is 1 and a channel switch count subfield corresponding to the non-primary link AP is indicated as 0, the non-AP MLDs may not perform UL PPDU transmission in the non-primary link. More particularly, when the critical update flag subfield of a beacon (probe response) frame received from the NSTR soft AP MLD is 1 and a SwitchTime subfield corresponding to the non-primary link AP is indicated as a value different from 0, the non-AP MLDs may not perform UL PPDU transmission in the non-primary link.

As another example, when the non-primary link AP (the BSS of the AP) completes channel switching, the NSTR soft AP MLD may increase a BSS parameter change count subfield value corresponding to the non-primary link AP by 1 and may indicate the same. In this instance, the BSS parameter change count subfield refers to a BSS parameters change count subfield included in an MLD parameters field of a TBTT information field corresponding to the AP of the non-primary link. A general AP MLD increases the value of a BSS parameters change count subfield by 1 only when the AP's parameter corresponding to the BSS parameters change count subfield is updated. However, the NSTR soft AP MLD may also increase the value of a BSS parameters change count subfield corresponding to the AP of the non-primary link by 1 when channel switching is completed. To increase the value of a BSS parameters change count subfield may be understood as a method of indicating that a channel switching operation indicated with respect to the AP of the non-primary link is completed. In the case in which the non-AP MLD recognizes that the channel switching of the non-primary link AP is planed/ongoing and the value of the BSS parameters change count subfield is increased by 1, the non-AP MLD may recognize that the planned/ongoing channel switching is completed. In this instance, upon recognition of the completion of the planned/ongoing channel switching, the non-AP MLD may transmit a UL PPDU. Operation of the non-AP MLD in association with a condition for transmitting an UL PPDU is the same as the above-described example of other channel switching completion indication methods, and thus, a detailed description thereof is omitted.

As another example, in the primary link, the NSTR soft AP MLD may transmit a frame including a subfield indicating different values for each case when channel switching of the AP (the BSS of the AP) of the non-primary link is planned, ongoing, and completed. In this instance, the frame may be a beacon frame. More particularly, when channel switching of the non-primary link AP is planned, the NSTR soft AP MLD may indicate an (extended) channel switch announcement element corresponding to the non-primary link AP, and may indicate a predetermined subfield as a predetermine value (e.g., 1). When channel switching of the non-primary link AP is initiated, the NSTR soft AP MLD may configure the predetermined subfield to another value (e.g., 2) different from the predetermined value until the channel switching is completed. When the channel switching of the non-primary link AP is completed, the NSTR soft AP MLD may configure the predetermined subfield to an initial value (e.g., 0). As described above, the NSTR soft AP MLD configures the value of the predetermined subfield corresponding to the non-primary link AP to a value different for each case when the channel switching is planned, ongoing, and completed (not planned) so as to enable associated non-AP MLDs to recognize the progress of the channel switching. The non-AP MLD may identify the predetermined subfield included in a frame received in the primary link, and may determine whether to transmit a UL PPDU in the non-primary link. For example, the non-AP MLD may transmit a UL PPDU only when the predetermined subfield received most recently is an initial value.

As another example, the non-AP MLD may determine whether the AP of the non-primary link completes channel switching based on a beacon frame of the primary link received beyond an expected time of channel switching completion of the non-primary link AP indicated (announced) by the NSTR soft AP MLD.

In more detail, based on a channel switching completion time of the non-primary link AP identified from elements related to channel switching, the non-AP MLD may identify operating channel/class information of the non-primary link AP indicated by a beacon frame received in the primary link beyond the completion time, and may determine whether planned channel switching is completed. In this instance, the method of identifying the channel switching completion time of the non-primary link AP via the elements related to the channel switching is to use a value indicated via the SwitchTime subfield of a channel switch timing element. When the non-AP MLD identifies that information same as an operating channel/class for which channel switching has been planned is indicated for the non-primary link AP in a beacon frame received beyond the expected channel switching completion time, the non-AP MLD may determine that the AP of the non-primary link completes the planned channel switching and may transmit a UL PPDU. That is, when the non-AP MLD receives a first beacon frame (via the primary link) after the channel switching completion time of the planned non-primary link, the non-AP MLD may transmit a UL PPDU via the non-primary link. In this instance, the channel/class on which the non-AP MLD transmits a UL PPDU may be the operating channel/class of the non-primary link AP indicated by the first beacon frame.

In addition, the NSTR AP MLD may not perform channel switching of the non-primary link. In this instance, to perform channel switching of the non-primary link, the NSTR AP MLD may perform an operation of releasing the AP of the non-primary link, which operates on an existing channel, and adding a new non-primary link AP on a new channel.

In addition, as another example, the NSTR AP MLD may be restricted from configuring a quiet interval in the non-primary link. In this instance, in the case in which a quiet interval defined (configured) in the primary link is present, a quiet interval of the non-primary link may be defined (configured) in the same time interval as that of the quiet interval of the primary link. That is, when recognizing the quiet interval of the primary link, the non-AP STA MLD associated with the NSTR AP MLD may consider that the quiet interval is configured for the same time interval in the non-primary link.

As described above, the quiet element for the non-primary link transmitted via a beacon frame of the primary link may be configured (indicated) by the NSTR AP MLD, as given below.

1. A quiet count field may be configured to the number of TBTTs of the primary link that are left until the start of a subsequent quiet interval in the non-primary link.

2. A quiet period field may be configured to a value (in units of beacon intervals of a primary link) related to how many beacon intervals of the primary link are present before every regular (periodic) quiet interval of a non-primary link starts, which is defined via the corresponding quiet element. (In the case of an irregular quiet interval, the value is configured to 0).

3. A quiet offset field may be configured to a time value (in TUs) related to how many offsets are present before a quiet interval of the non-primary link from a TBTT of the primary link which is specified by the quiet count subfield.

An (extended) channel switch announcement element and a max channel switch time element for the non-primary link transmitted via a beacon frame of the primary link may be configured (indicated) by the NSTR AP MLD as given below.

1. A channel switch count field (of the channel switch announcement element) may be configured as information related to how many TBTTs of the primary link are left until the start of channel switch of the non-primary link. If channel switch of a non-primary link AP starts in a subsequent TBTT of the primary link, a channel switch count field (related to the non-primary link AP) in a beacon frame transmitted in the current TBTT may be configured to 1 or 0.

2. A switch time field (of the max channel switch time element) may be configured to a value of the maximum time difference between a primary beacon frame (a beacon frame in which a channel switch count field is configured to 1 or 0 as described in 1) transmitted in a TBTT immediately before a TBTT where channel switch of the non-primary link starts and a TIM frame transmitted on a new channel of the non-primary link after channel switch of the primary link is completed. For example, when a beacon interval of the primary link is 100 ms and a switch time field (associated with the non-primary link AP) is configured to 200 ms, the AP of the non-primary link may need to transmit a TIM frame on a new channel within 200 ms after the point in time of beacon frame transmission of the primary link in which the non-primary link AP starts channel switch.

Therefore, the non-AP MLD associated with the NSTR AP MLD may receive a beacon frame via the primary link, and, based on information indicated by a per-STA profile of the non-primary AP and TBTT and beacon interval information of the primary link included in the beacon frame, may obtain information related to a quiet interval and the point in time and duration of channel switch of the non-primary link. In this instance, based on the TBTT of the primary link, the non-AP MLD may configure (recognize, interpret) the start time of the quiet interval of the non-primary link. In this instance, based on a time at which the beacon frame is received in the primary link, the non-AP MLD may recognize/interpret the point in time of the channel switch of the non-primary link.

The conventional Wi-Fi non-AP STA may select whether to perform channel switch together in order to maintain association with an AP when the AP performs channel switch. However, when the NSTR AP MLD performs channel switch in the non-primary link, the non-AP STA MLD associated with the NSTR AP MLD may inevitably need to perform channel switch of the non-primary link.

When the non-AP STA MLD, which has performed ML setup (i.e., ML setup using the primary link and non-primary link) with the NSTR AP MLD, determines not to perform channel switch of the non-primary link, the non-AP STA MLD may need to terminate (release or change) the ML setup with the NSTR AP MLD, and may need to change (via setup or re-setup after releasing) to a state of being set up only via the primary link.

That is, a station of the non-AP MLD that receives channel switching information related to channel switching of the AP of the non-primary link from the AP of the primary link included in the AP MLD that supports NSTR may determine whether to perform channel switching along with the AP of the non-primary link.

When the station associated with the AP of the non-primary link determines to perform channel switching, the station may move to a changed channel and may receive a predetermined frame (e.g., a TIM frame) indicating that channel switching of the AP of the non-primary link is completed, or may receive a beacon frame via which the AP of the primary link indicates that channel switching of the AP of the non-primary link is completed. The non-AP STA that receives a TIM frame or a beacon frame may recognize that channel switching is completed and may perform frame transmission or reception on a changed channel.

However, when the station associated with the AP of the non-primary link determines not to perform channel switching, the non-AP STA that does not perform channel switching may terminate (release or change) a multi-link setup with the AP of the non-primary link. In this instance, the multi-link setup between the AP of the non-primary link and the non-AP STA is released, and thus a single link setup of the primary link may be present between the AP MLD and the STA MLD.

When the non-AP STA, which has a link setup with the AP of the primary link, does not perform channel switching of the AP of the primary link, the non-AP STA may select whether to move to another BSS and may perform link setup with the AP of the other BSS.

The NSTR soft AP MLD may need to configure a time interval in which channel switching is performed in the primary link as a quiet interval of the non-primary link BSS. This may be an operation caused due to a restriction that restricts the NSTR soft AP MLD and the non-AP STAs associated with the NSTR soft AP MLD to occupying the non-primary link only when occupying the primary link. The NSTR soft AP MLD and the associated non-AP MLD are restricted from performing communication in the non-primary link, as well as, the primary link, in the case in which the NSTR soft AP MLD performs channel switching with respect to the AP (BSS) of the primary link. Therefore, when performing channel switching of the AP (BSS) of the primary link, the NSTR soft AP MLD may need to indicate the same time interval as an interval for the channel switching as a quiet interval of the non-primary link AP (BSS). Alternatively, although the NSTR soft AP MLD does not separately indicate a quiet interval of the non-primary link, non-AP MLDs associated with the NSTR soft AP MLD need to not transmit a UL PPDU in the non-primary link until the point in time of channel switching completion (until a first beacon frame is received on a new channel of the primary link) after the start of channel switching of the primary link. In this instance, the non-AP MLD may perform an operation of generating a new backoff counter when the backoff is 0, during a time interval in which transmission of a UL PPDU is not performed in the non-primary link. In this instance, the new backoff counter may be a backoff counter generated using the current contention window (CW). In this instance, a counter related to retransmission (short retry counter, long retry counter, and the like) is not changed.

In the same manner, the NSTR soft AP MLD may need to configure a time interval configured as a quiet interval in the primary link BSS as a quiet interval of the non-primary link BSS. This may be an operation caused due to a restriction that restricts the NSTR soft AP MLD and the non-AP STAs associated with the NSTR soft AP MLD to occupying the non-primary link only when occupying the primary link. The NSTR soft AP MLD and the associated non-AP MLD are restricted from performing communication in the non-primary link, as well as, the primary link, in the case in which the NSTR soft AP MLD configures a quiet interval for the AP (BSS) of the primary link. Therefore, when the NSTR soft AP MLD indicates (configures) a quiet interval for the AP (BSS) of the primary link, the NSTR soft AP MLD may need to indicate (configure) the same time interval as an interval of channel switching as a quiet interval of the non-primary link AP (BSS).

In this manner, when channel switching is ongoing in the primary link or when a quiet interval of the primary link is configured, the non-AP MLDs associated with the NSTR soft AP MLD may not transmit a UL PPDU via the non-primary link. Therefore, when channel switching of the primary link is ongoing or a quiet interval is ongoing, the non-AP MLDs may be capable of performing a power save operation for a non-AP STA operated in the non-primary. For the non-AP STA operated in the non-primary link, this may be a power save operation using the fact that transmission of a DL PPDU from the AP of the non-primary link is not performed when channel switching is ongoing in the primary link or when a quiet interval is ongoing. In addition, although the non-AP STA operated in the non-primary link completes a channel access operation (e.g., a backoff operation of an EDCA), transmission of a UL PPDU using the non-primary link is limited, and thus the non-AP MLD may determine to stop a channel access operation performed in the non-primary link. For example, the non-AP MLD may stop performing a channel access operation and/or CCA operation of the non-AP STA operated in the non-primary link, when the NSTR soft AP MLD is performing channel switching in the primary link or a quiet interval is ongoing. In this instance, to stop performing the channel access operation and/or CCA operation may indicate that operation is performed in a doze state of a power save mode.

Given that the STAs of the non-AP MLD perform a power save operation (specifically, maintaining a doze state) for non-AP STAs operated in the non-primary link, the NSTR soft AP MLD may transmit an assistance frame in the non-primary link when channel switching of the primary link/quiet interval is terminated (completed). In this instance, the assistance frame may be transmitted in order to induce (assist) releasing (reset) of a NAVSyncDelay timer that starts after the non-AP STAs of the non-primary link are switched to an awake state. In this instance, the assistance frame may be transmitted at a basic rate. In this instance, the assistance frame may be a frame transmitted simultaneously when a beacon frame of the primary link is transmitted. In this instance, the NAVSyncDelay timer may be a timer related to a time at which an STA that is switched from a doze state to an awake state needs to perform CCA for configuring a NAV.

Figure 18:
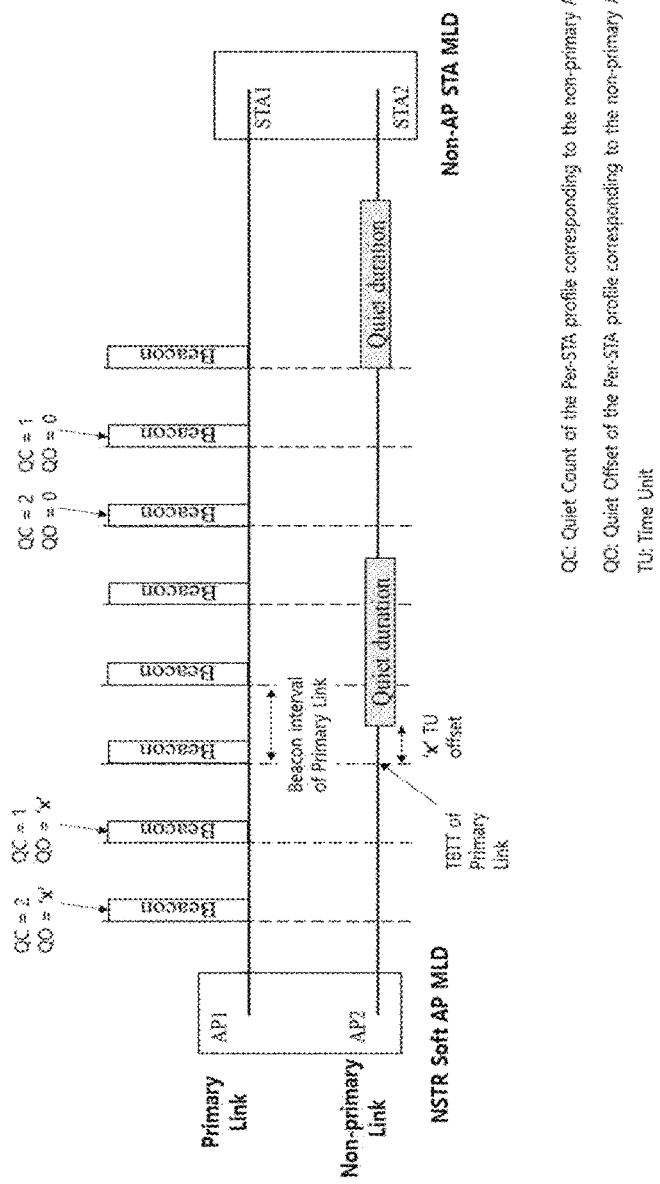
FIG. 18 illustrates an example of a process of configuring (defining) a quiet interval in a non-primary link by an NSTR AP MLD according to an embodiment of the present invention.

FIG. 18 illustrates an example of a process of configuring (defining) a quiet interval in a non-primary link by an NSTR soft AP MLD according to an embodiment of the present invention.

Referring to FIG. 18, the NSTR AP MLD operates AP 1 and AP 2 in a primary link and a non-primary link, respectively, and is combined with each of STA 1 and STA 2 of a non-AP STA MLD.

The NSTR AP MLD may include a per-STA profile corresponding to AP 2 in a beacon frame transmitted through AP 1 of the primary link and transmit the same in order to configure (define) a quiet interval (quiet interval #1 of FIG. 18) in the non-primary link. The per-STA profile corresponding to AP 2 includes a quiet element, and indicates information related to a time point at which the quiet interval (quiet interval #1 of FIG. 18) starts, through quiet count and quiet offset fields. When the quiet element is included in a first beacon frame (beacon #1 of FIG. 18) of the primary link illustrated in FIG. 18, a quiet count field is configured with a value indicating 2, a quiet offset field is configured with a value indicating "x" time units (TUs, 1024 us), and a quiet count field is configured with 1 in a second beacon frame (beacon #2 of FIG. 18).

The non-AP STA MLD having received the first and/or the second beacon frame through the primary link may identify the quiet element included in the per-STA profile (corresponding to AP 2) of the beacon frame, and may recognize that a quiet interval is configured (announced by the AP MLD) in the non-primary link and the quiet interval (quiet interval #1 of FIG. 18) starts from a time point after "x" TUs from a TBTT corresponding to a third beacon frame.

As illustrated in FIG. 18, the NSTR AP MLD may include the per-STA profile corresponding to AP 2 in the beacon frame transmitted through AP 1 of the primary link and transmit the same again in order to additionally configure (define) the next quiet interval (quiet interval #2 of FIG. 18) in the non-primary link. In a sixth beacon frame (beacon #6 of FIG. 18) of the primary link illustrated in FIG. 18, a quiet count field is configured with a value indicating 2, a quiet offset field is configured with a value indicating 0 time unit (TU, 1024 us), and in a seventh beacon frame (beacon #7 of FIG. 18), a quiet count field is configured with 1.

The non-AP STA MLD having received the sixth and/or seventh beacon frame through the primary link may identify the quiet element included in the per-STA profile (corresponding to AP 2) of the beacon frame, thereby recognizing that a quiet interval (quiet interval #2) is configured (announced by the AP MLD) in the non-primary link and the quiet interval (quiet interval #2) starts from a TBTT corresponding to an eighth beacon frame.

In this case, information on the lengths of the quiet intervals is indicated through a quiet duration field indicated together in the quiet element.

Figure 19:
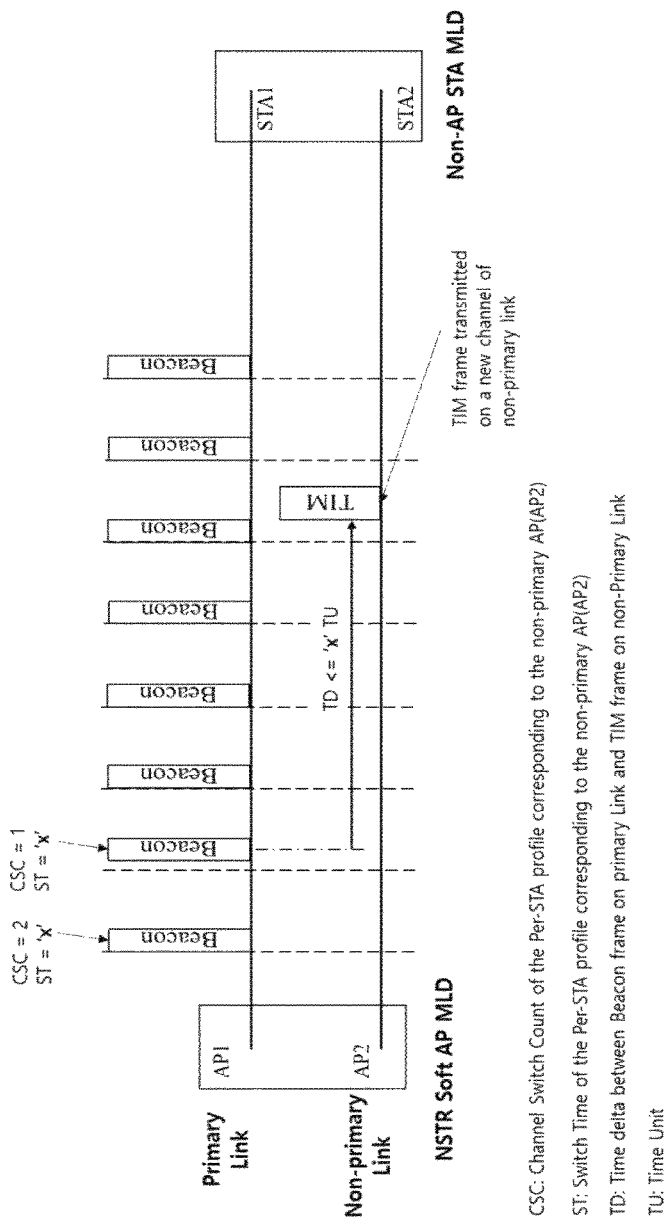
FIG. 19 illustrates an example of a method of performing non-primary channel switching by an NSTR AP MLD according to an embodiment of the present invention.

FIG. 19 illustrates an example of a method of performing non-primary channel switching by an NSTR soft AP MLD according to an embodiment of the present invention.

Referring to FIG. 19, an NSTR AP MLD may operate AP 1 and AP 2 in a primary link and a non-primary link, respectively, and may be associated with each of STA 1 and STA 2 of a non-AP STA MLD.

The NSTR AP MLD may include, in a beacon frame transmitted through AP 1 of a primary link, a per-STA profile corresponding to AP 2 (non-primary link), to change the non-primary link to a new channel, and transmit the same. The per-STA profile corresponding to AP 2 may include an (extended) channel switch announcement element and a max channel switch time element, and indicates information related to a time interval in which a TIM frame is transmitted in a new channel after channel switching and a time point at which channel switching starts. The (extended) channel switch announcement element is included in a first beacon frame (beacon #1 of FIG. 19) of a primary link illustrated in FIG. 19, a channel switch count field is configured with 2, and a second beacon frame (beacon #2 of FIG. 19) is configured with 1.

The non-AP STA MLD having received the first and/or the second beacon frame through the primary link may identify the (extended) channel switch announcement element included in the per-STA profile (corresponding to AP 2) of the beacon frame, and may recognize that channel switching (of a new channel) of the non-primary link starts after receiving the second beacon frame and the TIM frame of AP 2 is to be received in a new channel within "x" TUs at a time point at which the second beacon frame is received. In this case, the new channel may be a channel corresponding to a value indicated through a new channel number field included in the (extended) channel switch announcement element. In this case, the "x" TUs may be a time value indicated through a switch time field included in a max channel switch time element included in the per-STA profile (corresponding to AP 2).

<Restriction on Operation of Non-AP STA MLD Associated with NSTR AP MLD>

An NSTR AP MLD is an AP MLD corresponding to an NSTR link pair of a primary link and a non-primary link. Accordingly, an AP of the non-primary link may be in a BLIND state while PPDU transmission is performed through an AP of the primary link, and on the other hand, the AP of the primary link may be in a BLIND state when the AP of the non-primary link performs the transmission. In this case, the AP of the NSTR AP MLD, having experienced the BLIND state, may need to configure MediumSyncDelay with a pre-configured value.

MediumSyncDelay is a single timer commonly applied to EDCA functions (EDCAFs) of an STA, and when MediumSyncDelay is not 0, an additional constraint may be applied when the corresponding STA acquires a TXOP. In this case, the additional constraint may include that: (1) first transmission attempted to acquire the TXOP needs to be an RTS frame, (2) TXOP acquisition attempts are allowed only a pre-configured number of times while MediumSyncDelay is applied (until MediumSyncDelay is reduced to 0); and (3) a more strict (even lower: for example, −72 dBm to −62 dBm) CCA energy detection (ED) threshold value is utilized compared to a case where MediumSyncDelay is 0. That is, in terms of acquisition of a TXOP, more constraints are applied to an STA having MediumSyncDelay not corresponding to 0 than an STA having MediumSyncDelay corresponding to 0.

Accordingly, even in a case of the NSTR AP MLD, when the AP has experienced the BLIND state, MediumSyncDelay may need to be applied, and it may be difficult for STAs of a BSS to receive a normal service in a situation where channel access of the AP is restricted. The NSTR AP MLD may determine, as a primary link, one of links of the NSTR link pair for operation of the APs by the NSTR AP MLD itself, thereby managing transmission performed in the non-primary link (a link other than the primary link) in a scheme in which the primary link is not in the BLIND state. For example, the NSTR AP MLD may perform transmission in the non-primary link only when transmission is performed in the primary link, thereby managing the primary link not to be in the BLIND state. For such a purpose, even though receiving a frame for requesting a response frame through the AP of the non-primary link, the NSTR AP MLD may not respond with the request response frame. That is, even when receiving the frame for requesting the response frame through the AP of the non-primary link, the NSTR AP MLD may perform an operation of not responding with the response frame. In this case, the reason why the NSTRA AP MLD does not respond with the response frame through the AP of the non-primary link is to prevent the AP of the primary link from being in the BLIND state.

As described above, the NSTR AP MLD may configure the primary link, and may manage operation (transmission) of the AP operating in the primary link and/or the non-primary link so as to prevent the AP of the primary link from being in the BLIND state. Similarly, non-AP STA MLDs associated with the NSTR AP MLD may need to operate while understanding a primary link management method of the NSTR AP MLD. For example, when the non-AP STA MLD recognizes that the NSTR AP MLD does not respond with the response frame in the non-primary link, the non-AP STA MLD may not transmit a frame for requesting a response of the response frame in the non-primary link. In addition, when the non-AP STA MLD fails to receive a response of the response frame from the NSTR AP MLD after transmitting a frame for requesting the response frame in the non-primary link, the non-AP STA MLD may not retransmit the frame for requesting the response for the response frame. For example, when the non-AP STA MLD fails to receive a CTS frame response after transmitting an RTS frame to the NSTR AP MLD through the non-primary link, the non-AP STA MLD may not retransmit the RTS frame. In this case, the non-AP MLD may not attempt to perform transmission through the non-primary link to the NSTR AP MLD until receiving a trigger frame through the non-primary link.

In addition, even though the non-AP MLD has completed a channel access procedure of the non-primary link to perform UL transmission, the non-AP MLD may suspend transmission performed in the non-primary link until a channel access procedure in the primary link is completed. In this case, the method for suspending transmission performed in the non-primary link by the non-AP MLD may correspond to suspending a backoff procedure performed by an STA (more precisely, an EDCAF of the STA) of the non-primary link until a backoff procedure performed by an STA of the primary link is completed. In this case, the method for suspending the backoff procedure performed by the STA of the non-primary link by the non-AP MLD may correspond to maintaining a state in which a backoff counter is 0.

According to the above-described method, the non-AP STA MLD having completed the channel access procedures both in the primary link and the non-primary link may perform simultaneous transmission (simultaneous UL PPDU transmission) in the primary link and the non-primary link. In this case, the meaning of "simultaneous transmission" is that a time point at which each transmission starts is within a pre-configured time interval. However, when only the channel access procedure of the primary link is completed and the channel access procedure of the non-primary link has not completed yet, the non-AP MLD may start PPDU transmission only in the primary link, or may start simultaneous transmission once the channel access procedure of the non-primary link is completed. That is, when performing transmitting to the NSTR AP MLD, the non-AP MLD may perform transmission using the primary link only, or may perform simultaneous transmission using the primary link and the non-primary link. However, the non-AP MLD may not be allowed to perform PPDU transmission to the NSTR AP MLD using the non-primary link only.

In addition, when performing UL transmission to the NSTR AP MLD by utilizing both the primary link and the non-primary link, the non-AP MLD may need to match end time points of transmission performed in both links. In this case, matching the end time points of the transmissions may mean that the transmissions performed in both links end together within a pre-configured time interval.

In addition, when performing UL transmission by the NSTR AP MLD by utilizing both the primary link and the non-primary link, the non-AP MLD may need to make the same configuration for whether PPDUs transmitted in both links request response frames. To described in more detail, both of two UL PPDUs simultaneously transmitted by the non-AP MLD in the primary link and the non-primary link may need to request the response of the response frame, or both of the two UL PPDUs may need not to request the response of the response frame. This may be a restriction applied because when a response frame is transmitted as a response through in a specific link as a result of UL transmission performed utilizing both the primary link and the non-primary link by the non-AP MLD, the AP operating in another link of the NSTR AP MLD may be in the BLIND state. However, only one of two PPDUs (received through the primary link and the non-primary link, respectively) simultaneously received corresponds to a PPDU requesting the response frame, the NSTR AP MLD may not perform the response of the response frame for both of the two PPDUs.

In addition, when performing transmission to the NSTR AP MLD by using both the primary link and the non-primary link, the non-AP MLD may need to make a configuration so that a TXOP of the non-primary link and a TXOP of the primary link end at the same time point, or the TXOP of the non-primary link ends earlier. In other words, the non-AP MLD may need to configure the TXOP of the non-primary link and the TXOP of the primary link to simultaneously end or the TXOP of the non-primary link to end earlier. However, the non-primary link TXOP of the non-AP STA MLD may be allowed to end later by a time within a pre-configured time interval than the TXOP of the primary link.

In addition, the non-AP STA MLD may recognize that the NSTR AP MLD has experienced the BLIND state in the AP of a specific link, and may assist an operation of the AP. To describe in more detail, when recognizing that the NSTR AP MLD has performed transmission only through one link among the primary link and the non-primary link, the non-AP STA MLD may identify that an AP of another link, which has performed no transmission, has experienced the BLIND state. In this case, in consideration that the AP having experience the BLIND state will be restricted in channel access due to MediumSyncDelay not corresponding to 0, the non-AP STA MLD may perform an operation of assisting the AP in releasing MediumSyncDelay (resetting to 0). In this case, the operation performed by the non-AP STA MLD may be an operation using a characteristic that MediumSyncDelay can be released when a NAV configurable PPDU (including a valid MPDU) is received.

For example, the non-AP STA MLD may transmit an assist frame (a type of a PPDU) capable of configuring a NAV to the AP of the NSTR AP MLD, which is determined to have MediumSyncDelay not corresponding to 0 after experiencing the BLIND state. In this case, the assist frame may mean a frame included in the valid MPDU capable of NAV configuration, regardless of the frame format. In this case, a condition that the non-AP STA MLD transmits the assist frame to the NSTR AP MLD through a specific link is restricted to a case where the state of the specific link identified by the non-AP STA MLD is an IDLE state. In this case, another condition that the non-AP STA MLD transmits the assist frame to the NSTR AP MLD is restricted to a case where the non-AP STA MLD is a non-AP STA MLD having explicitly or implicitly received, from the NSTR AP MLD, a request (indication) on transmission of the assist frame.

As described above, a non-AP MLD associated with an NSTR soft (mobile) AP MLD may need to perform operations in consideration of performance limitation of the NSTR mobile AP MLD, and thus may perform operations with a higher level of difficulty than a non-AP MLD associated with a general AP MLD. For example, the non-AP MLD that is associated with the general AP MLD (an AP MLD having only an STR link pair) may perform PPDU transmission in two links via independent channel access in each link. However, the non-AP MLD that is associated with the NSTR mobile AP MLD may need to initiate transmission simultaneously in a primary link and a non-primary link, and thus may need to perform an operation with a higher level of difficulty.

Therefore, the non-AP MLD that is capable of performing multi-link association (ML setup) with the NSTR mobile AP MLD may be limited to a non-AP MLD that supports a predetermined performance. In this instance, the predetermined performance may be related to an NSTR operation. That is, only a non-AP MLD that supports an NSTR operation may be allowed to perform multi-link association with the NSTR mobile AP MLD.

In the case in which a non-AP MLD that does not support an NSTR operation (e.g., an MLD that supports only an STR operation or supports a single-radio operation) is to combine the NSTR mobile AP MLD, the non-AP MLD may need to be associated in the state of being associated only via the primary link of the NSTR mobile AP MLD. That is, the non-AP MLD that does not support an NSTR operation may not be in the state of being associated with the NSTR mobile AP MLD in both the primary link and the non-primary link, and may be in an associated state (single-link setup) only via the primary link. Therefore, the non-AP MLD that does not support an NSTR operation may be required not to transmit, to the NSTR mobile AP MLD, an association request frame that includes the non-primary link and requests association.

<Restriction on Channel Switching of Non-AP MLD that does not Support NSTR>

Via the above-described embodiments of the present invention, a channel switching method and restriction of an NSTR soft (mobile) AP MLD and non-AP MLDs associated with the NSTR mobile AP MLD have been described.

General AP MLDs different from an NSTR mobile AP MLD support simultaneous transmission or reception (STR) with respect to all link pairs, and thus may not separately have a non-primary link. Accordingly, each AP of the AP MLD may transmit a beacon frame, a probe response frame, and the like in a link (an operating channel) in which the corresponding AP operates, and may signal information related to channel switching to non-AP STAs. This means that each AP in the AP MLDs is capable of utilizing an operation that an AP in conventional Wi-Fi performs in order to change an operating channel (or operating class) of the AP's BSS, and non-AP STAs (STAs of the non-AP MLD or STAs not in an MLD) connected via respective links may perform channel switching indicated by an AP by using an operation of a non-AP STA defined in conventional Wi-Fi.

In addition, when a first AP (affected AP) belonging to a general AP MLD (an AP MLD different from an NSTR mobile AP MLD) transmits an (extended) channel switch element and a max channel switch time element via its beacon frame and (ML) probe response frame, other APs (reporting APs) belonging to the same AP MLD may include the same elements in a per-STA profile corresponding to the first AP for transmission and transmit the same. Therefore, although not receiving the frame transmitted by the first AP, a non-AP MLD that performs ML setup with the AP MLD may obtain information related to channel switching indicated by the first AP by receiving the per-STA profile associated with the first AP transmitted by another AP. In this instance, a timing field of a channel switching-related element of the first AP transmitted by the other AP may be configured/interpreted based on a TBTT and BI of the first AP. This is because of the existence of the TBTT and BI associated with a link of the first AP, unlike a non-primary link of the NSTR mobile AP MLD. Therefore, the channel switching information associated with a BSS of the first AP may be configured/interpreted based on the TBTT and BI of the BSS of the first AP, irrespective of the link in which the corresponding information is received. In a similar manner, a max channel switch time element associated with the BSS of the first AP may be interpreted based on the point in time at which a last beacon frame transmitted by the first AP is transmitted/received, irrespective of the link in which the corresponding element is received.

That is, when performing channel switching in a predetermined link, the general AP MLD different from the NSTR mobile AP MLD may signal information related to channel switching of the predetermined link via other links, as well as, the predetermined link, and thus non-AP MLDs that perform ML setup with the general AP MLD may relatively easily obtain the information related to channel switching, when compared to the case of association with the NSTR mobile AP MLD.

The non-AP MLD that performs ML setup with the general AP MLD may perform channel switching indicated by the AP MLD, and may have a new NSTR link pair. This is caused due to the difference in hardware characteristics (interference shielding capability or the like) between the AP MLD and the non-AP MLD. The AP MLD still supports STR with respect to all link pairs after channel switching, but the non-AP MLD may be incapable of supporting STR with respect to a predetermined link pair after channel switching.

As a simple example, the AP MLD may support STR with respect to a link pair with a separation distance of 40 MHz (an operating channel distance between two APs, more particularly, a distance between operating channel edges) but the non-AP MLD may be capable of supporting STR with respect to only a link pair with a separation distance of 80 MHz or more. When the non-AP MLD is connected via a first link and a second link having an initial separation distance of 80 MHz, and the AP MLD performs channel switching with respect to the first link or the second link and the distance between the two links is decreased to 40 MHz, the AP MLD may support STR with respect to the link pair including the two links but the non-AP MLD is incapable of supporting STR any longer. In this instance, the link pair including the first link and the second link may be an NSTR link pair for the non-AP MLD, and the non-AP MLD may need to support an NSTR operation with respect to STAs operated in the NSTR link pair.

In the case in which a non-AP MLD which has an NSTR link pair as a result of channel switching indicated by the AP MLD or which is expected to have an NSTR link pair after channel switching does not support an NSTR operation, the non-AP MLD may need to modify an ML connection (disconnect or perform (ML) resetup) so that a link pair having an NSTR relationship is not present among links connected (setup, associated) with the AP MLD. In other words, when the non-AP MLD that does not support an NSTR operation has acquired (or is expected to have) an NSTR link pair via channel switching indicated by the AP MLD, the non-AP MLD may need to change a connection that has been established with the AP MLD so as to make an NSTR link pair not present.

As a simple example of operation of the non-AP MLD, the non-AP MLD may not perform channel switching indicated by the AP MLD, and may release the connection with the AP of a link for which channel switching is performed (or is to be performed). This may be an operation of the non-AP MLD which is selected to prevent a link different from a predetermined link from being in an NSTR state due to a changed operating channel of the predetermined link.

Alternatively, the non-AP MLD may release a connection with an AP of another link expected to be included in an NSTR link pair after performing indicated channel switching, instead of a link for which channel switching is indicated. This may be another method of eliminating an NSTR link pair, and this may be selected by the non-AP MLD by taking into consideration the capability of the link different from the link for which channel switching is indicated. In this instance, the non-AP's method selected in consideration of the capability may be an operation of maintaining a link with a higher expected TPUT between the links in the NSTR link pair and performing teardown of the other link. As another method, the non-AP MLD may change an operating BW of non-AP STAs operated in the NSTR link pair so as to change the NSTR link pair to an STR link pair. In this manner, there are various methods of removing an NSTR link pair newly generated (or expected to be generated) by channel switching, and thus various operations may be allowed according to selection by the non-AP MLD. In this instance, the non-AP MLD that does not support an NSTR operation may need to manage a connection state with the AP MLD in order to maintain the state of not having an NSTR link pair.

In this instance, a method for the non-AP MLD to predict whether a predetermined link pair becomes an NSTR link pair may be embodied in different manners. In the case in which the non-AP MLD indicates, to the AP MLD, frequency separation distance information related to support of STR, the non-AP MLD may need to predict (evaluate) whether an NSTR link pair is present based on the separation distance information that the non-AP MLD itself indicates to the AP MLD. In this instance, the frequency separation distance information related to the support of STR may information that the non-AP MLD indicates to the AP MLD via a frequency separation for an STR subfield included in an MLD capabilities and operation subfield.

As described above, when the AP MLD indicates/performs channel switching, the non-AP MLD may modify the connection state, such as releasing a link via which the non-AP MLD connects to the AP MLD. In this instance, the non-AP MLD may need to indicate that the non-AP MLD itself is to modify the connection state to the AP MLD via multi-link (ML) (re) setup procedure. The multi-link (re) setup procedure may be performed by exchanging a (re) association request/(re) association response frame between the non-AP MLD and the AP MLD, and, via a (re) association request frame, the non-AP MLD may request setup of only a link that the non-AP MLD is to maintain for the connection with the AP MLD after the (ML) (re) setup procedure is completed.

In this instance, a non-AP MLD connected to the AP MLD only via a single link after the resetup procedure may release the existing ML setup, and may need to perform single-link association with the AP MLD. That is, to change to the state of being connected to the AP MLD via only a single link, the non-AP MLD that has been connected to the AP MLD via two or more links may need to completely release the connection with the AP MLD (release connection of all links) and may need to setup again via a single link. In this instance, the setup performed again may be a single-link setup as opposed to a multi-link setup performed between MLDs. That is, an association request frame transmitted in the setup performed again may not include a per-STA profile of another STA.

Figure 20:
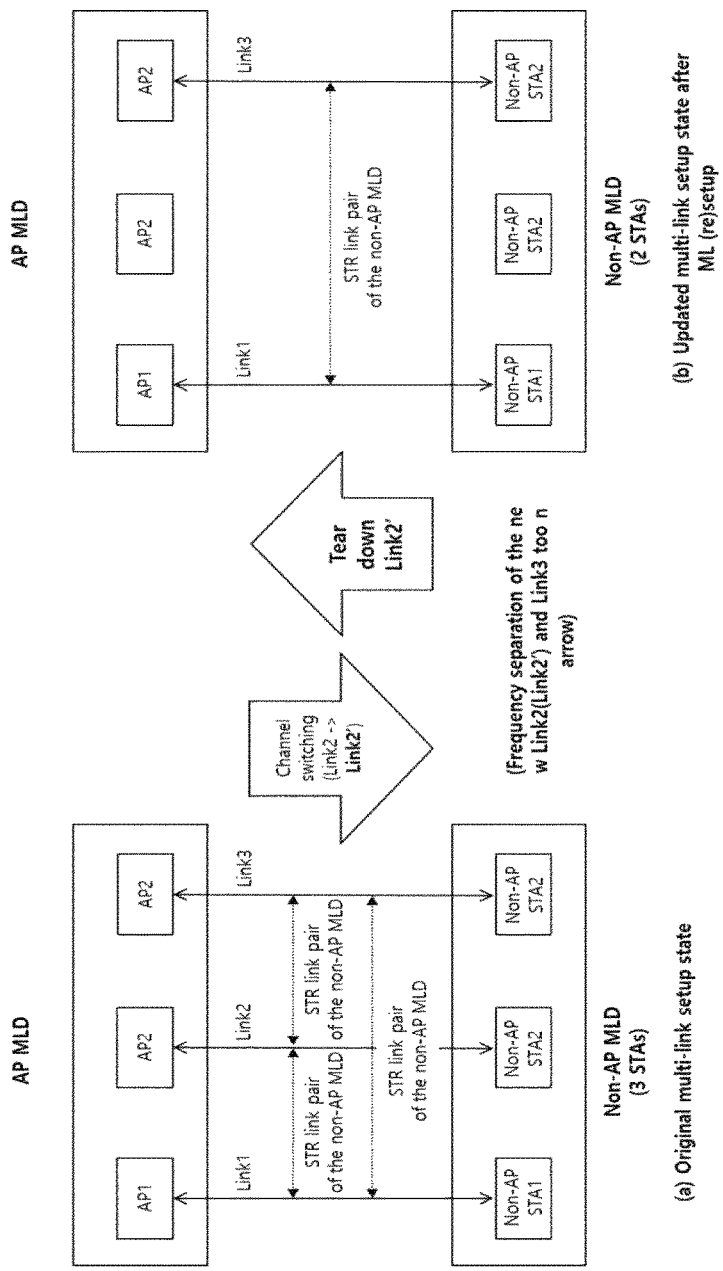
FIG. 20 illustrates an example of an ML (re) setup management method in association with channel switching according to an embodiment of the present invention.

FIG. 20 illustrates an example of an ML (re) setup management method in association with channel switching according to an embodiment of the present invention.

Referring to FIG. 20, a non-AP MLD that performs multi-link setup with an AP MLD may perform ML (re) setup in order to eliminate an NSTR link pair generated as a result of channel switching. Before channel switching is performed in FIG. 20A, multi-link setup between the AP MLD and the non-AP MLD has been completed via link 1, link 2, and link 3.

The AP MLD may indicate and perform channel switching in order to change an operating channel of link 2, and the non-AP MLD determines that a frequency separation distance between link 2 (link 2') that is to be operated on a new operating channel and link 3 is to be too close to support an STR operation if it performs channel switching of link 2 indicated by the AP MLD.

To prevent link 2' and link 3 from being an NSTR link pair, the non-AP MLD may not perform channel switching of link 2, and may determine to release a connection between STA2 and AP2. Subsequently, the non-AP MLD may be in a new type of multi-link setup state in which the non-AP MLD is connected to the AP MLD via only link 1 and link 3 which are an STR link pair. (Referring to FIG. 20B) In this instance, it may be understood that the non-AP MLD performs ML (re) setup, since it does not support an NSTR operation.

Figure 21:
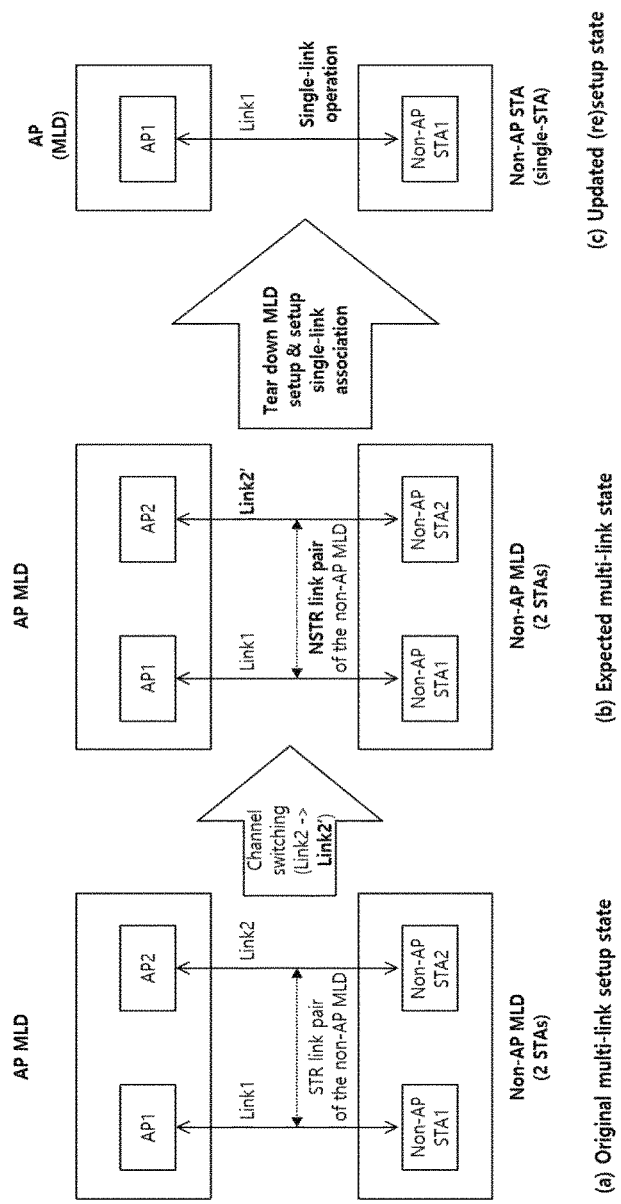
FIG. 21 illustrates an example of a method of switching a single link operation based on channel switching according to an embodiment of the present invention.

FIG. 21 illustrates an example of a method of switching a single link operation based on channel switching according to an embodiment of the present invention.

Referring to FIG. 21, a non-AP MLD that performs multi-link setup with an AP MLD may be switched to a single link operation in order to eliminate an NSTR link pair generated as a result of channel switching.

Referring to FIG. 21A, ML setup between the AP MLD and the non-AP MLD has been made via link 1 and link 2, before channel switching is performed. The AP MLD may indicate and perform channel switching in order to change an operating channel of link 2, and the non-AP MLD determines that a frequency separation distance between link 2 (link 2') that is to be operated on a new operating channel and link 1 is to be too close to support an STR operation if it performs channel switching of link 2 indicated by the AP MLD. (FIG. 21B illustrates states of link 1 and link 2 estimated (evaluated) by the non-AP MLD).

To avoid operating an STA in an NSTR link pair, the non-AP MLD may perform termination (teardown, disassociation) of the MLD setup (setup performed via MLD association) performed with the AP MLD, and may perform new association. In this instance, a non-AP that performs new association may not operate as an MLD, but perform setup with an AP in the same manner as a single-radio non-AP STA.

The non-AP that terminates the MLD setup and performs new setup may be connected to an AP via a single-link, and may operate as a single-radio non-AP STA that does not support all multi-link operations (MLO).

<Channel Switching of Non-AP MLD that Supports EMLSR Operation>

An enhanced multi-link single radio (EMLSR) operation is an operating mode in which a non-AP MLD supports listening with respect to a plurality of EMLSR links (links in which an STA operating in an EMLSR mode is operated), but performs frame exchange via only a single link among the EMLSR links in each instance. Each of EMLSR link pairs operating in an EMLSR mode performs a listening operation, and, when frame exchange is performed in a predetermined EMLSR link, an RF chain of another EMLSR link is used together for the frame exchange process of the predetermined EMLSR link. In this instance, listening is an operation of supporting clear channel assessment (CCA) and initial control frame reception. In this instance, an initial control frame is a previously agreed frame that is transmitted when an AP MLD needs to perform frame exchange via one of the EMLSR links of a non-AP MLD, and is a frame transmitted via a single spatial stream in a non-HT (duplicate) PPDU format.

In the case in which a previously agreed frame is received from an AP MLD while performing a listening operation, STAs operated in an EMLSR link pair may perform aggregation of radio frequency (RF) chains (radio frequency chain, receive chain) that have been used in respective EMLSR link pairs, via a link in which the previously agreed frame is received, and may use the same for a frame exchange process to be performed after receiving an initial control frame. For example, in the case in which a first link and a second link are an EMLSR link pair operating in the EMLSR mode, and an initial control frame is received in the first link, an RF chain that has been used in the second link may be utilized together for frame exchange performed in the first link. In this instance, the second link may be switched to a state with no RF chain. That is, STAs operated in an EMLSR pair may be in the state with no RF available for CCA and frame transmission/reception when an STA of a predetermined EMLSR link performs frame exchange. Accordingly, non-AP STAs operated in the EMLSR link pair may be incapable of participating in the frame exchange process simultaneously. In other words, an EMLSR link pair performs frame exchange with respect to a single link in each instance, and thus non-AP STAs operated in the EMLSR link pair may be capable of being operated in the EMLSR mode in an NSTR link pair without supporting an NSTR operation.

Given the above-described operational feature of the EMLSR mode, a non-AP MLD that has an NSTR link pair (or is expected to have an NSTR link) after performing channel switching indicated by an AP MLD, and does not support an NSTR operation, may be capable of operating non-AP STAs, operated in the NSTR link pair, in the EMLSR mode. In other words, by operating the NSTR link pair as an EMLSR link pair, the non-AP MLD that does not support an NSTR operation may maintain a state of being connected to an AP via a link pair that does not support STR. This may be an operation of the non-AP MLD available when the non-AP MLD does not support an NSTR operation but supports an EMLSR mode operation. That is, a non-AP MLD with dot11EHTEMLSROptionImplemented configured to true may be capable of operating a non-AP STA in an NSTR link pair by operating an NSTR link pair as an EMLSR link pair, although not supporting an NSTR operation. In this instance, the operation in which the non-AP MLD switches a non-AP STA operated in the NSTR link pair to the EMLSR mode may be an operation of configuring bits corresponding to the NSTR link pair to 1 among bits of an EMLSR link bitmap subfield included in an EML control field of an EML operating mode notification frame, and transmitting the same to the AP. In this instance, the non-AP MLD may configure an EMLSR mode subfield of the same EMLSR operating mode notification to 1. In addition, a condition for operating an NSTR link pair as an EMLSR link pair for the non-AP MLD that does not support NSTR operating may be the case in which both the non-AP MLD and an associated AP MLD support the operations of the EMLSR mode. That is, only when the associated AP MLD supports operation of the EMLSR mode (only when an EML capabilities present subfield and an EMLSR support subfield of a basic multi-link element received from an AP MLD are indicated as 1), the non-AP MLD may operate the NSTR link pair as the EMLSR link pair, thereby operating the non-AP STA in the NSTR link pair without supporting an NSTR operation. In this instance, to operate a non-AP STA in an NSTR link pair may mean maintaining a multi-link associated state including an NSTR link pair with the AP MLD.

Figure 22:
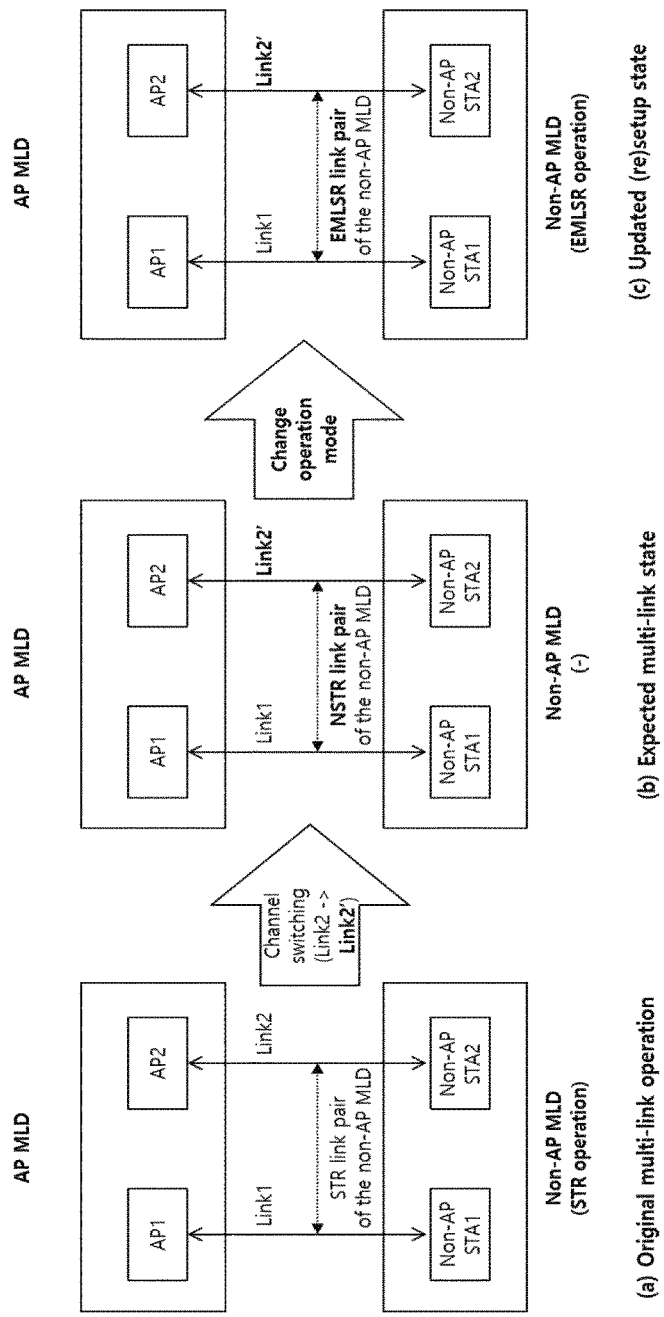
FIG. 22 illustrates an example of a method of switching to an EMLSR mode based on channel switching according to an embodiment of the present invention.

FIG. 22 illustrates an example of a method of switching to an EMLSR mode based on channel switching according to an embodiment of the present invention.

Referring to FIG. 22, a non-AP MLD that performs multi-link setup with an AP MLD may be switched to an EMLSR mode in order to eliminate an NSTR link pair generated as a result of channel switching.

Referring to FIG. 22A, ML setup between the AP MLD and the non-AP MLD has been made via link 1 and link 2, before channel switching is performed. The AP MLD may indicate and perform channel switching in order to change an operating channel of link 2, and the non-AP MLD determines that a frequency separation distance between link 2 (link 2') that is to be operated on a new operating channel and link 1 is to be too close to support STR if it performs channel switching of link 2 indicated by the AP MLD. (FIG. 22B illustrates states of link 1 and link 2 (link 2') estimated (evaluated) by the non-AP MLD).

The non-AP MLD may determine to switch STAs operated in an NSTR link pair to an EMLSR mode in order not to support an NSTR operation, and may indicate the same to the AP MLD. After an operating mode of the non-AP MLD is changed, non-AP STA1 and non-AP STA2 of the non-AP MLD may operate in the EMLSR mode in an EMLSR link pair as shown in FIG. 22C.

<Operation of Non-AP MLD that does not Support Channel Switching Indicated by AP MLD>

Although being different from the non-AP MLD that does not support an NSTR operation, each non-AP MLD is capable of not performing channel switching of each link indicated by the AP MLD. Given that a non-AP STA in conventional Wi-Fi is capable of not performing channel switching indicated by an AP, this may be regarded as a selective operation of a non-AP MLD.

To elaborate operation of a non-AP STA in conventional Wi-Fi, the non-AP STA may be capable of selecting movement to another BSS when determining not to perform channel switching indicated by the AP. In this instance, based on that a frame received from the non-AP STA is not present during a predetermined period of time, the AP may recognize that the non-AP STA does not operate in its BSS any longer. That is, although signaling (information, indication, or the like) separately received from the non-AP STA is not present, the AP may recognize that the non-AP STA does not perform channel switching, and may terminate association with the non-AP STA such as deleting information associated with the non-AP STA or the like.

Conversely, in the case in which the non-AP MLD does not perform channel switching indicated by an AP MLD, frame exchange with the non-AP MLD is still performed via a link different from a link for which channel switching is performed and the connection between the AP MLD and the non-AP MLD is not terminated. In this instance, the AP MLD may continuously attempt transmission to the non-AP MLD in a link for which channel switching is performed, and the transmission attempt by the AP MLD repeatedly fails since the non-AP MLD does not perform channel switching of the corresponding link.

The repetitive transmission failure is a drawback that occurs because the AP MLD is not aware that the non-AP MLD does not perform channel switching indicated by the AP MLD. Therefore, when determining not to perform channel switching indicated by the AP MLD, the non-AP MLD may need to signal (indicate, announce) the same to the AP MLD.

Therefore, when determining not to perform channel switching indicated by the AP, the non-AP MLD that performs multi-link setup with the AP MLD may indicate the same to the AP MLD. In this instance, a method for the non-AP MLD to indicate the same to the AP MLD may be performing termination (teardown) of the connection of the link for which channel switching is indicated. That is, when determining not to perform channel switching indicated by the AP MLD, the non-AP MLD may need to perform (ML) (re) setup, excluding the link for the channel switching is performed. When the non-AP MLD is connected to the AP MLD via only two links, the non-AP MLD may perform termination (MLD teardown, disassociation) of the connection to the AP MLD and may need to perform single-link setup, when determining not to perform channel switching indicated for one of the two links. A method of performing single-link setup is the same as the operation of non-AP MLD that does not support an NSTR operation, which has been described above, and thus a detailed description thereof will be omitted.

As another method, the non-AP MLD may move to another BSS, when determining not to perform channel switching indicated by the AP MLD. In this instance, before moving to another BSS, the non-AP MLD may transmit a disassociation frame to the existing associated AP MLD.

<Channel Switching Ongoing/Completion Signaling Method of NSTR Mobile AP MLD>

In addition, as another embodiment of the present invention, an AP MLD may transmit channel switching information of an AP that undergoes channel switching to an STA of a non-AP MLD via another AP. That is, a reporting AP included in the AP MLD may include channel switching information of a reported AP, which is a different AP, in a frame (e.g., a beacon frame, probe response frame, or the like), and may transmit the same to a non-AP STA of the non-AP MLD.

The channel switching information may include a channel switch announcement element (or extended channel switch announcement element) for indicating channel switching and/or class (operating class) changing, and a max channel switch time element. In this instance, both the channel switch announcement element (or extended channel switch announcement element) and the max channel switch time element may be included, or part of either or neither may be included.

To change an operating class, an extended channel switch announcement element as opposed to a channel switch announcement element may be used. In the case in which the extended channel switch announcement is used (i.e., in the case in which the extended channel switch announcement element is included in a frame), a max channel switch time element may always be included in the frame together with the extended channel switch announcement. That is, when an extended channel switch announcement is included in a frame in order to change an operating class, a max channel switch time element may always be included together in the frame. Hereinafter, a channel switch announcement element in the present invention may be an extended channel switch announcement. That is, a channel switch announcement element may be interpreted as an extended channel switch announcement element according to the purpose of use.

A channel switch announcement element may include a new channel number field and a channel switch count field.

The channel number field indicates the location of a new channel on which the reported AP operates as a result of channel switching, and the channel switch count field indicates the number of target beacon transmission times (TBTTs) left until channel switching on the new channel.

The max channel switch time element may include a switch time field related to a time of channel switching, and the switch time field indicates information related to a time at which channel switching is completed.

In this instance, the switch time field indicates a different value depending on the type of an AP MLD and/or whether channel switching is not yet started or is ongoing.

Specifically, in the case in which the AP MLD is an STR AP MLD that is capable of performing simultaneous transmission or reception (STR type), a switch type field indicates a maximum time until a first beacon frame on the new channel after a last beacon frame is transmitted by the reported AP before channel switching starts. In this instance, the switch type field may indicate the above-mentioned time from the channel switching until the reported AP transmits a last beacon frame. However, a switch type field included in a frame transmitted after the reported AP transmits the last beacon frame in the channel switching (i.e., after channel switching starts) may indicate a time spent until a first beacon frame on a new channel after the frame including a switch time field is transmitted.

However, in the case in which the AP MLD is an NSTR AP MLD that is incapable of performing simultaneous transmission or reception (NSTR type), a switch type field may indicate a time until channel switching is terminated after a frame including a switch time field is transmitted by the reported AP. In this instance, the point in time of termination of the channel switching may be the point in time at which a corresponding AP resumes a BSS operation on a new channel.

In the case in which the AP MLD is the NSTR AP MLD that is incapable of performing simultaneous transmission or reception (NSTR type), since a switch type field indicates a time until channel switching is terminated after a frame including a switch time field is transmitted by the reported AP, a time indicated by the switch time field may be different for each time. That is, a time that the switch time field indicates may be gradually decreased every time a frame is transmitted.

In the case in which the AP MLD is the NSTR AP MLD, the AP MLD may be capable of transmitting a beacon frame only via an AP that operates in a primary link, and may be incapable of transmitting a beacon via an AP operating in a non-primary link. Therefore, information related to channel switching of the AP that operates in the non-primary link (e.g., a channel switch announcement element, a max channel switch time element, and the like) may be transmitted only an AP operated in the primary channel. Therefore, in the above-described channel switching operation, channel switching information of APs operating in the non-primary link included in the AP MLD may be transmitted only via an AP operating in the primary link.

In addition, a non-AP STA included in the non-AP MLD may recognize whether channel switching starts based on whether a channel switch announcement element and/or a max channel switch time element is included in a frame.

For example, when both a channel switch announcement element and a max channel switch time element are included in a frame, the non-AP STA may determine that channel switching is not yet started. However, when a received frame includes only a max channel switch time element without a channel switch announcement element, the non-AP STA may determine that a channel switching procedure is ongoing.

When a max channel switch time element is not included in a received frame, the non-AP STA may determine that a channel switch procedure is terminated. In this instance, the termination of a channel switching procedure may mean the resumption of a BSS operation of the reported AP in a new channel, as described above. In this instance, the AP MLD may be either an NSTR AP MLD or an STR AP MLD.

According to the above-described embodiments of the present invention, an NSTR mobile AP MLD may indicate information related to channel switching of a non-primary link via a beacon and (multi-link (ML)) probe response frame (hereinafter, a probe response frame) transmitted in a primary link. In the case in which a max channel switch time element related to channel switching of a non-primary link is utilized, a time indicated by a switch time field of the max channel switch time element may be considered as an indication of a time when channel switching of the non-primary link is expected to be completed, a time when signaling indicating completion of channel switching is expected to be indicated via a primary link, or a time when a previously agreed frame is to be transmitted in the non-primary (e.g., a TIM frame).

As another example, a method of indicating whether channel switching of a non-primary link is completed by using the existence of a max channel switch time element may be considered, and a detailed description thereof will be provided via embodiments of the present invention.

According to an embodiment of the present invention, whether an AP of a non-primary link completes channel/class switching may be indicated/interpreted by using whether a max channel switch time element related to the AP of the non-primary link is present.

More specifically, a max channel switch time element needs to be included together when an (extended) channel switching announcement element (an extended channel switching announcement element and a channel switching announcement element) associated with the AP of the non-primary link is transmitted via a beacon frame and (multi-link (ML)) probe response frame that an NSTR mobile AP MLD transmits in a primary link. In this instance, in a beacon and probe response frame transmitted after the start of a predetermined channel/class switching specified by the (extended) channel switching announcement element, only a max channel switching element is continuously included, without an (extended) channel switching announcement element. In this instance, when a max channel switch time element is included, this indicates that channel/class switching of the non-primary link AP is not completed. When a max channel switch time element is not included, this may possibly indicate that channel/class switching of the non-primary link AP is completed. That is, when a beacon and/or probe response frame received from the NSTR mobile AP MLD does not include a max channel switch time element corresponding to the AP of the non-primary link, a non-AP MLD may interpret this as completion of channel switching of the non-primary link (resumption of operation of a BSS). In this instance, the (extended) channel switching announcement element and max channel switch time element with respect to the non-primary link AP may be included in a per-STA profile which corresponds to the non-primary link AP and is included in the beacon and probe response frame transmitted in the primary link. In this instance, the max channel switch time element may indicate a time when (a time left until) the AP of the non-primary link is expected/evaluated to resume a service associated with a BSS on a new channel, via a switch time field (in a unit of a TU (1024 us)). In this instance, the NSTR mobile AP MLD that is incapable of indicating the expected/evaluated time via a max channel switch time element may configure the switch time field to 0 In this instance, the max channel switch time element may be included in a beacon and probe response frame continuously from when a channel switching announcement element corresponding to the AP of the non-primary link is included in a beacon and probe response frame until resumption of a BSS operation (service) after completion of channel switching of the non-primary link AP. In a pre-STA profile subfield including an (extended) channel switching announcement element in which a channel switching count field indicates 0, a max channel switch time element may also be included. Conversely, the NSTR mobile AP MLD may not include a max channel switching time element corresponding to the non-primary link AP in a beacon frame and probe response frame transmitted after completion of channel switching of the non-primary link. In this instance, when channel switching of the non-primary link is completed (when BSS operation is resumed), the NSTR mobile AP MLD may transmit an unsolicited probe response frame that does not include a max channel switch time element in the per-STA profile corresponding to the AP of the non-primary link. This may be an operation of the NSTR mobile AP MLD performed in order to enable a non-AP MLD that receives the unsolicited probe response frame to relatively quickly recognize the completion of channel switching of the non-primary link. In this instance, the unsolicited probe response frame may include completion information associated with the AP operated in the non-primary link. That is, the non-AP MLD that receives the unsolicited probe response frame from the NSTR mobile AP MLD may obtain the same amount of information associated with the non-primary link AP, as the amount of information obtained when the non-primary link transmits a probe response frame.

(Method of Indicating Whether Non-Primary Link Channel/Class Switching is Completed by Using Max Channel Switch Time Element)

To elaborate, an operation of an NSTR mobile AP MLD that transmits a channel switching announcement element or an extended channel switching announcement element in order to switch an operating channel/class of an AP operated in a non-primary link, and an operation of a non-AP MLD that receives the corresponding elements and performs non-primary link channel/class switching will be described sequentially.

The NSTR mobile AP MLD may determine, as a primary link, one of the links used for operating an AP, and may transmit a beacon and (ML) probe response frame only via the primary link. In this instance, a link different from the primary link is a non-primary link, and an AP operated in the non-primary link may not transmit a beacon and probe response frame.

The NSTR mobile AP MLD may need to switch an operating channel/channel of an AP operated in the non-primary link, and, in this instance, the NSTR mobile AP MLD may include a per-STA profile corresponding to the AP of the non-primary link in a beacon and probe response frame transmitted via the AP operated in the primary link, and may transmit the same. In this instance, in the per-STA profile, an (extended) channel switching announcement element and a max channel switch time element are included.

The extended channel switching announcement element may be utilized to change an existing channel and/or operating class to a new channel and/or class, and the channel switching announcement element may be used to change an operating channel to a new channel. In the (extended) channel switching announcement element, information specifying the point in time at which channel/class switching is initiated may be additionally included together. More specifically, channel switching count fields included in the two elements may indicate information related to when channel/class switching indicated via the corresponding element is to be started.

The NSTR mobile AP MLD that needs to change an operating channel/class of the AP operated in the non-primary link may include a max channel switch time element together in a per-STA profile including an (extended) channel switching announcement element, for transmission. In this instance, the max channel switch time element may indicate information related to how much time is to be spent in completing channel/class switching after a frame (beacon or probe response frame) including the corresponding element is transmitted/received. For example, a max channel switch time element transmitted together with a channel switching time announcement element transmitted via a per-STA profile corresponding to an AP of a predetermined non-primary link may indicate a time expected/evaluated to be spent until the AP of the predetermined non-primary AP completes channel switching indicated by the channel switching time announcement element. In this instance, the switch completion of channel switching of the predetermined non-primary link AP may mean that the AP of the predetermined non-primary link resumes a BSS operation (service) on a new channel.

That is, the max channel switch time element that the NSTR mobile AP MLD includes in the per-STA profile corresponding to the AP of the non-primary link for transmission may indicate a time left until resumption of operation of a BSS of the non-primary link AP, as opposed to a time related to a frame transmitted in a predetermined link.

In this instance, the NSTR mobile AP MLD according to some embodiments may be incapable of evaluating/estimating a time at which the AP of the non-primary is to resume operation of a BSS in a new operating channel/class. Alternatively, the NSTR mobile AP MLD according to some embodiments may not need to evaluate/indicate a time at which the AP of the non-primary link is to resume operation of a BSS in a new channel/class. In summary, the NSTR mobile AP MLD that is not to support a time left until the non-primary link AP resumes operation of a BSS in a new operating channel/class may configure, to 0, a switch time field included in a max channel switch time element corresponding to the non-primary link AP.

That is, when the NSTR mobile AP MLD configures the switch time field of the max channel switch time element corresponding to the non-primary link AP to 0, it may be understood that the point in time of resumption of operation of a BSS in a new channel/class is not indicated (unknown) via the max channel switch time element. Therefore, when a non-AP MLD receives the max channel switch time element corresponding to the non-primary AP from the NSTR mobile AP MLD, and identifies that the switch time field is configured to 0, the non-AP MLD may need to interpret a time left until the resumption of operation of a BSS of the non-primary link AP indicated by the max channel switch time element, as undefined (unknown) as opposed to a time after 0 TU (1 TU is 1024 us).

As described above, when there is intention to change an operating channel/class of an AP operated in the non-primary link, the NSTR mobile AP MLD may transmit a beacon/probe response frame including an (extended) channel switching announcement element and a max channel switch time element. Subsequently, the AP operated in the non-primary link starts channel/class switching at a time (e.g., a predetermined TBTT of the primary link) predetermined via the (extended) channel switching announcement element.

When the AP operated in the non-primary link starts channel/class switching, an existing BSS service is suspended and associated non-AP MLDs including a non-primary link may also initiate channel/class switching (may start switching earlier) of an STA operated in the non-primary link.

The NSTR mobile AP MLD may transmit a beacon/probe response frame via an AP operated in the primary link even when the AP of the non-primary link is performing channel/class switching. A beacon/probe response frame of the primary link transmitted while the AP of the non-primary link is performing channel/class switching may not include an (extended) channel switching announcement element in a per-STA profile corresponding to the AP of the non-primary link. A beacon/probe response frame of the primary link transmitted while the AP of the non-primary link is performing channel/class switching may still include a max channel switch time element in a per-STA profile corresponding to the AP of the non-primary link. In this instance, the max channel switch time element (more particularly, a switch time field) may indicate a time left until the AP of the non-primary link is evaluated/expected to resume a BSS service (BSS operation) after completion of channel/switching. In this instance, as described above, a max channel switch time element transmitted by the NSTR mobile AP MLD that does not support indication of the evaluated/estimated time may be configured to 0. In this instance, the max channel switch time element may be included in a beacon/probe response frame from when the AP of the non-primary link starts the channel/class switching until resumption of operation of a BSS after completion of channel/class switching.

Although a per-STA profile including an (extended) channel switching time element in which a channel switching count field is configured to 0 is included in a probe response frame, the corresponding per-STA profile may include a max channel switch time element.

A non-AP MLD associated with the NSTR mobile AP MLD may recognize that the AP of the non-primary link is still performing channel/class switching based on the fact that a max channel switch time element is included in a per-STA profile subelement corresponding to the non-primary link AP included in a beacon/probe response frame received in the primary link. In this instance, only when an (extended) channel switching announcement element is not included in the per-STA profile subelement that includes the max channel switch time element, the non-AP MLD may interpret the switching of the non-primary link AP as an ongoing process. In the case in which the (extended) channel switching announcement element is included in the per-STA profile subfield corresponding to the AP of the non-primary link together with the max channel switch time element, the max channel switch time element may be the max channel switch time element that was transmitted before the AP of the non-primary link starts channel/class switching.

The NSTR mobile AP MLD transmits a beacon/probe response frame including a max channel switch time element in a per-STA profile corresponding to the AP of the non-primary link while the AP of the non-primary link is performing channel/class switching, and may not include a max channel switch time element in a beacon/frame response frame any longer after the AP of the non-primary link completes channel/class switching. That is, in the case in which the AP of the non-primary link resumes a BSS service (operation) in a new operating channel/class, the NSTR mobile AP MLD may not transmit a max channel switch time element corresponding to the AP of the non-primary link in a beacon/frame probe frame transmitted in the primary link any longer.

Therefore, based on a max channel switch time element corresponding to the AP of the non-primary link is not included in a beacon/probe response frame received in the primary link, the non-AP MLD associated with the NSTR mobile AP MLD may recognize that the non-primary link AP's channel/class switching that has been ongoing is completed (operation of a BSS is resumed).

That is, in the case in which a beacon frame or (ML) probe response frame received most recently from the NSTR mobile AP MLD does not include a max channel switch time element associated with the non-primary link AP, the non-AP MLD may transmit a UL PPDU via the non-primary link.

The non-AP MLDs associated with the NSTR mobile AP MLD may be required not to transmit an up-link physical layer (PHY) protocol data unit (UP PPDU) from an indicated time at which the AP of the non-primary link is to start channel/class switch until recognizing that the AP of the non-primary link completes channel/class switch. This may be a UL PPDU transmission restriction applied because a BSS service is suspended during a process in which the AP of the non-primary link performs channel/class switch.

In this instance, an indicated time at which the AP of the non-primary link is expected to start channel/class switch may be a time recognized based on an (extended) channel switching announcement element (more particularly, a channel switching count field) included in a per-STA profile subelement corresponding to the AP of the non-primary link. For example, when the channel switching count field of the (extended) channel switching announcement element included in the per-STA profile subelement corresponding to the AP of the non-primary link is configured to 1, it may be indicated/interpreted that the AP of the non-primary link initiates channel switching at a TBTT (a TBTT of the primary link) subsequent to the transmission of the corresponding element. As another example, when the channel switching count field of the (extended) channel switching announcement element included in the per-STA profile subelement corresponding to the AP of the non-primary link is configured to 1, it is indicated/interpreted that the AP of the non-primary link starts it at any time after a frame including the corresponding element is transmitted. In this instance, the "any time" mentioned above may be an undefined point in time existing between the point in time of transmission/reception of the frame including the corresponding element and the point in time before a subsequent TBTT (of the primary link).

In this instance, the time at which the AP of the non-primary link recognizes the completion of the channel/class switch may be a time at which a beacon/probe response frame, excluding a max channel switch time element corresponding to the AP of the non-primary link, is received.

As described above, the non-AP MLDs associated with the NSTR mobile AP MLD are restricted from UL PPDU transmission in the non-primary link until the non-primary link AP's channel/class switch is completed. Accordingly, the NSTR mobile AP MLD may need to operate to enable the non-AP MLDs to recognize completion of the non-primary link's channel/class switch, as quickly as possible. To this end, the NSTR mobile AP MLD may transmit an unsolicited probe response frame when the indicated channel/class switch of the non-primary link is completed. In this instance, the unsolicited probe response frame does not include a max channel switch time element corresponding to the non-primary link AP. In this instance, the unsolicited probe response frame may include complete information associated with the non-primary link AP. The fact that the complete information is included in the unsolicited probe response frame may mean that all information indicated when the AP of the non-primary link transmits a probe response frame may be indicated/obtained via the unsolicited probe response frame (transmitted in the primary link). Non-AP MLDs that receive the unsolicited probe response transmitted from the NSTR mobile AP MLD may recognize that channel/class switch that the AP of the non-primary link has been performing is completed (a BSS of the non-primary link AP is serviced (operated)), and may attempt UL PPDU transmission in the non-primary link before a subsequent beacon is received.

In addition, in the case in which an channel/class switch operation, indicated via an (extended) channel switching announcement element, fails, that is, a switching operation that has been attempted fails consequentially, the NSTR mobile AP MLD may transmit an unsolicited probe response frame. In this instance, complete information associated with the non-primary link AP that has been attempting channel switching may be included in the corresponding probe response frame. Based on the complete information indicated in associated with the non-primary link AP, a non-AP MLD that receives the probe response frame may recognize that the channel switching operation indicated with respect to the non-primary link AP fails/is cancelled.

In this instance, in response to the failure of channel switching, the NSTR mobile AP MLD may transmit an (extended) channel switching announcement element indicating the existing operating channel/class as a new channel/class via a per-STA profile corresponding to the non-primary link AP. That is, while switching that indicates a new channel/class different from the existing operating channel/class is being performed, an (extended) channel switching announcement element indicating the channel/class prior to switching is indicated, the ongoing channel switching is cancelled.

Figure 23:
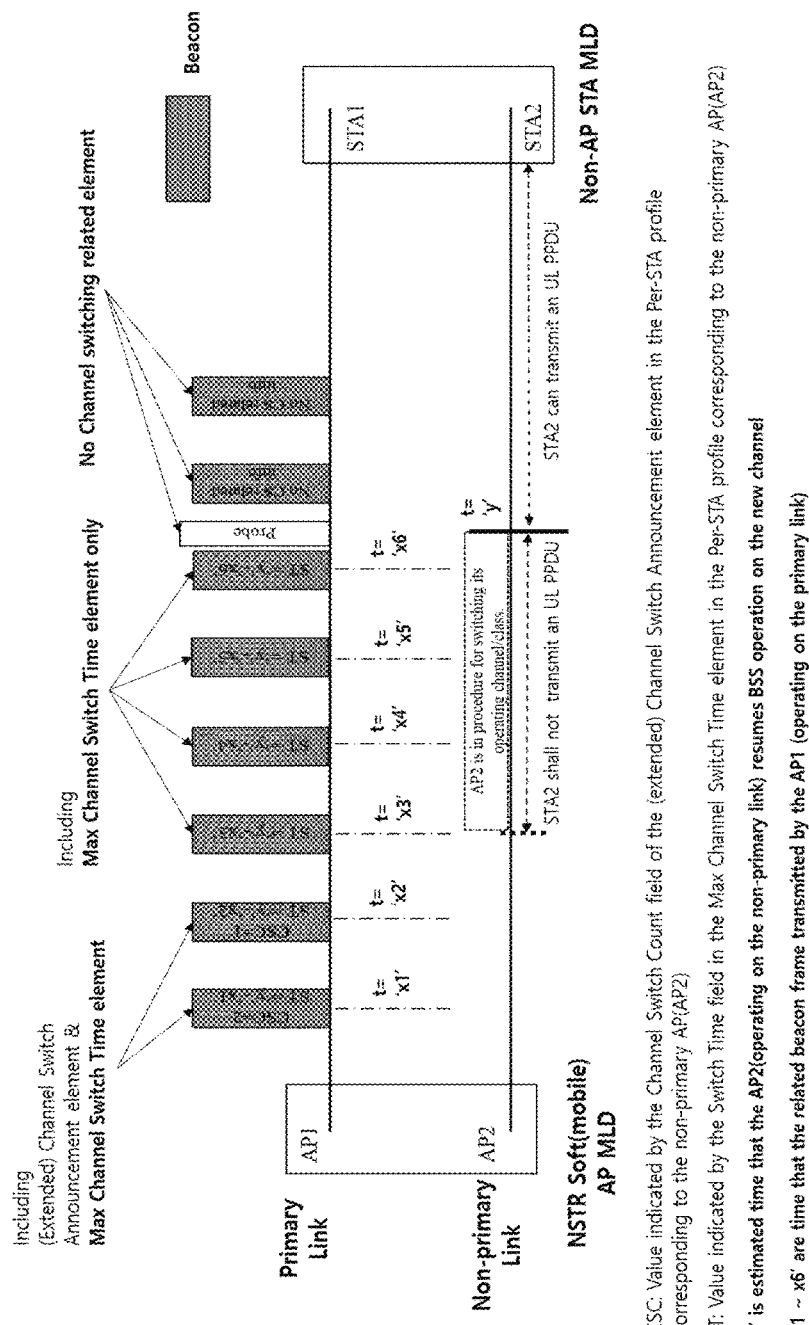
FIG. 23 illustrates an example of a channel switching method according to an embodiment of the present invention.

FIG. 23 illustrates an example of a channel switching method according to an embodiment of the present invention.

Referring to FIG. 23, whether a non-primary link channel switching is ongoing/completed may be indicated using a max channel switch time element.

Specifically, an NSTR mobile AP MLD operates AP1 and AP2 in a primary link and a non-primary link, respectively, and a non-AP STA MLD is connected to the NSTR mobile AP MLD via the primary link and the non-primary link.

The NSTR mobile AP MLD may include an (extended) channel switching announcement element corresponding to the non-primary link (AP2) in a beacon frame and probe response frame, which are transmitted in the primary link in order change an operating channel (and/or an operating class) of a BSS that the AP2 operates, and may transmit the same. In this instance, not illustrated in the drawing, the corresponding element may be transmitted via a per-STA profile subelement that corresponds to the non-primary link AP and is included in the beacon/probe response frame. In this instance, a max channel switch time element is included together in the corresponding per-STA profile subelement.

A first beacon (leftmost) identified in FIG. 23 may include an (extended) channel switching announcement element including a channel switching count field configured to 2 and a max channel switch time element including a switch time field indicating 'y'-'x1'. In this instance, 'y' denotes the point in time at which the AP2 is evaluated/expected to complete switching to a new channel/class and to resume operation of a BSS. 'x1' denotes the point in time at which a beacon frame (the first beacon of FIG. 23) including the corresponding element is transmitted/received. In the case in which the NSTR mobile AP MLD does not support evaluation/estimation of 'y', the switch time field of the max channel switch time element may be configured to/indicated as 0. The non-AP (STA) MLD may receive, via STA1, the first beacon transmitted in the primary link, and may recognize that the AP2 of the NSTR mobile AP MLD has an intention of switching to a new channel/class.

A second identified beacon identified in FIG. 23 may include an (extended) channel switching announcement element including a channel switching count field configured to 1 and a max channel switch time element including a switch time field indicating 'y'-'x2'. In this instance, 'y' denotes the point in time at which the AP2 is estimated/expected to complete switching to a new channel/class and to resume operation of a BSS. 'x2' denotes the point in time at which a beacon frame (the second beacon of FIG. 23) including the corresponding element is transmitted/received. In the case in which the NSTR mobile AP MLD does not support evaluation/estimation of 'y', the switch time field of the max channel switch time element may be configured to/indicated as 0. The non-AP (STA) MLD may receive, via STA1, the second beacon transmitted in the primary link and may identify that the channel switching count field is configured to 1, thereby recognizing that the AP2 of the NSTR mobile AP MLD is to start switching to a new channel/class in a subsequent TBTT of the primary link. In this instance, when a probe response frame is transmitted from the NSTR mobile AP MLD between the first beacon and the second beacon, an (extended) channel switching announcement element and a max channel switch time element for the AP2 included in the probe response frame may be configured in the same manner as the second beacon. In this instance, a time indicated via a switch time field of the max channel switch time element included in the probe response frame may be the difference between the point in time at which the corresponding probe response frame is transmitted/received and the point in time at which the AP2 is evaluated/estimated to resume operation of a BSS in a new operating channel/class.

A third to sixth beacons identified in FIG. 23 may not include (extended) channel switching announcement elements, but may include only max channel switch time elements. A max channel switch time element may be configured, via a switch time field, to a time difference (the difference) between the point in time at which a beacon frame including the corresponding element is transmitted/received and the point in time at which the AP2 is evaluated/estimated to resume operation of a BSS in a new operating channel/class. In this instance, in the case in which a probe response frame transmitted by the NSTR mobile AP MLD is present between the third beacon and the sixth beacon, a switch time field of a max channel switch time element included in the probe response frame may be configured in the same manner as the switch time fields of the max channel switch time elements included in the third to sixth beacons.

When it is identified that a beacon and (multi-link (ML)) probe response frame received from the NSTR mobile AP MLD does not include an (extended) channel switching announcement element but only a max channel switch time element in a per-STA profile for the AP2, UL PPDU transmission in the non-primary link (i.e., to AP2 via STA2) is not performed.

In the case in which channel/class switching of the AP2 is completed, which has been announced via the first and second beacon frames, the NSTR mobile AP MLD may transmit an unsolicited (ML) probe response frame (probe of FIG. 23) in the primary link. In this instance, the unsolicited probe response frame that the NSTR mobile AP MLD transmits is a probe response frame that the NSTR mobile AP MLD transmits although a probe request frame is not received in the primary link. The unsolicited probe response frame may not include a max channel switch time element in a per-STA profile for the AP2. Based on the fact that the max channel switch time element is not included in the per-STA profile subelement for the AP2, the non-AP (STA) MLD that receives the corresponding probe response frame in the primary may recognize that channel/class switching indicated (announced) with respect to the non-primary link (AP2) is completed by the AP2. Subsequently, the non-AP MLD may attempt UL PPDU transmission to the AP2 via STA2. That is, in the case in which a beacon frame or (ML) probe response frame received most recently from the NSTR mobile AP MLD does not include a max channel switch time element associated with the non-primary link AP, the non-AP MLD may transmit a UL PPDU via the non-primary link.
<Non-Primary Link Disablement>

As described above, when an NSTR mobile AP MLD changes an operating channel and/or class of a non-primary link AP, non-AP MLDs may be restricted from performing UL PPDU transmission in the non-primary link.

This restriction is considered since PPDU reception is unavailable when the AP of the non-primary link performs channel switching. More generally, all APs which are performing channel switching may be restricted from performing UL PPDU transmission. More specifically, even when an AP of a general AP MLD performs channel switching, as opposed to an AP of an NSTR mobile AP MLD, non-AP STAs (an STA of an MLD or a general STA) associated with the corresponding AP may be required not to perform UL PPDU transmission. Alternatively, although UL PPDU is transmitted, an AP that is performing channel switching is incapable of receiving the same. Therefore, although restrictions are not separately defined, if non-AP STAs are capable of recognizing an associated AP is performing channel switching, it is clear that UL PPDU transmission is not performed.

As described above, AP MLDs including an NSTR mobile AP MLD are incapable of receiving a PPDU transmitted via a predetermined link while an AP of the predetermined link is performing channel switching. Accordingly, the AP MLDs may provide an indication, to its associated non-AP MLDs, not to perform UL PPDU transmission in the predetermined link while the AP of the predetermined link is performing channel switching. In this instance, the (NSTR mobile) AP MLD may be capable of indicating, as a disabled link, the predetermined link for which channel switching is ongoing. When a predetermined link is indicated as a disabled link, non-AP STAs associated with an AP of the disabled link may be required not to perform UL PPDU transmission during a disabled interval.

In this instance, the (NSTR mobile) AP MLD indicates the link for which channel switching is performed as a disabled link, thereby causing the non-AP STAs not to perform UL PPDU transmission to an AP that is performing channel switching.

<Traffic Identifier (TID)-to-Link Mapping and Link Disablement>

MLDs may be associated via multiple links, and are capable of utilizing the multiple links for different purposes such as improving QoS or achieving an operational purpose. For example, two MLDs may agree on performing high-capacity file or video transmission/reception via 6 GHz which ensures a wide BW, and may agree on performing data and management frame exchange, which requires more stable transmission or reception, via 2.4 GHz that ensures a wide coverage.

As described above, the purposes of use of respective links when the two MLDs connected via multiple links utilize may be determined based on negotiation between the two the MLDs, and TID-to-link mapping may be used in this process.

TID-to-link mapping is a method of distinguishing a TID of a frame to be transmitted in each link, and may be determined based on the negotiation between the two MLDs or indication by an AP MLD. In the case in which a predetermined TID is only mapped to a predetermined link, but not to another link, a frame that has the predetermined TID may be transmitted in the predetermined link but not in the other link. In this instance, TID-to-link mapping may be determined to be different for each direction in which two MLDs perform transmission (the UL direction in the case of a non-AP MLD and the DL direction in the case of an AP MLD).

As described above, only a frame of the TID mapped to the predetermined link may be transmitted in the predetermined link, and thus any frame may not be exchanged in a link to which no TID is mapped. As described above, a link to which no TID is mapped among the links that connect two MLDs may be referred to as a disabled link, and frame exchange may not be performed via the disabled link.

During an interval in which channel switching of the predetermined link is ongoing, an (NSTR mobile) AP MLD may switch the predetermined link to a state in which no TID is mapped to the predetermined link, that is, a disabled link. To this end, the AP MLD may include an indicating for switching the predetermined link to a disabled state in a beacon and probe response frame for transmission, and may transmit the same. More specifically, the AP MLD may broadcast a TID-to-link mapping indication to prevent a TID from being mapped to the predetermined link. In this instance, non-AP MLDs that receive the TID-to-link mapping indication from the AP MLD may comply with the TID-to-link mapping indicated by the AP MLD. In this instance, a method in which the AP MLD indicates TID-to-link mapping may be to use a TID-to-link mapping element. In this instance, the TID-to-link mapping element may have a configuration including a link bitmap indicating link information to which each TID is to be mapped. For example, in order to indicate link information to which TID0 is to be mapped, a link bitmap corresponding to TID0 may be included. The respective bits of link bitmap (2-octet) may correspond to link 0 to link 14, respectively. In this instance, in the case in which bits (B0 and B1 of link bitmap) corresponding to link 0 and link 1 are configured to 1, TID0 is interpreted as being mapped to link 0.

In addition, the (NSTR mobile) AP MLD may indicate information of the point in time at which TID-to-link mapping indicated by itself is applied and a maintained time interval (a duration), and may use a reduced neighbor report (RNR) element corresponding to an AP of a link disabled by TID-to-link mapping, so as to indicate the corresponding link as a disabled link. More specifically, via a mapping switch time field included in the TID-to-link mapping element, the AP MLD may indicate information associated with the point in time at which the TID-to-link mapping indicated via broadcast is to be applied. In addition, via an expected duration field included in the TID-to-link mapping element, the AP MLD may indicate information associated with the point in time at which the TID-to-link mapping indicated via broadcast is to be applied.

The mapping switch time field is a field indicating a value in a unit of a TU configured to carry 2 octets. After a time indicated by the mapping switch time field of the TID-to-link mapping element elapses, the TID-to-link mapping indicated by the corresponding TID-to-link mapping element may be applied. That is, the TID-to-link mapping information to be applied and the point in time at which the information is to be applied may be included in the TID-to-link mapping element that the AP MLD indicates via a beacon/probe response frame.

The expected duration field is a field to indicate a value in a unit of a TU configured to carry 3 octets, and may indicate the length of time during which the TID-to-link mapping indicated by the TID-to-link mapping element is applied. That is, the TID-to-link mapping information to be applied and the length of time during which the information is to be applied may be included in the TID-to-link mapping element indicated by the AP MLD.

The (NSTR mobile) AP MLD may indicate the predetermined link as a disabled link during a time interval during which an AP of the predetermined link performs channel switching, so as to prevent non-AP MLDs from performing UL PPDU transmission via the predetermined link while the AP of the predetermined link performs channel switching. That is, the AP MLD may indicate TID-to-link mapping that disables the predetermined link during the time interval during which the AP of the predetermined link performs channel switching. That is, the function of the TID-to-link mapping that disables the predetermined link may be utilized for the purpose of preventing a UL PPDU from being transmitted in a link for which channel switching is ongoing.

More specifically, the (NSTR mobile) AP MLD may indicate the point in time at which the AP of the predetermined link starts channel switching, by using a mapping switch time field, and may broadcast a TID-to-link mapping element indicating an expected time interval up to the completion of channel switching by using an expected duration field, so as to prevent the non-AP MLDs from performing UL PPDU transmission to the AP of the predetermined link. In this instance, the TID-to-link mapping state indicated by the TID-to-link mapping element may be the state in which no TID is mapped to the predetermined link (i.e., the predetermined link is disabled).

In this instance, when the AP MLD switches the predetermined link to a disabled state, there may be a restriction that requires the predetermined link to be switched to a non-disabled (i.e., enabled, available) state after the time indicated by the expected duration field elapses, or earlier than the time. This may be an operational restriction on the AP MLD so as to allow non-AP MLDs, which recognize that the predetermined link is to be switched to a disabled state via the TID-to-link mapping element indicated by the AP MLD, to perform an operation under assumption that the predetermined link is to be switched to an available state after the time indicated by the expected duration field of the corresponding TID-to-link mapping element elapses.

For example, when the predetermined link is switched to a disabled state, the non-AP MLD may prepare UL PPDU transmission in advance before a disabled duration indicated via the expected duration ends, and when the AP MLD maintains the disabled state of the predetermined link longer than the time indicated, the UL PPDU transmission by the non-AP MLD may fail. This may show that incorrect information indication by the AP MLD may cause the non-AP MLD to operate inefficiently.

As another example, in the case in which the AP MLD indicates the disabled duration of a predetermined link as a value longer than a predetermined value, a predetermined non-AP MLD may likely prefer to perform disassociation (teardown) rather than to maintain the predetermined link in the disabled state. However, there may be the probability that the AP MLD indicates that a disabled state is maintained during a shorter interval than the predetermined value via the expected duration field, but the interval during which the disabled state is maintained is prolonged, and thus the disabled state is maintained longer than the predetermined value. In this instance, due to incorrect expected duration indication by the AP MLD, the non-AP MLD may lose a chance to perform a more efficient operation which is suitable for an operational purpose.

Therefore, the AP MLD that switches a predetermined link to a disabled state may have a restriction requiring the AP MLD to accurately report a time during which the predetermined link is maintained in a disabled state by using an expected duration field. In this instance, the AP MLD may be capable of maintaining the predetermined link in a disabled state during an interval shorter than a disabled duration initially indicated for the predetermined link. In this instance, the AP MLD may transmit an expected duration field again that indicates a time earlier than the time initially indicated by the expected duration field. That is, the AP MLD may transmit a TID-to-link mapping element indicating a time earlier than the time (the point in time at which the disabled state ends) indicated by the expected duration field of the first TID-to-link mapping element that is broadcasted to switch the predetermined link to a disabled state. That is, a disabled duration of the predetermined link indicated by the AP MLD may end earlier than the initially indicated time. Conversely, the AP MLD may be restricted from maintaining the predetermined link as a disabled state during an interval longer than the disabled duration initially indicated for the predetermined link. Therefore, the AP MLD may be required not to transmit a TID-to-link mapping element indicating a time later than the time (the time at which the disabled state ends) indicated by the expected duration field of the first TID-to-link mapping element broadcasted to switch the predetermined link to the disabled state.

An AP that performs channel switching may discover an unexpected problem while performing switching to a new operating channel/class, and may need to change the ongoing channel/class switching. For example, an AP that performs channel switching to a new operating channel may sense a radar signal, a satellite signal, or the like, and may determine that the AP is incapable of operating on the corresponding channel. In this instance, the AP may change the operating channel again to another channel, and may result in completion of channel/class switching that is later than the AP has expected. That is, the completion time of the channel/class switching may be a type of operation that is incapable of being accurately expected.

For the same reasons, when the AP MLD indicates the time at which the AP of a predetermined link is expected to complete channel switching, by using an expected duration field (of a TID-to-link mapping element), channel switching may not be completed at the time indicated by the expected duration field due to external variables. It is not that the time at which the AP MLD switches the predetermined link to a disabled state is changed, but it is because a planned channel/class switching procedure is delayed due to external variables. Therefore, in the case in which the predetermined link is switched to a disabled state in response to channel switching of the predetermined link, the AP MLD is allowed to prolong the disabled duration of the predetermined link. Conversely, excluding the case in which the predetermined link is switched to a disabled state in response to channel switching of the predetermined link, the AP MLD may be required not to prolong the disabled duration of the predetermined link. That is, the AP MLD needs to maintain the predetermined link in a disabled state during an interval that is shorter than or equal to the initially indicated duration.

Therefore, the AP MLD may configure an expected duration field that indicates a time later than the previously indicated time, only in the case of a TID-to-link mapping element that indicates a link for which channel switching is ongoing as a disabled link. That is, the AP MLD may transmit a TID-to-link mapping element in which an expected duration field is configured to indicate a time later than the time indicated by the expected duration field of the TID-to-link mapping element transmitted first in order to indicate the link for which channel switching is ongoing as a disabled link. In this instance, TID-to-link mapping information (the relationship between a link and a TID) indicated by the two TID-to-link mapping elements may be the same.

In the case in which the AP MLD uses a max channel switching time element in the process of performing channel switching of a predetermined link, the AP MLD may indicate the time same as a time indicated in the max channel switching time element, via an expected duration field of a TID-to-link mapping element that indicates channel switching of the predetermined link as a disabled link. In other words, in the case in which a TID-to-link mapping element and a max channel switching time element are used together in association with channel/class switching of a predetermined link, an expected duration field of the TID-to-link mapping element and a switch time field of the max channel switching time element indicate the same point in time.

In the same manner, in the case in which the AP MLD indicates a link for which channel switching is ongoing as a disabled link, a disabled link indication subfield of an MLD parameter corresponding to the link for which the channel switching is ongoing may be indicated as 1 in an RNR element (included in a beacon and probe response frame) that the AP MLD transmits. After channel switching of the predetermined link is completed, the non-AP MLDs may identify that the disabled link indication subfield corresponding to the predetermined link is indicated as 0 in the RNR element, and may recognize that the AP of the predetermined link completes channel switching. That is, the non-AP MLD that identifies that the disabled link indication subfield corresponding to the predetermined link is configured to 0 may transmit a UL PPDU to the AP of the predetermined link. <Simultaneous channel/class switching of primary link and non-primary link> An NSTR mobile AP MLD may simultaneously perform operating channel/class switching of a primary link and a non-primary link, or may start channel/class switching of the primary link while channel/class switching of the non-primary link is ongoing. In the case in which channel/class switching of the primary link is ongoing, a beacon/probe response frame may not be transmitted in the primary link, and thus channel/class switching of the non-primary link may be restricted from being started while channel/class switching of the primary link is ongoing. For reference, in a description of the present invention provided below, an operating channel of a primary link and an operating channel of a non-primary link may be used together, and the expressions are used to respectively indicate an operating channel of an AP operated in the primary link and an operating channel of an AP operated in the non-primary link. In addition, a channel switch announcement element in a description is an abbreviated expression of an (extended) channel switch announcement element, and channel switching is an abbreviated expression of channel/class switching.

As described above, an NSTR mobile AP MLD determines/designates one of the two links in which the AP MLD itself operates APs as a primary link, and may determine/designate the remaining link as a non-primary link for operation. The primary link has an important role in operating a BSS of the NSTR mobile AP MLD, as the NSTR mobile AP MLD transmits a beacon frame and a probe response frame only via the primary link, and a non-AP MLD that is to be associated with the NSTR mobile AP MLD needs to perform an association procedure only via the primary link.

Therefore, the NSTR mobile AP MLD may designate/operate, as a primary link, a link that is easy to utilize as a primary link between the two links (a primary link and a non-primary link) operated by the AP MLD itself. In the case in which a link that has been determined/operated as a non-primary link is determined as being better than a link that has been operated as a primary link, the NSTR mobile AP MLD may need to change the existing non-primary link to a primary link, and may change the existing primary link to a non-primary link.

In this instance, the NSTR mobile AP MLD may indicate a new operating channel of the primary link as an operating channel of the existing non-primary link via an (extended) channel switch announcement element associated with the primary link and, simultaneously, may indicate a new operating channel of the non-primary link as an operating channel of the existing primary link via an (extended) channel switch announcement element associated with the non-primary link. That is, the NSTR mobile AP MLD may indicate new operating channels for the primary link and the non-primary link as the operating channels of the existing non-primary link and the primary link, respectively, so as to swap (switch) the operating channels of the primary link and the non-primary link, mutually.

In the case in which a primary link is changed according to a method of switching the operating channels of the primary link and the non-primary link with each other, the NSTR mobile AP MLD may change the AP that has been operated in the existing primary link to act as the AP that has been operated in the non-primary link, and may change the AP that has been operated in the existing non-primary link to act as the AP that has been operated in the primary link, instead of actually performing channel switching, thereby completing channel switching with respect to the two links.

In the case in which the NSTR mobile AP MLD transmits channel switch announcement elements in association with the primary link and the non-primary link, in order to swap (switch) the primary link and the non-primary link with each other, there may be a restriction that requires channel switching of the two links needs to be started at the same time. This may be a restriction considered to prevent the operating channels of the primary link and the non-primary link of the NSTR mobile AP MLD from overlapping on the same channel at a predetermined instance.

To this end, the NSTR mobile AP MLD may need to configure, to the same value, the channel switch count fields of the two channel switch announcement elements which are transmitted in order to switch the primary link and the non-primary link with each other. More specifically, when transmitting two channel switch announcement elements in a beacon and probe response frame in order to switch the primary link and the non-primary link with each other, the NSTR mobile AP MLD may need to configure the switch time fields respectively included in the two channel switch announcement elements to the same value. In this instance, between the two channel switch announcement elements, an element associated with the primary link may be located outside a multi-link element (ML-element) of the beacon/probe response frame, and an element associated with the non-primary link may be included in a per-STA profile associated with the non-primary link (AP) included in the ML-element of the beacon/probe response frame.

In addition, for the purpose of switching the primary link and the non-primary link with each other, the NSTR mobile AP MLD may need to start advertising the channel switch announcement elements associated with the primary link and the non-primary link at the same point in time. That is, the channel switch announcement elements of the primary link and the non-primary link that the NSTR mobile AP MLD transmits in order to switch the primary link and the non-primary link with each other may need to be always indicated together.

In addition, for the purpose of switching the primary link and the non-primary link with each other, the NSTR mobile AP MLD may need to indicate the same point in time via two max channel switch time elements associated with the primary link and the non-primary link. That is, a max channel switch time element associated with the primary link (more specifically, a switch time field) may need to indicate the same point in time as a max channel switch time element (more specifically, a switch time field) associated with the non-primary link.

Even though it is different from the above-described case in which a primary link and a non-primary link are switched with each other, the NSTR mobile AP MLD may transmit a beacon/probe response frame including both an (extended) channel switch announcement element for the primary link and an (extended) channel switch announcement element for the non-primary link. For example, the NSTR mobile AP MLD may include an (extended) channel switch announcement element in a per-STA profile associated with the non-primary link in order to advertise channel/class switching for the non-primary link, and may additionally include an (extended) channel switch announcement element corresponding to the primary link in a beacon/probe response frame in order to advertise channel/class switching associated with the primary link. That is, the NSTR mobile AP MLD may include the (extended) channel switch announcement element corresponding to the primary link and the (extended) channel switch announcement element corresponding to the non-primary link in the single beacon/probe response frame. In this instance, the two (extended) channel switch announcement elements may be Advertises related to independent channel switching procedures, as opposed to being used for exchanging the primary link and the non-primary link.

In this instance, when including the (extended) channel switch announcement element corresponding to the primary link and the (extended) channel switch announcement element corresponding to the non-primary link in the single beacon/probe response frame, the NSTR mobile AP MLD may have a restriction requiring that a value indicated by a channel switch count field of the (extended) channel switch announcement element corresponding to the primary link is configured to a value greater than or equal to a value indicated by a channel switch count field of the (extended) channel switch announcement element corresponding to the non-primary link. This may be a restriction considered to prevent the channel switch count field value of the (extended) channel switch announcement element associated with the primary link from reaching 1 earlier than the channel switch count field of the (extended) channel switch announcement element associated with the non-primary link.

To describe in detail, in the case in which an (extended) channel switch announcement element having a smaller channel switch count value corresponds to the primary link between the two (extended) channel switch announcement elements included in a single beacon/probe response frame, a beacon frame may not be transmitted in the primary link any longer when the channel switch count field of an (extended) channel switch announcement element corresponding to the primary link is indicated as 1. Accordingly, an (extended) channel switch announcement element corresponding to the non-primary link may not be transmitted any longer, which is a drawback. That is, the problem that an (extended) channel switch announcement element corresponding to the non-primary link is incapable of being transmitted in the primary link when a channel switch count field value corresponding to the primary link is smaller than a channel switch count field value corresponding to the non-primary link may occur, that is, the problem that counting down related to the start time of channel switching of the non-primary link is incapable of being completed may occur.

Therefore, when including an (extended) channel switch announcement element corresponding to the primary link and an (extended) channel switch announcement element corresponding to the non-primary link in a single beacon/probe response frame, the NSTR mobile AP MLD may need to configure a channel switch count field value of the (extended) channel switch announcement element associated with the primary link to be greater than or equal to a channel switch count field value of the (extended) channel switch announcement element associated with the non-primary link. In this instance, as described above, the case in which the two channel switch count field values are configured to be equal may be the case in which the NSTR mobile AP MLD has a purpose/intention of switching the operating channels of the primary link and the non-primary link with each other. In addition, to configure channel switch count field values for two links to the same value may still be allowed, when an operating channel/class of the primary link is to be switched from a first operating channel/class to a second operating channel/class and, simultaneously, an operating channel/class of the non-primary link is to be switched from a third operating channel/class to a fourth operating channel/class.

Figure 24:
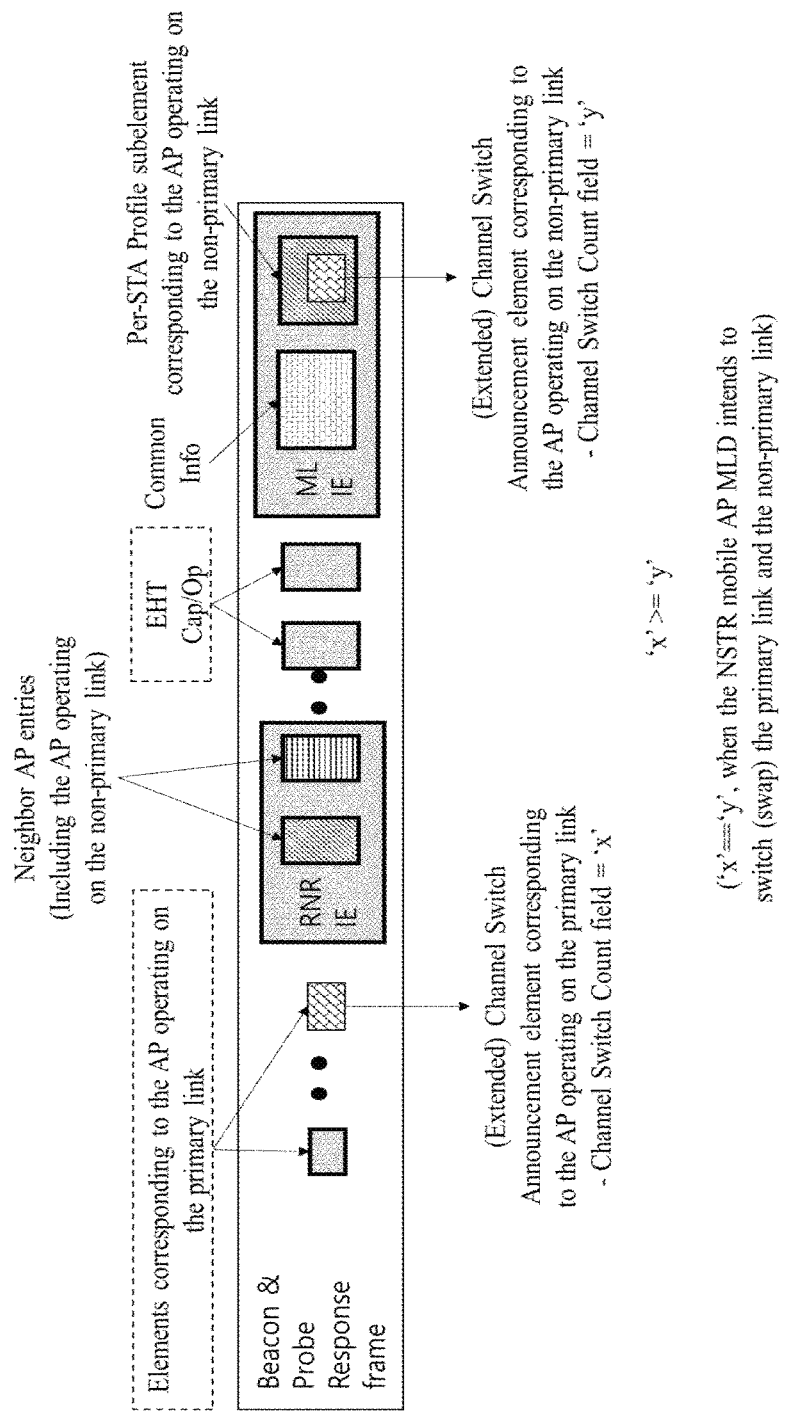
FIG. 24 illustrates an example of the configuration of a beacon frame and a probe response frame for channel switching according to an embodiment of the present invention.

FIG. 24 illustrates an example of the configuration of a beacon frame and a probe response frame for channel switching according to an embodiment of the present invention.

Referring to FIG. 24, both an (extended) channel switch announcement element corresponding to a primary link and an (extended) channel switch announcement element corresponding to a non-primary link may be included in a beacon/probe response frame. The (extended) channel switch announcement element corresponding to the primary link may be indicated (included) in a location outside a multi-link element, and the value of a channel switch count field is configured to 'x'. The (extended) channel switch announcement element corresponding to the non-primary link may be indicated (included) in a per-STA profile sub-element that corresponds to the non-primary link and is included in the multi-link element, and the value of a channel switch count field is configured to 'y'.

When the (extended) channel switch announcement elements associated with the primary link and the non-primary link are included together in the single beacon/probe response frame, the value of the channel switch count field corresponding to the primary link may be configured to be greater than or equal to the value of the channel switch count field corresponding to the non-primary link.

In this instance, 'x' and 'y', which are the values of the two channel switch count fields may be configured to the same value when the NSTR mobile AP MLD needs to switch the operating channels of the primary link and the non-primary link with each other.

Alternatively, in the case in which counting down via the (extended) channel switch announcement element corresponding to the non-primary link is suspended as channel switching of the primary link starts, the NSTR mobile AP MLD and non-AP MLDs may consider that channel switching of the non-primary link is to start/has started based on a virtual TBTT at which the (extended) channel switch announcement element corresponding to the non-primary link is expected to reach 0.

To elaborate, in the case in which a channel switch count field value of an (extended) channel switch announcement element corresponding to the non-primary link is 2 (in this instance, a channel switch count field value of an (extended) channel switch announcement element corresponding to the primary link is 1) in a last beacon frame transmitted before an AP of the primary link starts channel switching, the NSTR mobile AP MLD may initiate non-primary link's channel/class switching at the point in time that is a 2× a beacon interval after a TBTT at which the corresponding beacon frame is transmitted. That is, the NSTR mobile AP MLD and non-AP MLDs may determine that channel switching of the non-primary link is to start or has started when a period of time corresponding to the value of a last channel switch count field indicated/that has been indicated in association with the non-primary link x a beacon interval (a beacon interval of the primary link) elapses after the TBTT at which a beacon frame including the corresponding channel switch count field is transmitted.

This may be an operation performed by considering that a virtual beacon frame is transmitted at a virtual TBTT (existing for each beacon interval) although a beacon frame is not transmitted any longer in the primary link due to channel switching that has begun in the primary link. In this instance, it is considered that each virtual beacon frame indicates a value that is 1 smaller than a previous (virtual) beacon frame via a channel switch count field corresponding to the non-primary link, and thus it is determined that channel switching of the non-primary link is initiated/has been initiated at the point in time at which the channel switch count field value corresponding to the non-primary link is determined (calculated, estimated) as reaching 0 when channel switching is not performed in the primary link.

<Operation of Non-AP MLD that does not Perform Channel/Class Switching Performed in Primary Link>

When an NSTR mobile AP MLD announces channel/class switching for a non-primary link, a non-AP MLD may determine not to perform the corresponding (specified) channel/class switching and, in this instance, may release (teardown) the connection of the non-primary link. In this instance, the non-AP MLD may perform/initiate a multi-link resetup procedure in order to release the connection of the non-primary link. Alternatively, the non-AP MLD may perform termination (disassociation) of an ML setup with the NSTR mobile AP MLD, and may newly perform single-link association with the primary link. That is, the non-AP MLD that selects not to perform the announced channel/class switching associated with the non-primary link may switch to a state of being associated with the NSTR mobile AP MLD only via the primary link.

When the NSTR mobile AP MLD announces channel/class switching associated with the primary link, the non-AP MLD may determine not to perform the corresponding (specified) channel/class switching and, in this instance, may perform releasing (disassociation) of the connection with the NSTR mobile AP MLD. In this instance, the disassociation may be releasing (teardown) of the connection to both the primary link and the non-primary link. That is, when the NSTR mobile AP MLD announces channel/class switching associated with the primary link, the non-AP MLD may not perform the corresponding (specified) channel/class switching but may determine to move to another AP or another MLD. In this instance, the non-AP MLD that determines not to perform the corresponding (specified) channel/class switching may need to transmit a disassociation frame to the NSTR mobile AP MLD.

Unlike the case in which channel/class switching announced for the non-primary link is selected not to be performed, when channel/class switching announced for the primary link is not performed, the connection to the NSTR mobile AP MLD needs to be terminated because a BSS operated by the NSTR mobile AP MLD is highly dependent upon the primary link. That is, this may be a result of restricting a connection aside from the primary link from being maintained because the non-AP STA and the NSTR mobile AP MLD connected only via the non-primary link, excluding the primary link, may be incapable of performing frame exchange normally.

In this instance, the non-AP MLD may receive a frame that requests a response frame from the NSTR mobile AP MLD, before starting/completing the movement to another AP or another AP MLD. This may be a phenomenon that occurs when the NSTR mobile AP MLD does not recognize the determination not to perform channel switching and to move to another AP or another AP MLD. That is, the NSTR mobile AP MLD may announce channel/class switch information associated with the primary link, and may transmit a frame that requests a response frame response to the non-AP MLD without recognizing that the non-AP MLD determines not to perform the channel switching. In this instance, the non-AP MLD does not respond to the frame received from the NSTR mobile AP MLD, and may implicitly indicate, to the NSTR mobile AP MLD, that the non-AP MLD itself determines not to perform the channel/class switching.

Therefore, according to an embodiment of the present invention, the non-AP MLD that determines not to perform channel/class switching announced by the NSTR mobile AP MLD in association with the primary link may not respond to the frame received from the NSTR mobile AP MLD. In this instance, the point in time at which no response is provided to the received frame may be when determination not to perform channel/class switch is made (when the determination is maintained). In this instance, the point in time at which the no response is provided to the received frame may be after the start of the channel/class switching of the primary link, and may be when determination not to perform channel/class switching is made. In this instance, even in the case in which the non-AP MLD determines not to perform channel/class switching, the non-AP MLD may respond to a frame received before channel/class switching starts (before a subsequent TBTT after a beacon frame having a channel switch count field of 1 is transmitted). In addition, a frame, received from the NSTR mobile AP MLD after the channel/class switching announced in association with the primary link starts, is received via the non-primary link, and thus the non-AP MLD has a restriction that requires the non-AP MLD not to respond to a frame (transmitted from the NSTR mobile AP MLD and) received via the non-primary link when determining not to perform channel/class switching associated with the primary link.

<Trigger frame of NSTR mobile AP MLD> An NSTR mobile AP MLD transmits a trigger frame in the same manner as a general AP MLD (regular AP MLD), so as to allow non-AP STAs (and non-AP MLDs) to perform UL PPDU transmission. In this instance, a UL PPDU transmitted by each STA may be a TB PPDU that is provided as a response based on an orthogonal frequency division multiplexing (OFDMA).

To describe in detail, in conventional Wi-Fi, 802.11ax (Wi-Fi6), OFDMA is adopted and each frequency resource (resource unit (RU)) in which a DL PPDU of an AP is transmitted may have a different STA as an objective device. A DL PPDU may include information associated with which RU is to be allocated to which STA in a HE signal field. Each STA receives a HE signal field and obtains information associated with whether an RU allocated to the corresponding STA is present, the location of the RU, and an applied MCS, thereby receiving data that is included in the DL PPDU and is transmitted to the corresponding STA. Similarly, for an UL PPDU, OFDMA has been adopted. An AP transmits a trigger frame to enable multiple STAs to simultaneously perform UL PPDU transmission. A trigger frame may include information associated with an RU that is to transmit a UL PPDU to each STA, an MCS to be applied, a transmission length, and the like. When receiving a trigger frame from the AP and recognizing that an RU assigned to itself is present, each non-AP STA may perform UL transmission of traffic that needs to be transmitted to the AP according to a method indicated by the trigger frame. In this instance, a UL PPDU that the non-AP STA transmits after receiving the trigger frame may be referred to as a trigger-based physical layer protocol data unit (PPDU) (TB PPTU).

The AP may allocate RUs to non-AP STAs which are associated with the AP via a trigger frame, and may also allocate RUs usable by non-AP STAs that are not associated with the AP (i.e., unassociated STAs). In the case in which the AP allocates RUs usable by non-AP STAs that are not associated with the AP, the non-AP STAs that are not associated with the AP may attempt a procedure to associate with the AP such as transmitting a probe response frame via the corresponding RU or the like.

For example, a non-AP STA that receives a beacon frame or FILS discovery frame transmitted by an AP that is not associated with the non-AP STA may attempt to perform association with the AP. In this instance, the non-AP STA may attempt channel access via EDCA in order to transmit a probe request frame to the AP. In this instance, the non-AP STA may receive a trigger frame that the AP transmits before the non-AP STA completes a channel access procedure, and when identifying an RU allowed to be used by an STA that is unassociated with the AP, may transmit a probe request frame to the AP by using the RU. That is, the non-AP STA may provide a TB PPDU as a response by using the RU accessible by a non-AP STA in an unassociated state, thereby transmitting a probe request frame attempted to be transmitted. In this instance, the RU that the AP allows, via the trigger frame, an STA (unassociated STA) being in an unassociated state to access may be an RU of which a target allocation device's AID is indicated as 2045. In this instance, the RU of which the target allocation device's AID is indicated as 2045 may be an RU that is referred to as a random access resource unit (RA-RU) in the conventional Wi-Fi standard.

Considering the purpose of use of an RU for the above-described unassociated STA, it is recognized that an NSTR mobile AP MLD is required not to allocate an RU for an unassociated STA when transmitting a trigger frame in the non-primary link. To describe in detail, in the case in which the NSTR mobile AP MLD allocates an RU for an unassociated STA via a trigger frame transmitted via the non-primary link, there may be the probability that an unassociated STA provides a probe request frame as a response, which may be understood as unnecessary transmission caused, given that the NSTR mobile AP MLD does not support association via the non-primary link. Alternatively, although an unassociated RU is allocated, since a beacon/FILS discover/probe response frame transmitted in the non-primary link of the NSTR mobile AP MLD is not present, a non-AP STA that is to transmit a probe request frame to an AP of the non-primary link is not present, and thus this may result in the waste of an RU.

Therefore, the NSTR mobile AP MLD may be required not to indicate an (RA-) RU for an unassociated STA, when transmitting a trigger frame via an AP operated in the non-primary link. That is, the NSTR mobile AP MLD may be required not to allocate an RU of which the AID is indicated as 2045, when transmitting a trigger frame via an AP operated in the non-primary link. That is, the NSTR mobile AP MLD may be required not to indicate an AID12 subfield as 2045, when transmitting a trigger frame via an AP operated in the non-primary link.

In this instance, the AID12 subfield is a subfield included in a use info field included in a trigger frame, and may be a subfield indicating the AID of a target allocation device of an RU allocated based on an RU allocation subfield of the corresponding user info field. When an AID12 subfield of a predetermined user info field is indicated as 0, a target allocation device of an RU indicated based on an RU allocation subfield of the corresponding user info field is an unspecified associated STA. When the AID12 subfield of the predetermined user info field is indicated as a value in the range of 1 to 2007, a target allocation device of an RU indicated based on the RU allocation subfield of the corresponding user info field may be an STA having the same AID as the value indicated by the AID12 subfield. When the AID12 subfield of the predetermined user info field is indicated as 2054, a target allocation device of an RU indicated based on the RU allocation subfield of the corresponding user info field is an unspecified associated STA. When the AID12 subfield of the predetermined user info field is indicated as 2046, an RU indicated based on the RU allocation subfield of the corresponding user info field is an unallocated RU that is not allocated to any STA. When the AID12 subfield of the predetermined user info field is indicated as 4095, it is indicated that a padding field is to appear after the corresponding user info field. A configuration corresponding to the case in which the AID12 subfield value is in the range of 2008 to 2044, or in the range of 2047 to 4094 may be Reserved.

In addition, an EHT AP may indicate the format of a TB PPDU that is to respond via a trigger frame. In this instance, an available TB PPDU format may be one of a HE TB PPDU and an EHT TB PPDU. An EHT STA supports the function of a HE STA, and thus the EHT AP may provide, to both the HE STA (different from an EHT STA) and an EHT STA, an indication to use a HE TB PPDU format when responding a TB PPDU. In this instance, the TB PPDU format indicated by the AP may be indicated based on at least one of B54 and/or B55 included in a common info field of a trigger frame. In this instance, a trigger frame in which both B54 and B55 of a common info field are indicated as 1 may be a trigger frame indicating a response of a HE TB PPDU. That is, an STA that is assigned with an RU via a trigger frame in which both the B54 and B55 are indicated as 1 may need to perform UL transmission by using the HE TB PPDU format.

The reason of considering the EHT AP's selective response via an HE TB PPDU and an EHT TB PPDU is to enable the EHT AP to simultaneously allocate RUs to a HE STA and an EHT STA, and to simultaneously provide TB PPDUs as responses. For example, the EHT AP may transmit a trigger frame for the purpose of allocating RUs to both a HE STA and an EHT STA associated with the EHT AP. In this instance, the EHT AP indicates, to the EHT STA, a HE TB PPDU format for response, and thus, may receive the HE TB PPDUs received simultaneously from the HE STA and the EHT STA as responses, at a time.

Conversely, the EHT AP may not need to indicate a HE TB PPDU for response, when transmitting a trigger frame that allocates RUs to only EHT STAs. This is because all STAs that provide TB PPDU as responses are EHT STAs, and there is no reason to restrict the use of a format to a HE TB PPDU format which is the legacy format.

For an AP operated in the non-primary link of the NSTR mobile AP MLD, all associated STAs are EHT STAs. To describe in detail, all the STAs associated with the AP operated in the non-primary link of the NSTR mobile AP MLD are EHT STAs and MLD STAs. This is because only non-AP MLDs that perform multi-link association via the primary link of the NSTR mobile AP MLD are also in the state of being associated with the NSTR mobile AP MLD via the non-primary link.

Figure 25:
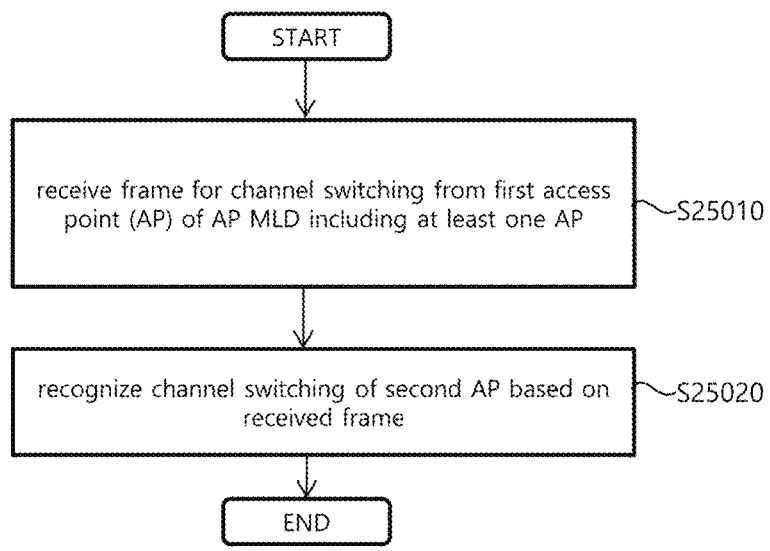
FIG. 25 is a flowchart illustrating an example of a channel switching method according to an embodiment of the present invention.

That is, the AP operated in the non-primary link of the NSTR mobile AP MLD is not associated with a HE STA, and thus there is no reason to allocate an RU to a HE STA. Therefore, when transmitting a trigger frame in the non-primary link, the NSTR mobile AP MLD may need to configure a trigger frame so that only an EHT TB PPDU is provided as a response. In other word, a trigger frame that the NSTR mobile AP MLD transmits in the non-primary link may be a trigger frame that solicits only an EHT TB PPDU. Accordingly, the NSTR mobile AP MLD may need to configure, to 0, at least one of the B54 and B55 of a common info field of a trigger frame transmitted in the non-primary link. That is, the NSTR mobile AP MLD may be required not to configure, to 1, all the B54 and B55 of the trigger frame transmitted in the non-primary link. FIG. 25 is a flowchart illustrating an example of a channel switching method according to an embodiment of the present invention.

Referring to FIG. 25, a non-AP STA included in a non-AP MLD may receive a frame for channel switching from a first access point (AP) of an AP MLD including at least one AP in operation S25010.

The frame may include at least one of a channel switch announcement element for announcing the channel switching of a second AP included in the AP MLD and/or a max channel switch time element related to a time of the channel switching of the second AP.

A switch time field included in the max channel switch time element may indicate a first time or a second time based on a type of the AP MLD and/or a state of the channel switching.

The first time is a maximum time until a first beacon frame on a new channel after a last beacon frame is transmitted from the second AP before the start of the channel switching, and the second time is a time until a predetermined operation of the second AP is performed on the new channel after the frame is transmitted.

Subsequently, the non-AP STA included in the non-AP MLD may recognize channel switching of the second AP based on the frame in operation S25020.

When the last beacon frame is transmitted after the start of the channel switching, the channel switch time field may indicate the second time, and the predetermined operation may be transmission of a first beacon frame on the new channel.

If it is before the start of the channel switching, the channel switch time field may indicate the first time.

The channel switch announcement element may include a new channel number field and a channel switch count field, and the channel number field indicates the location of the new channel. In this instance, the channel switch count field may indicate the number of target beacon transmission times (TBTTs) left until channel switch on the new channel.

In the case in which the type of the AP MLD is a nonsimultaneous transmit and receive (NSTR) that does not support simultaneous transmission/reception, the channel switch time field may indicate the second time.

The predetermined operation may be resumption of a basic service set (BSS) operation of the second AP on the new channel.

In the case in which the type of the AP MLD is NSTR, the first AP operates in a primary link, and the second AP operates in a non-primary link.

In the case in which the type of the AP MLD is NSTR, the state of the channel switching is determined based on whether the channel switch announcement element or the max channel switch time element is included in the frame.

When the max channel switch time element is included in the frame but the channel switch announcement element is not included, the state of the channel switching is determined as an ongoing state.

When the max channel switch time element is not included in the frame, the state of the channel switching may be determined as resumption of the BSS operation of the second AP.

The above description of the present invention is provided for illustrative purposes, and it is understood to those skilled in the art that the present invention is easily modified into other specific forms without departing from the technical idea or essential features of the present invention. Therefore, it should be understood that the above-described embodiments are provided for illustrative purposes in every aspect, and are not limited to the description. For example, component elements described as an integrated form may be embodied as being dispersed, or component elements described as being dispersed may be embodied as an integrated form.

The scope of the present invention is defined by claims described below, rather than the detailed description, and needs to be interpreted as including all modifications or changes derived from the meaning, scope, and equivalents of the claims.

The invention claimed is:

1. A station (STA) of a multi-link device (MLD), the STA comprising:
   a transceiver; and
   a processor,
   wherein the MLD comprises at least one STA, and
   wherein the processor is configured to:
   receive a specific frame for channel switching and/or class switching from a first access point (AP) of an AP MLD including at least one AP,
   wherein the specific frame includes a Per-STA profile subelement corresponding to a second AP included in the AP MLD,
   wherein the Per-STA profile subelement includes at least one of i) a channel switch announcement element for announcing a channel switching and/or ii) a class switching and/or a max channel switch time element related to a time of the channel switching of the second AP,
   determine whether the channel switching and/or the class switching of the second AP is completed based on the Per-STA profile subelement, and
   wherein whether the channel switching and/or the class switching is completed is determined based on whether the Per-STA profile subelement includes at least one of the channel switch announcement element and the maximum channel switch time element.

2. The STA of claim 1,
   wherein the channel switching of the second AP and/or the class switching is determined not to be completed after channel switching starts when the Per-STA profile subelement includes the max channel switch time element and does not include the channel switch announcement element.

3. The STA of claim 1,
   wherein the channel switching and/or the class switching of the second AP is determined to be completed and the BSS (basic service set) operation of the second AP is determined to be resumed when the Per-STA profile subelement does not include the maximum channel switch time element.

4. The STA of claim 1,
   wherein the max channel switch time element includes a switch time field relating to a time until a transmission of a first beacon frame or a resumption of a BSS operation on a new channel after the completion of the channel switching.

5. The STA of claim 4,
   wherein a switch time field included in the max channel switch time element of a last beacon frame indicates a time between a transmission time of the last beacon frame transmitted by the second AP and a transmission time of the first beacon frame on the new channel when the last beacon frame is transmitted by the second AP on a current channel.

6. The STA of claim 4,
   wherein the switch time field indicates a time between a transmission time of the specific frame containing the maximum channel switch time element and a transmission time of the first beacon frame on the new channel when the last beacon frame has been transmitted by the second AP on a current channel.

7. The STA of claim 4,
wherein the switch time delta field indicates a time between a transmission time of the specific frame including the maximum channel switch time element and a time until the BSS operation on the new channel is resumed when the AP MLD is a NSTR (Nonsimultaneous transmit and receive) mobile AP MLD that does not support simultaneous transmission/reception.

8. The STA of claim 1,
wherein the channel switch announcement element includes a new channel number field and a channel switch count field,
wherein the new channel number field indicates a number of the new channel, and
wherein the channel switch counter field indicates a number of TBTT (Target Beacon Transmission Time) remaining until the channel switch start on the new channel.

9. A method of receiving a frame by a station (STA) of a multi-link device (MLD) in a wireless communication system, the method comprising:
receiving a specific frame for channel switching and/or class switching from a first access point (AP) of an AP MLD including at least one AP,
wherein the specific frame includes a Per-STA profile subelement corresponding to a second AP included in the AP MLD,
wherein the Per-STA profile subelement includes at least one of i) a channel switch announcement element for announcing a channel switching and/or ii) a class switching and/or a max channel switch time element related to a time of the channel switching of the second AP,
determining whether the channel switching and/or the class switch of the second AP is completed based on the Per-STA profile subelement, and
wherein whether the channel switching and/or the class switching is completed is determined based on whether the Per-STA profile subelement includes at least one of the channel switch announcement element and the max channel switch time element.

10. The method of claim 9,
wherein the channel switching of the second AP and/or the class switching is determined not to be completed after channel switching starts when the Per-STA profile subelement includes the max channel switch time element and does not include the channel switch announcement element.

11. The method of claim 9,
wherein the channel switching and/or the class switching of the second AP is determined to be completed and the BSS (basic service set) operation of the second AP is determined to be resumed when the Per-STA profile subelement does not include the maximum channel switch time element.

12. The method of claim 9,
wherein the max channel switch time element includes a switch time field relating to a time until a transmission of a first beacon frame or a resumption of a BSS operation on a new channel after the completion of the channel switching.

13. The method of claim 12,
wherein a switch time field included in the max channel switch time element of a last beacon frame indicates a time between a transmission time of the last beacon frame transmitted by the second AP and a transmission time of the first beacon frame on the new channel when the last beacon frame is transmitted by the second AP on a current channel.

14. The method of claim 12,
wherein the switch time field indicates a time between a transmission time of the specific frame containing the maximum channel switch time element and a transmission time of the first beacon frame on the new channel when the last beacon frame has been transmitted by the second AP on a current channel.

15. The method of claim 12,
wherein the switch time field indicates a time delta between a transmission time of the specific frame including the maximum channel switch time element and a time until the BSS operation on the new channel is resumed when the AP MLD is a NSTR (Nonsimultaneous transmit and receive) mobile AP MLD that does not support simultaneous transmission/reception.

16. The method of claim 9,
wherein the channel switch announcement element includes a new channel number field and a channel switch count field,
wherein the new channel number field indicates a number of the new channel, and
wherein the channel switch counter field indicates a number of TBTT (Target Beacon Transmission Time) remaining until the channel switch start on the new channel.

* * * * *

UNITED STATES PATENT AND TRADEMARK OFFICE
CERTIFICATE OF CORRECTION

PATENT NO. : 12,289,672 B2
APPLICATION NO. : 18/820197
DATED : April 29, 2025
INVENTOR(S) : Sanghyun Kim et al.

It is certified that error appears in the above-identified patent and that said Letters Patent is hereby corrected as shown below:

In the Claims

In Claim 1, Column 90, Line 24, "ii)" should be deleted.
In Claim 1, Column 90, Line 25, "ii)" should be added to between "and/or" and "a".
In Claim 9, Column 91, Line 34, "ii)" should be deleted.
In Claim 9, Column 91, Line 35, "ii)" should be added to between "and/or" and "a".

Signed and Sealed this
Twelfth Day of August, 2025

Coke Morgan Stewart
*Acting Director of the United States Patent and Trademark Office*